United States Patent
Yang et al.

(10) Patent No.: US 12,021,768 B2
(45) Date of Patent: *Jun. 25, 2024

(54) DATA TRANSMISSION INDICATION METHOD, ACCESS POINT AND TERMINAL

(71) Applicant: Huawei Technologies Co., Ltd., Shenzhen (CN)

(72) Inventors: Xun Yang, Shenzhen (CN); Yalin Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,973

(22) Filed: Jun. 28, 2022

(65) Prior Publication Data

US 2022/0399968 A1   Dec. 15, 2022

Related U.S. Application Data

(63) Continuation of application No. 16/927,607, filed on Jul. 13, 2020, now Pat. No. 11,431,449, which is a (Continued)

(51) Int. Cl.
*H04L 5/00* (2006.01)

(52) U.S. Cl.
CPC .......... *H04L 5/0037* (2013.01); *H04L 5/0055* (2013.01); *H04L 5/0094* (2013.01); *H04L 5/0007* (2013.01); *H04L 5/0023* (2013.01)

(58) Field of Classification Search
CPC ... H04L 5/0037; H04L 5/0055; H04L 5/0094; H04L 5/0007; H04L 5/0023
See application file for complete search history.

(56) References Cited

U.S. PATENT DOCUMENTS

2005/0232138 A1   10/2005   Byun et al.
2008/0089278 A1   4/2008    Chang et al.
(Continued)

FOREIGN PATENT DOCUMENTS

CN   1805316 A    7/2006
CN   101127584 A   2/2008
(Continued)

OTHER PUBLICATIONS

U.S. Appl. No. 16/927,607, filed Jul. 13, 2020.
(Continued)

*Primary Examiner* — Jung H Park
(74) *Attorney, Agent, or Firm* — Leydig, Voit & Mayer, Ltd.

(57) ABSTRACT

A data transmission indication method and apparatuses carrying out the method are described herein. The method includes sending, by an access point, orthogonal frequency division multiple access (OFDMA) physical layer signaling to a terminal. The OFDMA physical layer signaling indicates, to the terminal, a subchannel allocated for the terminal, so that the terminal determines the subchannel according to the OFDMA physical layer signaling. The OFDMA physical layer signaling includes an identifier of the terminal and subchannel information corresponding to the identifier of the terminal. A manner in which the access point allocates a subchannel for each terminal according to OFDMA physical layer signaling enables the access point to indicate subchannels for more terminals.

20 Claims, 18 Drawing Sheets

---

An access point sends MU-MIMO data information to a terminal in an MU-MIMO mode, where the MU-MIMO data information carries OFDMA physical layer signaling — S601

The access point sends an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode — S602

The access point receives the ACK response or the BA response that is sent by the terminal on the corresponding subchannel in the OFDMA mode — S603

Related U.S. Application Data continuation of application No. 15/220,410, filed on Jul. 27, 2016, now Pat. No. 10,778,389, which is a continuation of application No. PCT/CN2014/071689, filed on Jan. 28, 2014.

(56) References Cited

U.S. PATENT DOCUMENTS

| | | | |
|---|---|---|---|
| 2008/0117867 | A1 | 5/2008 | Yin et al. |
| 2008/0240275 | A1* | 10/2008 | Cai .................. H04L 25/03821 375/296 |
| 2009/0292965 | A1 | 11/2009 | Park et al. |
| 2010/0034154 | A1 | 2/2010 | Tanigawa et al. |
| 2010/0214992 | A1 | 8/2010 | Hart et al. |
| 2010/0309834 | A1 | 12/2010 | Fischer et al. |
| 2011/0075607 | A1 | 3/2011 | Kim et al. |
| 2011/0128947 | A1 | 6/2011 | Liu et al. |
| 2011/0261708 | A1 | 10/2011 | Grandhi |
| 2011/0273981 | A1* | 11/2011 | Ktenas .................. H04L 5/0023 370/226 |
| 2013/0188630 | A1 | 7/2013 | Song et al. |
| 2013/0286959 | A1 | 10/2013 | Lou et al. |
| 2015/0071272 | A1 | 3/2015 | Vermani et al. |
| 2015/0085805 | A1 | 3/2015 | Li et al. |
| 2016/0242195 | A1* | 8/2016 | Kwon .................. H04W 72/121 |
| 2016/0278081 | A1* | 9/2016 | Chun .................. H04W 72/0446 |
| 2016/0330047 | A1 | 11/2016 | Seok |
| 2018/0146482 | A1* | 5/2018 | Hamaguchi ......... H04L 27/2627 |

FOREIGN PATENT DOCUMENTS

| | | |
|---|---|---|
| CN | 101296212 A | 10/2008 |
| CN | 101399585 A | 4/2009 |
| CN | 102006623 A | 4/2011 |
| CN | 102123514 A | 7/2011 |
| CN | 102124715 A | 7/2011 |
| CN | 102792628 A | 11/2012 |
| CN | 102869095 A | 1/2013 |
| CN | 102938748 A | 2/2013 |
| JP | 2008078890 A | 4/2008 |
| JP | 2008533933 A | 8/2008 |
| JP | 2010522452 A | 7/2010 |
| JP | 2012523771 A | 10/2012 |
| JP | 2013502886 A | 1/2013 |
| JP | 2013526153 A | 6/2013 |
| JP | 2013534085 A | 8/2013 |
| JP | 2013536599 A | 9/2013 |
| JP | 2013542643 A | 11/2013 |
| JP | 2015525017 A | 8/2015 |
| WO | 2008107520 A1 | 9/2008 |
| WO | 2013178084 A1 | 12/2013 |
| WO | 2016053024 A1 | 4/2016 |

OTHER PUBLICATIONS

U.S. Appl. No. 15/220,410, filed Jul. 27, 2016.
Gross et al., "Dynamic Multi-user OFDM for 802.11 systems", Technical University Berlin, IEEE 802.11-07/2062r1, Institute of Electrical and Electronics Engineers, New York, New York (Jul. 15, 2007).
Gross et al., "Performance Comparison of Dynamic OFDM with 802.11n", Technical University Berlin, IEEE 802.11-07/2860r0, Institute of Electrical and Electronics Engineers, New York, New York (Nov. 2007).
Gross et al., "OFDMA Related Issues in VHTL6", Technical University Berlin, 11-09/138r3, (Jan. 21, 2009).
Hart et al., "DL-OFDMA for Mixed Clients", Cisco Systems, IEEE 802.11-10/0317r1, Institute of Electrical and Electronics Engineers, New York, New York (Mar. 6, 2010).
Robert Stacey (Intel), Specification Framework for TGac, IEEE 802.11-09/0992r21, pp. 1-50 (Jan. 19, 2011).
C. Kose et al.,. WWiSE Proposal: High throughput extension to the 802.11 Standard, IEEE 802.11-04/0886r6, pp. 17-20 (Jan. 6, 2005).
Simone Merlin (Qualcomm) et al., ACK protocol and backoff procedure for MU-MIMO, IEEE 802.11-10/1092r0, pp. 1-16 (Sep. 14, 2010).
Eldad perahia et al., "chapter 14-multi-user MIMO " in: "next generation wireless lans:802.11 ac," XP55328764 (May 23, 2013).
"IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.Nov. 2012 (Revision of IEEE Std 802.11-2007), pp. 1-2793, Institute of Electrical and Electronics Engineers, New York, New York (Mar. 2012).
Liu et al., "Summary and Discussions of Proposals on Potential PHY Technologies in HEW," doc.: IEEE 802.11-13/1375r1, Total 17 pages, Institute of Electrical and Electronics Engineers, New York, New York (Nov. 2013).

* cited by examiner

A terminal receives OFDMA physical layer signaling sent by an access point, where the OFDMA physical layer signaling is used for indicating, to the terminal, a subchannel allocated by the access point for the terminal, where the OFDMA physical layer signaling includes an identifier of the terminal and subchannel information corresponding to the identifier of the terminal — S1201

The terminal determines the subchannel corresponding to the terminal according to the OFDMA physical layer signaling — S1202

FIG. 12

A terminal receives a mapping relationship between an identifier of a terminal group and an address of the terminal, where the mapping relationship is sent by the access point — S1301

The terminal receives OFDMA physical layer signaling sent by the access point, where the OFDMA physical layer signaling includes an identifier of the terminal and subchannel information corresponding to the identifier of the terminal, and the OFDMA physical layer signaling is used for indicating to each terminal group that the allocated subchannel is an uplink subchannel or a downlink subchannel or an uplink and downlink bidirectional subchannel — S1302

The terminal determines, according to the mapping relationship that the terminal is located in the terminal group, and then the terminal determines that a subchannel corresponding to the terminal group is the subchannel corresponding to the terminal — S1303

FIG. 13

A terminal receives an OFDM preamble sent by an access point, where the OFDM preamble carries OFDMA physical layer signaling — S1401

The terminal determines a subchannel corresponding to the terminal according to the OFDMA physical layer signaling — S1402

The terminal receives, on the corresponding subchannel, downlink OFDMA data information sent by the access point, where the downlink OFDMA data information includes an OFDMA preamble and OFDMA data, and the OFDMA preamble includes a switching field and UHT-SIG-B — S1403

FIG. 14

DATA TRANSMISSION INDICATION METHOD, ACCESS POINT AND TERMINAL

CROSS-REFERENCE TO RELATED APPLICATIONS

This application is a continuation of U.S. patent application Ser. No. 16/927,607, filed on Jul. 13, 2020, now U.S. Pat. No. 11,431,449, which is a continuation of U.S. patent application Ser. No. 15/220,410, filed on Jul. 27, 2016, now U.S. Pat. No. 10,778,389, which is a continuation of International Patent Application No. PCT/CN2014/071689, filed on Jan. 28, 2014. All of the afore-mentioned patent applications are hereby incorporated by reference in their entireties.

TECHNICAL FIELD

The present invention relates to the field of communications technologies, and in particular, to a data transmission indication method, an access point and a terminal.

BACKGROUND

Orthogonal frequency division multiplexing (OFDM) is a basic transmission manner of current wireless communications, where in a range allowed by orthogonality of a subcarrier, a subcarrier interval is compressed to minimum, thereby forming multiple transmission paths that are parallel and do not interfere with each other, so as to improve frequency utilization efficiency of a system. Features of the foregoing OFDM are used in orthogonal frequency division multiple access (OFDMA), and subcarriers in the OFDM that do not interfere with each other are allocated to multiple users, so as to implement multi-user access or data transmission. Sending data in the OFDMA mode is actually: a transmitting end synchronously sends data of multiple receiving ends by using subchannels corresponding to the receiving ends to the receiving ends associated with the subchannels (a subchannel herein may include one subcarrier, or may include multiple subcarriers).

In the prior art, transmission in an OFDMA mode can support only a bandwidth of 20 MHz to perform transmission, and the 20 MHz may be divided into 64 subcarriers, where 48 subcarriers are used for transmitting user data. In a conventional OFDMA technology, a signaling part (a format of the signaling part is only applicable to a bandwidth of 20 MHz) is added following a physical layer preamble in a data format, and the signaling part is used for indicating a user allocated for each subcarrier, where one subcarrier can only correspond to one user identity (ID). A transmitting end synchronously transmits data of different users on different subcarriers, and correspondingly, a user receives, on a corresponding subcarrier, data sent by the transmitting end.

However, when a quantity of users is greater than 48, because of a limitation on the bandwidth of 20 MHz, an indication cannot be performed for rest users beyond 48 users when the rest users receive data of a transmitting end in the prior art.

SUMMARY

The present invention provides a data transmission indication method, an access point and a terminal, which are used for resolving a problem in the prior art that an indication cannot be performed for rest users beyond 48 users when the rest users receives data of a transmitting end.

According to a first aspect, the present invention provides a data transmission indication method, including: sending, by an access point, OFDMA physical layer signaling to a terminal, where the OFDMA physical layer signaling is used for indicating, to the terminal, a subchannel allocated for the terminal, so that the terminal determines the subchannel corresponding to the terminal according to the OFDMA physical layer signaling, where the OFDMA physical layer signaling includes an identifier of the terminal and subchannel information corresponding to the identifier of the terminal.

With reference to the first aspect, in a first possible implementation manner of the first aspect, the identifier of the terminal is an identifier of one or more terminal groups, and each terminal group includes at least one terminal; and the subchannel information includes an uplink subchannel or a downlink subchannel or an uplink and downlink bidirectional subchannel, and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where the terminal group and the subchannel are in a one-to-one correspondence.

With reference to the first possible implementation manner of the first aspect, in a second possible implementation manner of the first aspect, before the sending, by an access point, OFDMA physical layer signaling to a terminal, the method further includes: sending, by the access point, a mapping relationship between an identifier of the terminal group and an address of the terminal to the terminal, so that the terminal learns a terminal group in which the terminal is located.

With reference to the first aspect, in a third possible implementation manner of the first aspect, the identifier of the terminal is an identifier of one terminal group, and the terminal group includes at least two terminals; and then the OFDMA physical layer signaling being used for indicating, to the terminal, a subchannel allocated for the terminal includes: the OFDMA physical layer signaling being used for indicating to each terminal in the terminal group that the allocated subchannel is an uplink subchannel or a downlink subchannel or an uplink and downlink bidirectional subchannel, where each terminal in the terminal group and the subchannel are in a one-to-one correspondence.

With reference to any one of the first aspect to the third possible implementation manner of the first aspect, in a fourth possible implementation manner of the first aspect, the sending, by an access point, OFDMA physical layer signaling to a terminal includes: sending, by the access point, an OFDM preamble to the terminal, where the OFDM preamble carries the OFDMA physical layer signaling; or sending, by the access point, a null data packet announcement (NDPA) frame to the terminal, where the NDPA frame carries the OFDMA physical layer signaling.

With reference to any one of the first aspect to the third possible implementation manner of the first aspect, in a fifth possible implementation manner of the first aspect, the sending, by an access point, OFDMA physical layer signaling to a terminal includes: sending, by the access point, an NDPA frame and an OFDM preamble to the terminal, where the NDPA frame carries the identifier of the terminal in the OFDMA physical layer signaling, and the OFDM preamble carries the subchannel information corresponding to the identifier of the terminal and being in the OFDMA physical layer signaling; or the NDPA frame carries the subchannel information corresponding to the identifier of the terminal and being in the OFDMA physical layer signaling, and the OFDM preamble carries the identifier of the terminal in the OFDMA physical layer signaling.

With reference to any one of the first aspect to the fifth possible implementation manner of the first aspect, in a sixth possible implementation manner of the first aspect, the OFDMA physical layer signaling is specifically used for indicating, to the terminal, a subchannel that is allocated to the terminal for receiving downlink OFDMA data information, and then after the sending, by an access point, OFDMA physical layer signaling to a terminal, the method further includes: sending, by the access point, downlink OFDMA data information on the subchannel corresponding to the terminal in an OFDMA mode, where the downlink OFDMA data information includes an OFDMA preamble and OFDMA data, and the OFDMA preamble includes a switching field and ultra high throughput signaling B (UHT-SIG-B).

With reference to the sixth possible implementation manner of the first aspect, in a seventh possible implementation manner of the first aspect, the OFDMA physical layer signaling or the downlink OFDMA data information carries an OFDMA acknowledge (ACK) request or an OFDMA block acknowledge (BA) request, and the OFDMA ACK request or the OFDMA BA request is used for instructing the terminal to send an ACK response or a BA response to the access point in the OFDMA mode; then the OFDMA physical layer signaling is further used for indicating the subchannel that corresponds to the terminal, on which the ACK response or the BA response is sent to the access point and that is allocated for the terminal; and then after the sending, by the access point, downlink OFDMA data information on the subchannel corresponding to the terminal in an OFDMA mode, the method further includes: receiving, by the access point, the ACK response or the BA response that is sent by the terminal on the subchannel corresponding to the terminal in the OFDMA mode.

With reference to the sixth possible implementation manner of the first aspect, in an eighth possible implementation manner of the first aspect, the OFDMA physical layer signaling is used for indicating the subchannel that corresponds to the terminal, on which the ACK response or the BA response is sent to the access point and that is allocated for the terminal, and then after the sending, by the access point, downlink OFDMA data information on the subchannel corresponding to the terminal, the method further includes: sending, by the access point, an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and receiving, by the access point, the ACK response or the BA response that is sent by the terminal on the corresponding subchannel in the OFDMA mode.

With reference to any one of the first aspect to the third possible implementation manner of the first aspect, in a ninth possible implementation manner of the first aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the sending, by an access point, OFDMA physical layer signaling to a terminal includes: sending, by the access point, multi-user multiple-input multiple-output (MU-MIMO) data information to the terminal in a MU-MIMO mode, where the MU-MIMO data information carries the OFDMA physical layer signaling; and then after the sending, by an access point, OFDMA physical layer signaling to a terminal, the method further includes: receiving, by the access point, the ACK response or the BA response that is sent by the terminal on the corresponding subchannel in the OFDMA mode.

With reference to any one of the first aspect to the third possible implementation manner of the first aspect, in a tenth possible implementation manner of the first aspect, the OFDMA physical layer signaling is specifically used for indicating, to the terminal, the subchannel that corresponds to the terminal, on which the ACK response or the BA response is sent to the access point and that is allocated for the terminal; and then the sending, by an access point, OFDMA physical layer signaling to a terminal includes: sending, by the access point, MU-MIMO data information to the terminal in a MU-MIMO mode, where the MU-MIMO data information carries the OFDMA physical layer signaling; and sending, by the access point, an ACK request frame or a BA request frame to the terminal, where the ACK request frame or the BA request frame includes a dedicated information bit, and the dedicated information bit is used for instructing the terminal to send the ACK response or the BA response to the access point in an OFDMA mode; and then after the sending, by an access point, OFDMA physical layer signaling to a terminal, the method further includes: receiving, by the access point, the ACK response or the BA response that is sent by the terminal on the subchannel corresponding to the terminal in the OFDMA mode.

With reference to any one of the first aspect to the third possible implementation manner of the first aspect, in an eleventh possible implementation manner of the first aspect, the OFDMA physical layer signaling is specifically used for indicating, to the terminal, the subchannel that corresponds to the terminal, on which the ACK response or the BA response is sent to the access point and that is allocated for the terminal; and then the sending, by an access point, OFDMA physical layer signaling to a terminal includes: sending, by the access point, MU-MIMO data information to the terminal in a MU-MIMO mode, sending, by the access point, an ACK request frame or a BA request frame to the terminal, where the ACK request frame or the BA request frame includes a dedicated information bit, and the dedicated information bit is used for instructing the terminal to send the ACK response or the BA response to the access point in an OFDMA mode; and the ACK request frame or the BA request frame carries the OFDMA physical layer signaling; and then after the sending, by an access point, OFDMA physical layer signaling to a terminal, the method further includes: receiving, by the access point, the ACK response or the BA response that is sent by the terminal on the corresponding subchannel in the OFDMA mode.

With reference to any one of the first aspect to the third possible implementation manner of the first aspect, in a twelfth possible implementation manner of the first aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and after the sending, by an access point, OFDMA physical layer signaling to a terminal, the method further includes: sending, by the access point, OFDMA+MU-MIMO data information to the terminal on the subchannel corresponding to the terminal in an OFDMA+MU-MIMO mode; and receiving, by the access point, the ACK response or the BA response that is sent by the terminal on the corresponding subchannel in the OFDMA mode.

With reference to any one of the first aspect to the third possible implementation manner of the first aspect, in a thirteenth possible implementation manner of the first aspect, the OFDMA physical layer signaling is specifically used for indicating, to the terminal, the subchannel that corresponds to the terminal, on which the ACK response or the BA response is sent to the access point and that is allocated for the terminal; and after the sending, by an access point, OFDMA physical layer signaling to a terminal, the method further includes: sending, by the access point, OFDMA+MU-MIMO data information to the terminal on the subchannel corresponding to the terminal in an OFDMA+MU-MIMO mode; sending, by the access point, an ACK request frame or a BA request frame to the terminal, where the ACK request frame or the BA request frame includes a dedicated information bit, and the dedicated information bit is used for instructing the terminal to send the ACK response or the BA response to the access point in an OFDMA mode; and receiving, by the access point, the ACK response or the BA response that is sent by the terminal on the corresponding subchannel in the OFDMA mode.

With reference to any one of the first aspect to the fifth possible implementation manner of the first aspect, in a fourteenth possible implementation manner of the first aspect, the OFDMA physical layer signaling is specifically used for indicating, to the terminal, the subchannel that corresponds to the terminal, on which uplink OFDMA data information is sent to the access point and that is allocated for the terminal; and then before the sending, by an access point, OFDMA physical layer signaling to a terminal, the method further includes: receiving, by the access point, an uplink transmission frame sent by the terminal; and then after the sending, by an access point, OFDMA physical layer signaling to a terminal, the method further includes: receiving, by the access point, the uplink OFDMA data information that is sent by the terminal on the corresponding subchannel in an OFDMA mode.

With reference to the fourteenth possible implementation manner of the first aspect, in a fifteenth possible implementation manner of the first aspect, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then after the receiving, by the access point, the uplink OFDMA data information that is sent by the terminal on the corresponding subchannel, the method further includes: sending, by the access point, the ACK response or the BA response corresponding to the uplink OFDMA data information on the subchannel corresponding to the terminal in the OFDMA mode.

With reference to any one of the first aspect to the fifth possible implementation manner of the first aspect, in a sixteenth possible implementation manner of the first aspect, the OFDMA physical layer signaling is specifically used for indicating, to the terminal, the subchannel that corresponds to the terminal, on which uplink OFDMA data information is sent to the access point and that is allocated for the terminal; and then after the sending, by an access point, OFDMA physical layer signaling to a terminal, the method further includes: receiving, by the access point, the uplink OFDMA data information that is sent by the terminal on the corresponding subchannel in an OFDMA mode.

According to a second aspect, the present invention provides a data transmission indication method, including: receiving, by a terminal, OFDMA physical layer signaling sent by an access point, where the OFDMA physical layer signaling is used for indicating, to the terminal, a subchannel allocated by the access point for the terminal, where the OFDMA physical layer signaling includes an identifier of the terminal and subchannel information corresponding to the identifier of the terminal; and determining, by the terminal, the subchannel corresponding to the terminal according to the OFDMA physical layer signaling.

With reference to the second aspect, in a first possible implementation manner of the second aspect, the identifier of the terminal is an identifier of one or more terminal groups, and each terminal group includes at least one terminal; and the subchannel information includes an uplink subchannel or a downlink subchannel or an uplink and downlink bidirectional subchannel, and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where the terminal group and the subchannel are in a one-to-one correspondence.

With reference to the first possible implementation manner of the second aspect, in a second possible implementation manner of the second aspect, before the receiving, by a terminal, OFDMA physical layer signaling sent by an access point, the method further includes: receiving, by the terminal, a mapping relationship between an identifier of the terminal group and an address of the terminal, where the mapping relationship is sent by the access point; and then the determining, by the terminal, the subchannel corresponding to the terminal according to the OFDMA physical layer signaling includes: determining, by the terminal, according to the mapping relationship that the terminal is located in the terminal group, and then determining, by the terminal, that a subchannel corresponding to the terminal group is the subchannel corresponding to the terminal.

With reference to the second aspect, in a third possible implementation manner of the second aspect, the identifier of the terminal is an identifier of one terminal group, and the terminal group includes at least two terminals; and then the OFDMA physical layer signaling being used for indicating, to the terminal, a subchannel allocated for the terminal includes: the OFDMA physical layer signaling being used for indicating to each terminal in the terminal group that the allocated subchannel is an uplink subchannel or a downlink subchannel or an uplink and downlink bidirectional subchannel, where each terminal in the terminal group and the subchannel are in a one-to-one correspondence.

With reference to any one of the second aspect to the third possible implementation manner of the second aspect, in a fourth possible implementation manner of the second aspect, the receiving, by a terminal, OFDMA physical layer signaling sent by an access point includes: receiving, by the terminal, an OFDM preamble sent by the access point, where the OFDM preamble carries the OFDMA physical layer signaling; or receiving, by the terminal, a NDPA frame sent by the access point, where the NDPA frame carries the OFDMA physical layer signaling.

With reference to any one of the second aspect to the third possible implementation manner of the second aspect, in a fifth possible implementation manner of the second aspect, the receiving, by a terminal, OFDMA physical layer signaling sent by an access point further includes: receiving, by the terminal, an NDPA frame and an OFDM preamble that are sent by the access point, where the NDPA frame carries the identifier of the terminal in the OFDMA physical layer signaling, and the OFDM preamble carries the subchannel information corresponding to the identifier of the terminal and being in the OFDMA physical layer signaling; or the NDPA frame carries the subchannel information corresponding to the identifier of the terminal and being in the OFDMA physical layer signaling, and the OFDM preamble carries the identifier of the terminal in the OFDMA physical layer signaling.

With reference to any one of the second aspect to the fifth possible implementation manner of the second aspect, in a sixth possible implementation manner of the second aspect, the OFDMA physical layer signaling is specifically used for indicating, to the terminal, a subchannel that is allocated by the access point to the terminal for receiving downlink OFDMA data, and then after the determining, by the terminal, the subchannel corresponding to the terminal according to the OFDMA physical layer signaling, the method further includes: receiving, by the terminal on the subchannel corresponding to the terminal, downlink OFDMA data information sent by the access point, where the downlink OFDMA data information includes an OFDMA preamble and OFDMA data, and the OFDMA preamble includes a switching field and UHT-SIG-B.

With reference to the sixth possible implementation manner of the second aspect, in a seventh possible implementation manner of the second aspect, the receiving, by the terminal on the subchannel corresponding to the terminal, downlink OFDMA data information sent by the access point specifically includes: receiving, by the terminal, a destination terminal address corresponding to the OFDMA data and sent by the access point; determining, by the terminal, whether the terminal matches the destination terminal address; and if yes, receiving, by the terminal on the subchannel corresponding to the terminal, the downlink OFDMA data information sent by the access point.

With reference to the seventh possible implementation manner of the second aspect, in an eighth possible implementation manner of the second aspect, the OFDMA physical layer signaling or the downlink OFDMA data information carries an OFDMA acknowledge (ACK) request or an OFDMA block acknowledge (BA) request, and the OFDMA ACK request or the OFDMA BA request is used for instructing the terminal to send an ACK response or a BA response to the access point in an OFDMA mode; and then the OFDMA physical layer signaling is further used for indicating the subchannel that corresponds to the terminal, on which the ACK response or the BA response is sent to the access point and that is allocated for the terminal, and then after the receiving, by the terminal on the subchannel corresponding to the terminal, downlink OFDMA data information sent by the access point, the method further includes: sending, by the terminal, the ACK response or the BA response to the access point on the subchannel corresponding to the terminal in the OFDMA mode.

With reference to the seventh possible implementation manner of the second aspect, in a ninth possible implementation manner of the second aspect, the OFDMA physical layer signaling is used for indicating the subchannel that corresponds to the terminal, on which the ACK response or the BA response is sent to the access point and that is allocated for the terminal, and then after the receiving, by the terminal on the subchannel corresponding to the terminal, downlink OFDMA data information sent by the access point, the method further includes: receiving, by the terminal, an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and sending, by the terminal, the ACK response or the BA response to the access point on the subchannel corresponding to the terminal in the OFDMA mode.

With reference to any one of the second aspect to the third possible implementation manner of the second aspect, in a tenth possible implementation manner of the second aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the receiving, by a terminal, OFDMA physical layer signaling sent by an access point includes: receiving, by the terminal, MU-MIMO data information sent by the access point, where the MU-MIMO data information carries the OFDMA physical layer signaling; and then after the determining, by the terminal, the subchannel corresponding to the terminal according to the OFDMA physical layer signaling, the method further includes: sending, by the terminal, the ACK response or the BA response to the access point on the subchannel corresponding to the terminal in the OFDMA mode.

With reference to any one of the second aspect to the third possible implementation manner of the second aspect, in an eleventh possible implementation manner of the second aspect, the OFDMA physical layer signaling is specifically used for indicating, to the terminal, the subchannel that corresponds to the terminal, on which the ACK response or the BA response is sent to the access point and that is allocated for the terminal; and then the receiving, by a terminal, OFDMA physical layer signaling sent by an access point includes: receiving, by the terminal, MU-MIMO data information sent by the access point, where the MU-MIMO data information carries the OFDMA physical layer signaling; and receiving, by the terminal, an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and then after the determining, by the terminal, the subchannel corresponding to the terminal according to the OFDMA physical layer signaling, the method further includes: sending, by the terminal, the ACK response or the BA response to the access point on the subchannel corresponding to the terminal in the OFDMA mode.

With reference to any one of the second aspect to the third possible implementation manner of the second aspect, in a twelfth possible implementation manner of the second aspect, the OFDMA physical layer signaling is specifically used for indicating, to the terminal, the subchannel that corresponds to the terminal, on which the ACK response or the BA response is sent to the access point and that is allocated for the terminal; and then the receiving, by a terminal, OFDMA physical layer signaling sent by an access point includes: receiving, by the terminal, MU-MIMO data information sent by the access point, receiving, by the terminal, an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the ACK request frame or the BA request frame carries the OFDMA physical layer signaling; and then after the determining, by the terminal, the subchannel corresponding to the terminal according to the OFDMA physical layer signaling, the method further includes: sending, by the terminal, the ACK response or the BA response to the access point on the subchannel corresponding to the terminal in the OFDMA mode.

With reference to any one of the second aspect to the third possible implementation manner of the second aspect, in a thirteenth possible implementation manner of the second aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then after the determining, by the terminal, the subchannel corresponding to the terminal according to the OFDMA physical layer signaling, the method further includes: receiving, by the terminal on the subchannel corresponding to the terminal, OFDMA+MU-MIMO data information sent by the access point; and sending, by the terminal, the ACK response or the BA response to the access point on the subchannel corresponding to the terminal in the OFDMA mode.

With reference to any one of the second aspect to the third possible implementation manner of the second aspect, in a fourteenth possible implementation manner of the second aspect, the OFDMA physical layer signaling is specifically used for indicating, to the terminal, the subchannel that corresponds to the terminal, on which the ACK response or the BA response is sent to the access point and that is allocated for the terminal; and then after the determining, by the terminal, the subchannel corresponding to the terminal according to the OFDMA physical layer signaling, the method further includes: receiving, by the terminal on the subchannel corresponding to the terminal, OFDMA+MU-MIMO data information sent by the access point; receiving, by the terminal, an ACK request frame or a BA request frame sent by the access point, where the ACK request frame or the BA request frame includes a dedicated information bit, and the dedicated information bit is used for instructing the terminal to send the ACK response or the BA response to the access point in an OFDMA mode; and sending, by the terminal, the ACK response or the BA response to the access point on the subchannel corresponding to the terminal in the OFDMA mode.

With reference to any one of the second aspect to the fifth possible implementation manner of the second aspect, in a fifteenth possible implementation manner of the second aspect, the OFDMA physical layer signaling is specifically used for indicating, to the terminal, the subchannel on which uplink OFDMA data information is sent to the access point and that is allocated for the terminal; and then before the receiving, by a terminal, OFDMA physical layer signaling sent by an access point, the method further includes: sending, by the terminal, an uplink transmission frame to the access point; and then after the determining, by the terminal, the subchannel corresponding to the terminal according to the OFDMA physical layer signaling, the method further includes: sending, by the terminal, the uplink OFDMA data information to the access point on the subchannel corresponding to the terminal in an OFDMA mode.

With reference to the fifteenth possible implementation manner of the second aspect, in a sixteenth possible implementation manner of the second aspect, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then after the sending, by the terminal, the uplink OFDMA data information to the access point on the subchannel corresponding to the terminal, the method further includes: receiving, by the terminal on the subchannel corresponding to the terminal, the ACK response or the BA response corresponding to the uplink OFDMA data information and sent by the access point.

With reference to any one of the second aspect to the fifth possible implementation manner of the second aspect, in a seventeenth possible implementation manner of the second aspect, the OFDMA physical layer signaling is specifically used for indicating, to the terminal, the subchannel that corresponds to the terminal, on which uplink OFDMA data information is sent to the access point and that is allocated for the terminal; and then after the determining, by the terminal, the subchannel corresponding to the terminal according to the OFDMA physical layer signaling, the method further includes: sending, by the terminal, the uplink OFDMA data information to the access point on the subchannel corresponding to the terminal in an OFDMA mode.

According to a third aspect, the present invention provides an access point, including: a sending module, configured to send OFDMA physical layer signaling to a terminal, where the OFDMA physical layer signaling is used for indicating, to the terminal, a subchannel allocated for the terminal, so that the terminal determines the subchannel corresponding to the terminal according to the OFDMA physical layer signaling, where the OFDMA physical layer signaling includes an identifier of the terminal and subchannel information corresponding to the identifier of the terminal.

With reference to the third aspect, in a first possible implementation manner of the third aspect, the identifier of the terminal is an identifier of one or more terminal groups, and each terminal group includes at least one terminal; and the subchannel information includes an uplink subchannel or a downlink subchannel or an uplink and downlink bidirectional subchannel, and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where the terminal group and the subchannel are in a one-to-one correspondence.

With reference to the first possible implementation manner of the third aspect, in a second possible implementation manner of the third aspect, the sending module is further configured to: before the OFDMA physical layer signaling is sent to the terminal, send a mapping relationship between an identifier of the terminal group and an address of the terminal to the terminal, so that the terminal learns a terminal group in which the terminal is located.

With reference to the third aspect, in a third possible implementation manner of the third aspect, the identifier of the terminal is an identifier of one terminal group, and the terminal group includes at least two terminals; and then the OFDMA physical layer signaling being used for indicating, to the terminal, a subchannel allocated for the terminal includes: the OFDMA physical layer signaling being used for indicating to each terminal in the terminal group that the allocated subchannel is an uplink subchannel or a downlink subchannel or an uplink and downlink bidirectional subchannel, where each terminal in the terminal group and the subchannel are in a one-to-one correspondence.

With reference to any one of the third aspect to the third possible implementation manner of the third aspect, in a fourth possible implementation manner of the third aspect, the sending module is specifically configured to send an OFDM preamble to the terminal, where the OFDM preamble carries the OFDMA physical layer signaling; or specifically configured to send a NDPA frame to the terminal, where the NDPA frame carries the OFDMA physical layer signaling.

With reference to any one of the third aspect to the third possible implementation manner of the third aspect, in a fifth possible implementation manner of the third aspect, the sending module is further configured to send an NDPA frame and an OFDM preamble to the terminal, where the NDPA frame carries the identifier of the terminal in the OFDMA physical layer signaling, and the OFDM preamble carries the subchannel information corresponding to the identifier of the terminal and being in the OFDMA physical layer signaling; or the NDPA frame carries the subchannel information corresponding to the identifier of the terminal and being in the OFDMA physical layer signaling, and the OFDM preamble carries the identifier of the terminal in the OFDMA physical layer signaling.

With reference to any one of the third aspect to the fifth possible implementation manner of the third aspect, in a sixth possible implementation manner of the third aspect, the OFDMA physical layer signaling is specifically used for indicating, to the terminal, a subchannel that is allocated to the terminal for receiving downlink OFDMA data information, and then the sending module is further configured to: after the OFDMA physical layer signaling is sent to the terminal, send downlink OFDMA data information on the subchannel corresponding to the terminal in an OFDMA mode, where the downlink OFDMA data information includes an OFDMA preamble and OFDMA data, and the OFDMA preamble includes a switching field and ultra high throughput signaling B (UHT-SIG-B).

With reference to the sixth possible implementation manner of the third aspect, in a seventh possible implementation manner of the third aspect, the OFDMA physical layer signaling or the downlink OFDMA data information carries an OFDMA acknowledge (ACK) request or an OFDMA block acknowledge (BA) request, and the OFDMA ACK request or the OFDMA BA request is used for instructing the terminal to send an ACK response or a BA response to the access point in the OFDMA mode; then the OFDMA physical layer signaling is further used for indicating the subchannel that corresponds to the terminal, on which the ACK response or the BA response is sent to the access point and that is allocated for the terminal; and then the access point further includes: a receiving module, configured to: after the sending module sends the downlink OFDMA data information on the subchannel corresponding to the terminal in the OFDMA mode, receive the ACK response or the BA response that is sent by the terminal on the subchannel corresponding to the terminal in the OFDMA mode.

With reference to the sixth possible implementation manner of the third aspect, in an eighth possible implementation manner of the third aspect, the OFDMA physical layer signaling is used for indicating the subchannel that corresponds to the terminal, on which the ACK response or the BA response is sent to the access point and that is allocated for the terminal; and then the sending module is further configured to: after the downlink OFDMA data information is sent on the subchannel corresponding to the terminal, send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the receiving module is further configured to receive the ACK response or the BA response that is sent by the terminal on the corresponding subchannel in the OFDMA mode.

With reference to any one of the third aspect to the third possible implementation manner of the third aspect, in a ninth possible implementation manner of the third aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the sending module is specifically configured to send MU-MIMO data information to the terminal in a MU-MIMO mode, where the MU-MIMO data information carries the OFDMA physical layer signaling; and the receiving module is further configured to: after the sending module sends the OFDMA physical layer signaling to the terminal, receive the ACK response or the BA response that is sent by the terminal on the corresponding subchannel in the OFDMA mode.

With reference to any one of the third aspect to the third possible implementation manner of the third aspect, in a tenth possible implementation manner of the third aspect, the OFDMA physical layer signaling is specifically used for indicating, to the terminal, the subchannel that corresponds to the terminal, on which the ACK response or the BA response is sent to the access point and that is allocated for the terminal; and then the sending module is specifically configured to send MU-MIMO data information to the terminal in a MU-MIMO mode, where the MU-MIMO data information carries the OFDMA physical layer signaling; and send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and then the receiving module is further configured to: after the sending module sends the OFDMA physical layer signaling to the terminal, receive the ACK response or the BA response that is sent by the terminal on the subchannel corresponding to the terminal in the OFDMA mode.

With reference to any one of the third aspect to the third possible implementation manner of the third aspect, in an eleventh possible implementation manner of the third aspect, the OFDMA physical layer signaling is specifically used for indicating, to the terminal, the subchannel that corresponds to the terminal, on which the ACK response or the BA response is sent to the access point and that is allocated for the terminal; and then the sending module is specifically configured to send MU-MIMO data information to the terminal in a MU-MIMO mode, and send an ACK request frame or a BA request frame to the terminal, where the ACK request frame or the BA request frame includes a dedicated information bit, and the dedicated information bit is used for instructing the terminal to send the ACK response or the BA response to the access point in an OFDMA mode; and the ACK request frame or the BA request frame carries the OFDMA physical layer signaling; and then the receiving module is further configured to: after the sending module sends the OFDMA physical layer signaling to the terminal, receive the ACK response or the BA response that is sent by the terminal on the corresponding subchannel in the OFDMA mode.

With reference to any one of the third aspect to the third possible implementation manner of the third aspect, in a twelfth possible implementation manner of the third aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and the sending module is further configured to: after the OFDMA physical layer signaling is sent to the terminal, send OFDMA+MU-MIMO data information to the terminal on the subchannel corresponding to the terminal in an OFDMA+MU-MIMO mode; and the receiving module is further configured to receive the ACK response or the BA response that is sent by the terminal on the corresponding subchannel in the OFDMA mode.

With reference to any one of the third aspect to the third possible implementation manner of the third aspect, in a thirteenth possible implementation manner of the third aspect, the OFDMA physical layer signaling is specifically used for indicating, to the terminal, the subchannel that corresponds to the terminal, on which the ACK response or the BA response is sent to the access point and that is allocated for the terminal; and then the sending module is further configured to: after the OFDMA physical layer signaling is sent to the terminal, send OFDMA+MU-MIMO data information to the terminal on the subchannel corresponding to the terminal in an OFDMA+MU-MIMO mode; and send an ACK request frame or a BA request frame to the terminal, where the ACK request frame or the BA request frame includes a dedicated information bit, and the dedicated information bit is used for instructing the terminal to send the ACK response or the BA response to the access point in an OFDMA mode; and then the receiving module is further configured to receive the ACK response or the BA response that is sent by the terminal on the corresponding subchannel in the OFDMA mode.

With reference to any one of the third aspect to the fifth possible implementation manner of the third aspect, in a fourteenth possible implementation manner of the third aspect, the OFDMA physical layer signaling is specifically used for indicating, to the terminal, the subchannel that corresponds to the terminal, on which uplink OFDMA data information is sent to the access point and that is allocated for the terminal; and then the receiving module is further configured to: before the sending module sends the OFDMA physical layer signaling to the terminal, receive an uplink transmission frame sent by the terminal; and after the sending module sends the OFDMA physical layer signaling to the terminal, receive the uplink OFDMA data information that is sent by the terminal on the corresponding subchannel in an OFDMA mode.

With reference to the fourteenth possible implementation manner of the third aspect, in a fifteenth possible implementation manner of the third aspect, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then the sending module is further configured to: after the receiving module receives the uplink OFDMA data information that is sent by the terminal on the corresponding subchannel, send the ACK response or the BA response corresponding to the uplink OFDMA data information on the subchannel corresponding to the terminal in the OFDMA mode.

With reference to any one of the third aspect to the fifth possible implementation manner of the third aspect, in a sixteenth possible implementation manner of the third aspect, the OFDMA physical layer signaling is specifically used for indicating, to the terminal, the subchannel that corresponds to the terminal, on which uplink OFDMA data information is sent to the access point and that is allocated for the terminal; and then the receiving module is further configured to: after the sending module sends the OFDMA physical layer signaling to the terminal, receive the uplink OFDMA data information that is sent by the terminal on the corresponding subchannel in an OFDMA mode.

According to a fourth aspect, the present invention provides a terminal, including: a receiving module, configured to receive OFDMA physical layer signaling sent by an access point, where the OFDMA physical layer signaling is used for indicating, to the terminal, a subchannel allocated by the access point for the terminal, where the OFDMA physical layer signaling includes an identifier of the terminal and subchannel information corresponding to the identifier of the terminal; and a determining module, configured to determine the subchannel corresponding to the terminal according to the OFDMA physical layer signaling.

With reference to the fourth aspect, in a first possible implementation manner of the fourth aspect, the identifier of the terminal is an identifier of one or more terminal groups, and each terminal group includes at least one terminal; and the subchannel information includes an uplink subchannel or a downlink subchannel or an uplink and downlink bidirectional subchannel, and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where the terminal group and the subchannel are in a one-to-one correspondence.

With reference to the first possible implementation manner of the fourth aspect, in a second possible implementation manner of the fourth aspect, the receiving module is further configured to: before the OFDMA physical layer signaling sent by the access point is received, receive a mapping relationship between an identifier of the terminal group and an address of the terminal, where the mapping relationship is sent by the access point; and then the determining module is specifically configured to determine according to the mapping relationship that the terminal is located in the terminal group, and then determine that a subchannel corresponding to the terminal group is the subchannel corresponding to the terminal.

With reference to the fourth aspect, in a third possible implementation manner of the fourth aspect, the identifier of the terminal is an identifier of one terminal group, and the terminal group includes at least two terminals; and then the OFDMA physical layer signaling being used for indicating, to the terminal, a subchannel allocated for the terminal includes: the OFDMA physical layer signaling being used for indicating to each terminal in the terminal group that the allocated subchannel is an uplink subchannel or a downlink subchannel or an uplink and downlink bidirectional subchannel, where each terminal in the terminal group and the subchannel are in a one-to-one correspondence.

With reference to any one of the fourth aspect to the third possible implementation manner of the fourth aspect, in a fourth possible implementation manner of the fourth aspect, the receiving module is specifically configured to receive an OFDM preamble sent by the access point, where the OFDM preamble carries the OFDMA physical layer signaling; or specifically configured to receive a NDPA frame sent by the access point, where the NDPA frame carries the OFDMA physical layer signaling.

With reference to any one of the fourth aspect to the third possible implementation manner of the fourth aspect, in a fifth possible implementation manner of the fourth aspect, the receiving module is further configured to receive an NDPA frame and an OFDM preamble that are sent by the access point, where the NDPA frame carries the identifier of the terminal in the OFDMA physical layer signaling, and the OFDM preamble carries the subchannel information corresponding to the identifier of the terminal and being in the OFDMA physical layer signaling; or further configured to receive an NDPA frame and an OFDM preamble that are sent by the access point, where the NDPA frame carries the subchannel information corresponding to the identifier of the terminal and being in the OFDMA physical layer signaling, and the OFDM preamble carries the identifier of the terminal in the OFDMA physical layer signaling.

With reference to any one of the fourth aspect to the fifth possible implementation manner of the fourth aspect, in a sixth possible implementation manner of the fourth aspect, the OFDMA physical layer signaling is specifically used for indicating, to the terminal, a subchannel that is allocated by the access point to the terminal for receiving downlink OFDMA data, and then the receiving module is further configured to: after the determining module determines the subchannel corresponding to the terminal according to the OFDMA physical layer signaling, receive, on the subchannel corresponding to the terminal, downlink OFDMA data information sent by the access point, where the downlink OFDMA data information includes an OFDMA preamble and OFDMA data, and the OFDMA preamble includes a switching field and UHT-SIG-B.

With reference to the sixth possible implementation manner of the fourth aspect, in a seventh possible implementation manner of the fourth aspect, the receiving module includes: a receiving unit, configured to receive a destination terminal address corresponding to the OFDMA data and sent by the access point; and a determining unit, configured to determine whether the terminal matches the destination terminal address; and if yes, instruct the receiving unit to receive, on the subchannel corresponding to the terminal, the downlink OFDMA data information sent by the access point.

With reference to the seventh possible implementation manner of the fourth aspect, in an eighth possible implementation manner of the fourth aspect, the OFDMA physical layer signaling or the downlink OFDMA data information carries an OFDMA ACK request or an OFDMA BA request, and the OFDMA ACK request or the OFDMA BA request is used for instructing the terminal to send an ACK response or a BA response to the access point in an OFDMA mode; and then the OFDMA physical layer signaling is further used for indicating the subchannel that corresponds to the terminal, on which the ACK response or the BA response is sent to the access point and that is allocated for the terminal, and then the terminal further includes: a sending module, configured to: after the receiving module receives, on the subchannel corresponding to the terminal, the downlink OFDMA data information sent by the access point, send the ACK response or the BA response to the access point on the subchannel corresponding to the terminal in the OFDMA mode.

With reference to the seventh possible implementation manner of the fourth aspect, in a ninth possible implementation manner of the fourth aspect, the OFDMA physical layer signaling is further used for indicating the subchannel that corresponds to the terminal, on which the ACK response or the BA response is sent to the access point and that is allocated for the terminal; and then the receiving module is further configured to: after the downlink OFDMA data information sent by the access point is received on the subchannel corresponding to the terminal, receive an ACK request frame or a BA request frame sent by the access point, where the ACK request frame or the BA request frame includes a dedicated information bit, and the dedicated information bit is used for instructing the terminal to send the ACK response or the BA response to the access point in an OFDMA mode; and then the sending module is further configured to send the ACK response or the BA response to the access point on the subchannel corresponding to the terminal in the OFDMA mode.

With reference to any one of the fourth aspect to the third possible implementation manner of the fourth aspect, in a tenth possible implementation manner of the fourth aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the receiving module is specifically configured to receive MU-MIMO data information sent by the access point; and the sending module is further configured to: after the determining module determines the subchannel corresponding to the terminal according to the OFDMA physical layer signaling, send the ACK response or the BA response to the access point on the subchannel corresponding to the terminal in the OFDMA mode.

With reference to any one of the fourth aspect to the third possible implementation manner of the fourth aspect, in an eleventh possible implementation manner of the fourth aspect, the OFDMA physical layer signaling is specifically used for indicating, to the terminal, the subchannel that corresponds to the terminal, on which the ACK response or the BA response is sent to the access point and that is allocated for the terminal; and then the receiving module is specifically configured to receive MU-MIMO data information sent by the access point, where the MU-MIMO data information carries the OFDMA physical layer signaling; and receive an ACK request frame or a BA request frame sent by the access point, where the ACK request frame or the BA request frame includes a dedicated information bit, and the dedicated information bit is used for instructing the terminal to send the ACK response or the BA response to the access point in an OFDMA mode; and then the sending module is further configured to: after the determining module determines the subchannel corresponding to the terminal according to the OFDMA physical layer signaling, send the ACK response or the BA response to the access point on the subchannel corresponding to the terminal in the OFDMA mode.

With reference to any one of the fourth aspect to the third possible implementation manner of the fourth aspect, in a twelfth possible implementation manner of the fourth aspect, the OFDMA physical layer signaling is specifically used for indicating, to the terminal, the subchannel that corresponds to the terminal, on which the ACK response or the BA response is sent to the access point and that is allocated for the terminal; and then the receiving module is specifically configured to receive MU-MIMO data information sent by the access point, and receive an ACK request frame or a BA request frame sent by the access point, where the ACK request frame or the BA request frame includes a dedicated information bit, and the dedicated information bit is used for instructing the terminal to send the ACK response or the BA response to the access point in an OFDMA mode; and the ACK request frame or the BA request frame carries the OFDMA physical layer signaling; and then the sending module is further configured to: after the determining module determines the subchannel corresponding to the terminal according to the OFDMA physical layer signaling, send the ACK response or the BA response to the access point on the subchannel corresponding to the terminal in the OFDMA mode.

With reference to any one of the fourth aspect to the third possible implementation manner of the fourth aspect, in a thirteenth possible implementation manner of the fourth aspect, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the receiving module is further configured to: after the determining module determines the subchannel corresponding to the terminal according to the OFDMA physical layer signaling, receive, on the subchannel corresponding to the terminal, OFDMA+MU-MIMO data information sent by the access point; and the sending module is further configured to send the ACK response or the BA response to the access point on the subchannel corresponding to the terminal in the OFDMA mode.

With reference to any one of the fourth aspect to the third possible implementation manner of the fourth aspect, in a fourteenth possible implementation manner of the fourth aspect, the OFDMA physical layer signaling is specifically used for indicating, to the terminal, the subchannel that corresponds to the terminal, on which the ACK response or the BA response is sent to the access point and that is allocated for the terminal; and then the receiving module is further configured to: after the determining module determines the subchannel corresponding to the terminal according to the OFDMA physical layer signaling, receive, on the subchannel corresponding to the terminal, OFDMA+MU-MIMO data information sent by the access point; and receive an ACK request frame or a BA request frame sent by the access point, where the ACK request frame or the BA request frame includes a dedicated information bit, and the dedicated information bit is used for instructing the terminal to send the ACK response or the BA response to the access point in an OFDMA mode; and the sending module is further configured to send the ACK response or the BA response to the access point on the subchannel corresponding to the terminal in the OFDMA mode.

With reference to any one of the fourth aspect to the fifth possible implementation manner of the fourth aspect, in a fifteenth possible implementation manner of the fourth aspect, the OFDMA physical layer signaling is specifically used for indicating, to the terminal, the subchannel on which uplink OFDMA data information is sent to the access point and that is allocated for the terminal; and then the sending module is further configured to: before the receiving module receives the OFDMA physical layer signaling sent by the access point, send an uplink transmission frame to the access point; and further configured to: after the determining module determines the subchannel corresponding to the terminal according to the OFDMA physical layer signaling, send the uplink OFDMA data information to the access point on the subchannel corresponding to the terminal in an OFDMA mode.

With reference to the fifteenth possible implementation manner of the fourth aspect, in a sixteenth possible implementation manner of the fourth aspect, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then the receiving module is further configured to: after the sending module sends the uplink OFDMA data information to the access point, receive, on the subchannel corresponding to the terminal, the ACK response or the BA response corresponding to the uplink OFDMA data information and sent by the access point.

With reference to any one of the fourth aspect to the fifth possible implementation manner of the fourth aspect, in a seventeenth possible implementation manner of the fourth aspect, the OFDMA physical layer signaling is specifically used for indicating, to the terminal, the subchannel that corresponds to the terminal, on which uplink OFDMA data information is sent to the access point and that is allocated for the terminal; and then the sending module is further configured to: after the determining module determines the subchannel corresponding to the terminal according to the OFDMA physical layer signaling, send the uplink OFDMA data information to the access point on the subchannel corresponding to the terminal in an OFDMA mode.

The present invention provides a data transmission indication method, an access point and a terminal, where an access point sends OFDMA physical layer signaling to a terminal, so that each terminal learns a subchannel to which the terminal corresponds, and therefore the terminal may perform a corresponding operation on the subchannel corresponding to the terminal. That is, a manner in which the access point allocates a subchannel for each terminal according to OFDMA physical layer signaling enables the access point to indicate subchannels for more terminals, that is, a quantity of terminals to which the access point indicates subchannels is not limited.

BRIEF DESCRIPTION OF DRAWINGS

The following briefly introduces the accompanying drawings used in describing the embodiments. Apparently, the accompanying drawings in the following description show some embodiments of the present invention, and persons of ordinary skill in the art may still derive other embodiments from these accompanying drawings without creative efforts.

FIG. 12 is a schematic flowchart of Embodiment 14 of a data transmission indication method according to the present invention;

FIG. 13 is a schematic flowchart of Embodiment 15 of a data transmission indication method according to the present invention;

FIG. 14 is a schematic flowchart of Embodiment 17 of a data transmission indication method according to the present invention;

DETAILED DESCRIPTION OF EMBODIMENTS

Figure 1:
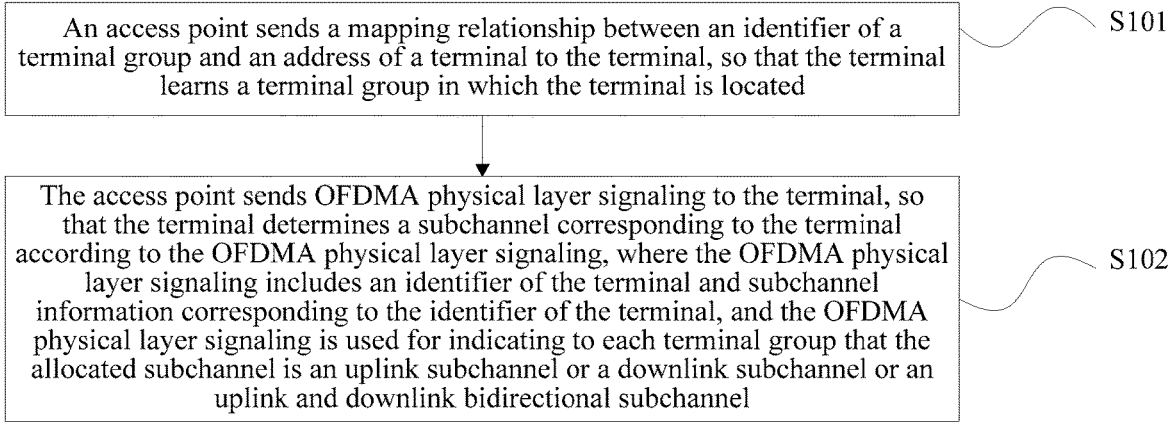
FIG. 1 is a schematic flowchart of Embodiment 2 of a data transmission indication method according to the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A terminal involved in this application, that is, user equipment, may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

An access point (such as a base station) involved in this application may be an access point of a wireless local area network (WLAN), or may refer to a device communicating with a wireless terminal on an air interface in an access network by using one or more sectors. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base transceiver station (BTS) in Global System for Mobile communications (GSM) or code division multiple access (CDMA), may also be a base station (NodeB) in Wideband CDMA (WCDMA), and may further be an evolved NodeB (eNB, or e-NodeB) in Long-Term Evolution (LTE), which is not limited in this application.

Embodiment 1

Embodiment 1 of the present invention provides a data transmission indication method. The method involved in the embodiment is a specific process in which an access point indicates a subchannel to which a terminal corresponds by using OFDMA physical layer signaling. The method includes: sending, by an access point, OFDMA physical layer signaling to a terminal, where the OFDMA physical layer signaling is used for indicating, to the terminal, a subchannel allocated for the terminal, so that the terminal determines the subchannel corresponding to the terminal according to the OFDMA physical layer signaling, where the OFDMA physical layer signaling includes an identifier of the terminal and subchannel information corresponding to the identifier of the terminal.

It should be noted that, there may be one or more terminals in this embodiment of the present invention. The access point performs a same operation on each terminal, and therefore description is performed by using a terminal in this embodiment of the present invention.

Specifically, the access point sends OFDMA physical layer signaling to a terminal in an OFDM mode, that is, the access point may send the OFDMA physical layer signaling to a terminal in a coverage area of the access point, but another terminal in the coverage area of the access point may also listen to obtain and correctly demodulate the OFDMA physical layer signaling. The OFDMA physical layer signaling in this embodiment of the present invention includes an identifier of the terminal and subchannel information corresponding to the identifier of the terminal, and is used for indicating, to the terminal, a subchannel allocated for the terminal, so that each terminal learns a subchannel corresponding to the terminal, and performs a corresponding operation on the subchannel, for example, may receive, on the subchannel corresponding to the terminal, data that belongs to the terminal and is sent by the access point, or may send corresponding response information or uplink data information to the access point on the subchannel corresponding to the terminal. The identifier of the terminal in the foregoing OFDMA physical layer signaling may be an identifier of a single terminal group, or may be identifiers of multiple terminal groups, and a terminal group may include multiple terminals.

A channel bandwidth of a subchannel is not limited in the present invention, and the access point determines the bandwidth of the subchannel according to a bandwidth requirement of a terminal. Moreover, the indicated subchannel may be presented in multiple forms, which may be a center frequency and a bandwidth of the subchannel, or may be a channel number and a bandwidth of a start frequency band, or may be a channel number range from a start frequency band to an end frequency band, which is not limited in the present invention.

A subchannel indicated by the OFDMA physical layer signaling involved in this embodiment for a terminal may correspond to one terminal, or may correspond to multiple terminals. For example, multiple terminals may be grouped into one group, and the OFDMA physical layer signaling allocates a subchannel for this group, and then all the terminals in the group may use the subchannel.

A format of a signaling part in the prior art can only support a bandwidth of 20 MHz, and a user is allocated for each subcarrier for 48 subcarriers; when a bandwidth greater than 20 MHz is used, the prior art has no corresponding expansion solution to support the bandwidth. However, the OFDMA physical layer signaling in this embodiment of the present invention may support a larger bandwidth, and for a quantity of terminals, allocate and indicate an allocated subchannel for multiple terminals, where the subchannel includes one or more subcarriers. Therefore, subjects for this embodiment of the present invention and the prior art are different (in the prior art, the subject is to allocate user for a subcarrier, and in this embodiment of the present invention, the subject is to allocate a subchannel or a subcarrier for a user), the prior art can only perform indication for 48 terminals because of a limitation of subcarriers, and indicating, by OFDMA physical layer signaling, a subchannel for a terminal may be not limited by a bandwidth, subchannels may be allocated for more terminals (users whose quantity exceeds 48) in a larger bandwidth. Certainly, this embodiment of the present invention may still allocate subchannels for terminals whose quantity is less than 48.

In the data transmission indication method provided in this embodiment of the present invention, an access point sends OFDMA physical layer signaling to a terminal, so that each terminal learns a subchannel to which the terminal corresponds, and therefore the terminal may perform a corresponding operation on the subchannel corresponding to the terminal. That is, a manner in which the access point allocates a subchannel for each terminal according to OFDMA physical layer signaling enables the access point to indicate subchannels for more terminals, that is, a quantity of terminals to which the access point indicates subchannels is not limited.

Embodiment 2

FIG. 1 is a schematic flowchart of Embodiment 2 of a data transmission indication method according to the present invention. The method involved in this embodiment is a feasible implementation manner in which a subchannel is indicated to a terminal by using OFDMA physical layer signaling. Further, on the basis of Embodiment 1, the identifier of the terminal may be an identifier of one or more terminal groups, each terminal group includes at least one terminal, and the subchannel information includes an uplink subchannel or a downlink subchannel or an uplink and downlink bidirectional subchannel. The method includes:

S101: An access point sends a mapping relationship between an identifier of a terminal group and an address of a terminal to the terminal, so that the terminal learns a terminal group in which the terminal is located.

Specifically, the terminal needs to know a terminal group to which the terminal belongs, and then can know a subchannel corresponding to the terminal only when the access point allocates subchannels for the terminal group. Therefore, the access point needs to send a mapping relationship between an identifier of a terminal group and an address of a terminal to each terminal, so that each terminal learns a terminal group in which the terminal is located. For a simple manner in which a terminal is informed of a mapping relationship between an identifier of a terminal group and an address of each terminal in a grouping management frame form, reference may be made to Table 1, which is specifically:

TABLE 1

| Group 1 | | | Group 2 | | ... | Group N |
|---|---|---|---|---|---|---|
| Identifier of the first group | Quantity M of terminals in a group | Address of terminal 1 ... | Address of terminal M | Identifier of the second group | ......... | Identifier of the N$^{th}$ group ... |

By using a terminal grouping management frame shown in Table 1, a terminal may learn an identifier of a terminal group in which the terminal is located.

S102: The access point sends OFDMA physical layer signaling to the terminal, so that the terminal determines a subchannel corresponding to the terminal according to the OFDMA physical layer signaling, where the OFDMA physical layer signaling includes an identifier of the terminal and subchannel information corresponding to the identifier of the terminal, and the OFDMA physical layer signaling is used for indicating to each terminal group that the allocated subchannel is an uplink subchannel or a downlink subchannel or an uplink and downlink bidirectional subchannel.

Optionally, the OFDMA physical layer signaling may indicate by using a dedicated indication bit that the subchannel allocated for the terminal is an uplink subchannel or a downlink subchannel or an uplink and downlink bidirectional subchannel. That is, the foregoing OFDMA physical layer signaling not only may indicate an allocated subchannel for the terminal group, but also may indicate, to the terminal group, that an allocated subchannel is an uplink subchannel or a downlink subchannel or an uplink and downlink bidirectional subchannel.

Specifically, the identifier of the terminal is an identifier of one or more terminal groups, and the OFDMA physical layer signaling is used for indicating, to one or more terminal groups, a subchannel allocated for each terminal group, where terminal groups and subchannels are in a one-to-one correspondence.

Related fields included in the indication of the foregoing OFDMA physical layer signaling may be in a format shown in Table 2 below. A group number in Table 2 is used for indicating a grouping identifier of current multiple terminals, and the terminals may be stations (STAs). A field shown in Table 2 may indicate that a subchannel is allocated for each terminal group, and each terminal group herein may include at least one terminal. For example, a terminal group 1 includes STA1 and STA2, a terminal group 2 includes STA3 to STA5, and a group n includes STA k to STA n. According to this indication method, both STA1 and STA2 work on a subchannel 1, STA3 to STA5 work on a subchannel 2, and STA k to STA n all work on a subchannel n. By using this indication, a terminal may learn a subchannel corresponding to the terminal, and the access point may also flexibly schedule a terminal in a terminal group on each allocated subchannel. Additionally, terminal groups may have a common element, for example, the terminal group 1 includes STA1 to STA3, and the terminal group 2 may include STA2 to STA5. Herein, STA2 and STA3 are both in the terminal group 1 and the terminal group 2. In this manner, the access point may allocate, in an effective range of the indication, all subchannels for STAs flexibly, so as to further improve flexibility of scheduling a terminal by the access point.

TABLE 2

| Subchannel information of group 1 | | ... | Subchannel information of group n | |
|---|---|---|---|---|
| Group 1 | Subchannel 1 | ... | Group n | Subchannel n |

In another case, if in a subchannel, an interval between subcarriers in an OFDMA mode is different from an interval between subcarriers in an OFDM mode, and a special case is: the interval between the subcarriers in the OFDM mode is integer multiples (K multiples) of the interval between the subcarriers in the OFDMA mode, effective indication on working subchannels of multiple terminals may be implemented in a manner in which subcarriers in the OFDMA mode are simply grouped. A quantity of subcarriers in the OFDM mode at each 20 MHz (that is, a unit subchannel bandwidth) is 64, and then a quantity of subcarriers in the OFDMA mode is 64*K (* is a product sign), and therefore the access point may allocate 64*K subcarriers in a subchannel to terminals in a terminal group (refer to Table 3), that is, each terminal corresponds to several (one or more) subcarriers. That is, Table 3 is actually detailing of Table 2 as far as a subchannel is concerned, where a subcarrier $k_n$ may be a subcarrier identifier in the OFDMA mode (that is, $k_N=64*K$, and $k_n$ may be any integer from 1 to $k_N$), or may be a subcarrier identifier in the OFDM mode (that is, $k_N=64$). It should be noted that, the prior art cannot support detailing on an interval between subcarriers, and therefore cannot perform indication for more users at 20 MHz.

In a case in which the subcarrier $k_n$ is a subcarrier identifier in the OFDMA mode, an indication unit granularity of the method of this embodiment is specific to each subcarrier of OFDMA (that is, a subcarrier may correspond to a terminal); in a case in which the subcarrier $k_n$ is a subcarrier identifier in the OFDM mode, an indication unit granularity of the method of this embodiment is K subcarriers of OFDMA. Therefore, the embodiment of the present invention method may divide subchannels by using a narrower interval between subcarriers for a unit bandwidth (for example, the unit bandwidth is 20 MHz), and implement effective indication on working subchannels of multiple terminals in a manner in which the divided subchannels are simply grouped.

Additionally, when K=4, each 64 consecutive OFDMA subcarriers occupy a channel unit (5 MHz), and in this case, channel numbers in Embodiment 1 and Embodiment 2 may also continue to be used as an indication manner.

TABLE 3

| Subchannel information of group 1 | ... | Subchannel information of group N |
|---|---|---|
| Group 1  Subcarriers 1 to $k_1$ | ... | Group N  Subcarriers $k_{N-1}+1$ to $k_N$ |

In the data transmission indication method provided in this embodiment of the present invention, an access point sends OFDMA physical layer signaling carrying and including an identifier of a terminal and subchannel information corresponding to the identifier of the terminal to the terminal, and the access point further sends a mapping relationship between an identifier of a terminal group and an address of each terminal to each terminal, so that each terminal learns a terminal group in which the terminal is located, and further learns a subchannel corresponding to the terminal, thereby performing a corresponding operation on the subchannel. That is, a manner in which the access point allocates a subchannel for each terminal according to OFDMA physical layer signaling enables the access point to indicate subchannels for more terminals, that is, a quantity of terminals to which the access point indicates subchannels is not limited.

Embodiment 3

Embodiment 3 of the present invention provides a data transmission indication method. The method involved in this embodiment is another feasible implementation manner in which an access point indicates a subchannel for a terminal by using OFDMA physical layer signaling. On the basis of Embodiment 1, the OFDMA physical layer signaling may include an identifier of a terminal and subchannel information corresponding to the identifier of the terminal; and the identifier of the terminal is an identifier of a single terminal group, and the terminal group includes at least two terminals; and the OFDMA physical layer signaling is used for indicating to each terminal in the terminal group that the allocated subchannel is an uplink subchannel or a downlink subchannel or an uplink and downlink bidirectional subchannel.

Optionally, the OFDMA physical layer signaling may indicate by using a dedicated indication bit that the subchannel allocated for the terminal is an uplink subchannel or a downlink subchannel or an uplink and downlink bidirectional subchannel. The terminals in the terminal group and the subchannels are in a one-to-one correspondence. That is, the foregoing OFDMA physical layer signaling not only may indicate an allocated subchannel for each terminal in the terminal group, but also may indicate, to each terminal in the terminal group, that an allocated subchannel is an uplink subchannel or a downlink subchannel or an uplink and downlink bidirectional subchannel.

Specifically, related fields included in the indication of the foregoing OFDMA physical layer signaling may be in a format shown in Table 4 below. A group number in Table 4 is used for indicating a grouping identifier of the current terminal group, and subchannels following the group number are and STAs in a terminal group corresponding to the group number are in a one-to-one correspondence separately, that is, the access point allocates the subchannel to terminals in the terminal group in sequence. That is, the STAs in the group corresponding to the group number are STA1 to STAn in sequence; then according to the format, STA1 corresponds to a subchannel 1, STA2 corresponds to a subchannel 2, until STA n corresponds to a subchannel n.

In the foregoing case in which an interval between subcarriers in a subchannel in the OFDM mode is different from that in the OFDMA mode, a subchannel allocated by each STA in a group not only may be indicated in a manner of only using a channel number or the like, but also may be indicated in a manner of using a subcarrier range, as shown in Table 4a.

TABLE 4

| Group number | Subchannel 1 | Subchannel 2 | ... | Subchannel n |
|---|---|---|---|---|

TABLE 4a

| Group number | Subcarriers 1 to $k_1$ | Subcarriers $k_1+1$ to $k_2$ | ... | Subcarriers $k_{N-1}+1$ to $k_N$ |
|---|---|---|---|---|

That is, each terminal in the foregoing terminal group corresponds to a different subchannel, and because the OFDMA physical layer signaling may support a larger bandwidth (not limited to a bandwidth of 20 MHz), subchannels may be indicated to more terminals.

In the data transmission indication method provided in this embodiment of the present invention, an access point sends OFDMA physical layer signaling to a terminal, so that each terminal learns a subchannel to which the terminal corresponds, and therefore the terminal may perform a corresponding operation on the subchannel corresponding to the terminal. That is, a manner in which the access point allocates a subchannel for each terminal according to OFDMA physical layer signaling enables the access point to indicate subchannels for more terminals.

Embodiment 4

Figure 2:
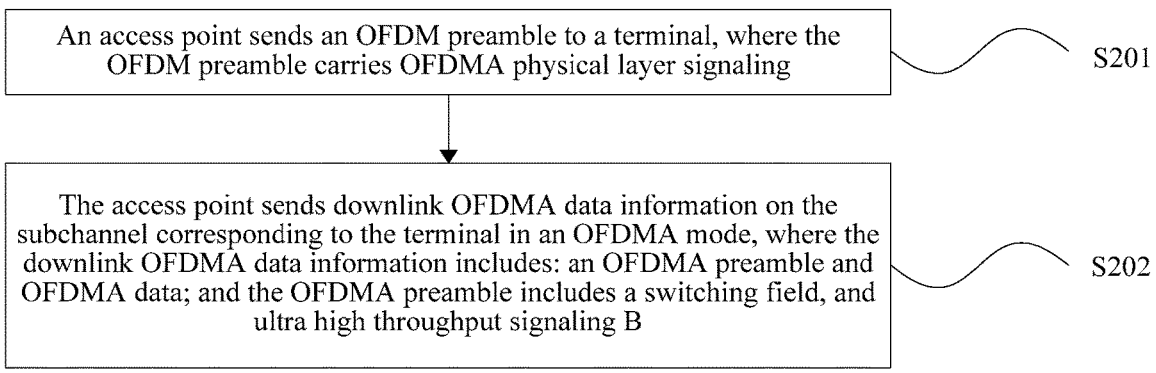
FIG. 2 is a schematic flowchart of Embodiment 4 of a data transmission indication method according to the present invention.

FIG. 2 is a schematic flowchart of Embodiment 4 of a data transmission indication method according to the present invention. The method involved in this embodiment is a process in which an OFDM preamble carrying OFDMA physical layer signaling is sent to a terminal, so that the terminal learns a subchannel corresponding to the terminal according to the OFDMA physical layer signaling, and receives, on the subchannel corresponding to the terminal, downlink OFDMA data information sent by an access point. The method includes:

S201: An access point sends an OFDM preamble to a terminal, where the OFDM preamble carries OFDMA physical layer signaling.

Specifically, the access point sends an OFDM preamble in an OFDM mode to any terminal in a coverage area of the access point, where the OFDM preamble includes a short training field (STF), a long training field (LTF), a legacy signaling (L-SIG), and ultra high throughput signaling A (UHT-SIG-A), and the UHT-SIG-A carries OFDMA physical layer signaling. It should be noted that, the OFDM mode is: the access point sends an OFDM preamble to a terminal, but in this case, the access point does not know the specific terminal to which the OFDM preamble is sent; therefore the access point sends the OFDM preamble to any terminal, and all active terminals listen to and receive the OFDM preamble, and then obtain OFDMA physical layer signaling, thereby learning channels corresponding to the terminals.

It should be noted that, for a manner in which OFDMA physical layer signaling indicates a subchannel in this embodiment of the present invention, reference may be made to the description in Embodiment 1 to Embodiment 3, and details are not described herein again in this embodiment of the present invention.

S202: The access point sends downlink OFDMA data information on the subchannel corresponding to the terminal in an OFDMA mode, where the downlink OFDMA data information includes: an OFDMA preamble and OFDMA data symbol; and the OFDMA preamble includes a switching field, and ultra high throughput signaling B (UHT-SIG-B).

Specifically, the access point sends the downlink OFDMA data information on the subchannel corresponding to the terminal in the OFDMA mode, that is, the access point may send the downlink OFDMA data information to multiple terminals on respective subchannels corresponding to the terminals at the same time, and therefore signaling overheads can be reduced and a multi-user diversity gain can be brought about. Additionally, the subchannel corresponding to the terminal may further include a primary channel of a basic service set (BSS), where the primary channel is used by the access point and the terminal to exchange control signaling and management signaling; that is, after sending the OFDMA physical layer signaling on the primary channel completely, the access point may release the primary channel; or may send the downlink OFDMA data information to the terminal by using the primary channel together with another subchannel.

For a data transmission frame format of the OFDM preamble and the downlink OFDMA data information, reference may be made to Table 5 below. Moreover, when being sent together, both the OFDMA physical layer signaling and the OFDMA data may use a format in Table 5; if only the OFDMA physical layer signaling is sent individually, only the OFDM preamble is sent.

TABLE 5

| OFDM preamble part | | | | Downlink OFDMA data information part | | |
|---|---|---|---|---|---|---|
| STF | LTF | L-SIG | UHT-SIG-A | Switching Field | UHT-SIG-B | Data Symbol |

It should be noted that, content transmitted in the OFDMA mode is independent from each other for each terminal, that is, Switching Fields, UHT-SIG-B and OFDMA data on respective subchannels corresponding to terminals are all independent from each other. The foregoing Switching Field may include an ultra high throughput short training field (UHT-STF) and an ultra high throughput long training field (UHT-LTF). In the OFDMA mode, the UHT-STF is used by the terminal to complete automatic gain control (AGC) or channel synchronization of a subchannel indicated by OFDMA physical layer signaling or all channels. The UHT-LTF is used by the terminal to complete channel estimation on a subchannel or all channels. If physical layer signaling in the UHT-SIG-A only performs channel allocation on a terminal group, the UHT-SIG-B may be used by a transmitting end to perform further indication on a terminal in a terminal group corresponding to a subchannel in the subchannel.

If in an OFDMA+MU-MIMO mode, the UHT-STF is used by the terminal to perform AGC or channel synchronization on a subchannel indicated by OFDMA physical layer signaling or all channels and corresponding space-time streams, the UHT-LTF is used by the terminal to perform channel estimation on a subchannel indicated by OFDMA physical layer signaling or all channels and subchannels of corresponding space-time streams. Moreover, space-time stream allocation information of MU-MIMO may be carried in the UHT-SIG-A, or may be carried in the UHT-SIG-B.

Figure 2A:
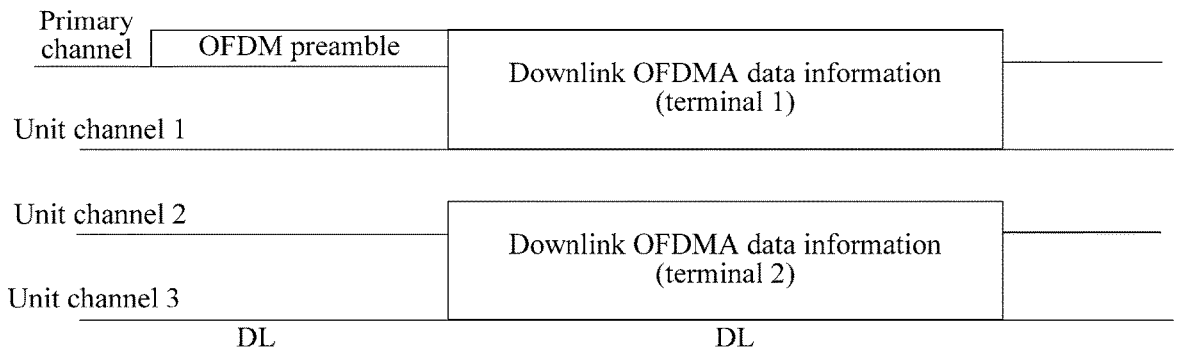
FIG. 2a is a schematic diagram 1 of data transmission according to the present invention.
Figure 2B:
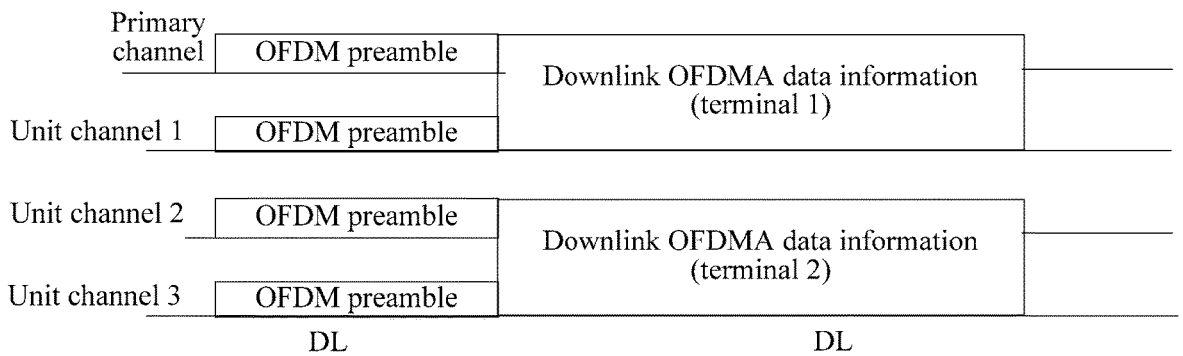
FIG. 2b is a schematic diagram 2 of data transmission according to the present invention.
Figure 2C:
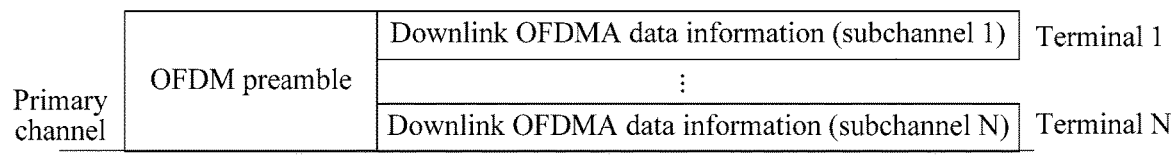
FIG. 2c is a schematic diagram 3 of data transmission according to the present invention.
Figure 2D:
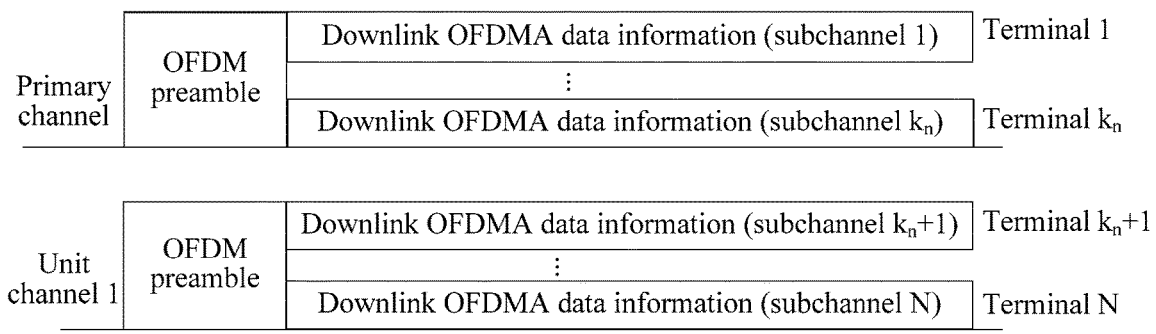
FIG. 2d is a schematic diagram 4 of data transmission according to the present invention.

Additionally, the access point may send an OFDM preamble on the primary channel in the OFDM mode (refer to an example in FIG. 2a), or may send an OFDM preamble on multiple subchannels in a repetitive manner (refer to an example in FIG. 2b). Then, the access point is switched to the OFDMA mode, and sends an OFDMA preamble and OFDMA data to the terminal on the foregoing indicated subchannel. On the other hand, in a case in which an interval between subcarriers of OFDM is different from that of OFDMA (an example in which a unit channel is 20 MHz is used), for the sending, by the access point, the OFDM preamble and the downlink OFDMA data information, reference may be made to an example in FIG. 2c, that is, this unit channel (which is a primary channel in the figure) is divided into multiple subcarriers, and one or more subcarriers correspond to a terminal; in a case in which an interval between subcarriers of OFDM is different from that of OFDMA, and a bandwidth is a sum of bandwidths of multiple unit channels, for the sending, by the access point, the OFDM preamble and the downlink OFDMA data information, reference may be made to an example in FIG. 2d.

Correspondingly, the terminal detects and receives the OFDM preamble in an idle state and in the OFDM mode, and after receiving the OFDM preamble in the OFDM mode (the OFDM preamble may be received on the primary channel, or may be received on multiple subchannels), the terminal reads the OFDMA physical layer signaling in the UHT-SIG-A in the OFDM manner; and is switched to the subchannel indicated by the OFDMA physical layer signaling, adjusts AGC again, completes estimation on channel state information of the corresponding subchannel, and demodulates the downlink OFDMA data information on the corresponding subchannel, to obtain the OFDMA preamble and the OFDMA data that belong to the terminal.

Another receiving method of the terminal is: the terminal detects and receives the OFDM preamble in an idle state and in the OFDM mode, and after receiving the OFDM preamble in the OFDM mode (the OFDM preamble may be received on the primary channel, or may be received on multiple subchannels), the terminal reads the OFDMA physical layer signaling in the UHT-SIG-A in the OFDM manner; and is switched to an entire bandwidth occupied this time the access point sends data, adjusts AGC again, completes estimation on channel state information of the subchannel indicated by the OFDMA physical layer signaling or estimation on channel state information of the entire bandwidth, and demodulates the downlink OFDMA data information on the corresponding subchannel, to obtain the OFDMA preamble and the OFDMA data that belong to the terminal.

In the data transmission indication method provided in this embodiment of the present invention, an access point sends an OFDM preamble carrying OFDMA physical layer signaling to a terminal, so that the terminal may obtain OFDMA physical layer signaling from the OFDM preamble, thereby learning, according to the OFDMA physical layer signaling, a subchannel on which the terminal should receive downlink OFDMA data information corresponding to the terminal. That is, a manner in which the access point allocates a subchannel for each terminal according to OFDMA physical layer signaling enables the access point to perform an indication for more terminals when receiving data of the access point, that is, a quantity of terminals to which the access point indicates subchannels is not limited.

Embodiment 5

Figure 3:
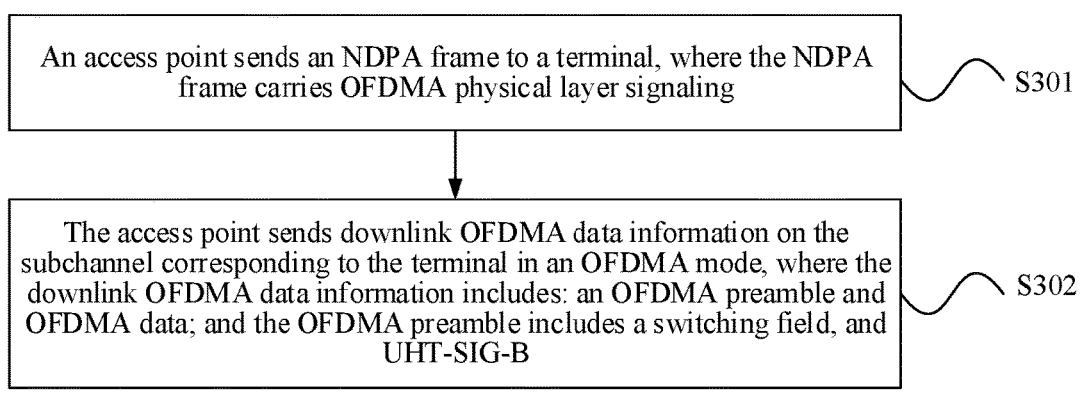
FIG. 3 is a schematic flowchart of Embodiment 5 of a data transmission indication method according to the present invention.

FIG. 3 is a schematic flowchart of Embodiment 5 of a data transmission indication method according to the present invention. The method involved in this embodiment is a process in which an access point sends a null data packet announcement (NDPA) frame carrying OFDMA physical layer signaling to a terminal, so that the terminal obtains the OFDMA physical layer signaling from the NDPA frame, and therefore the terminal learns a subchannel corresponding to the terminal according to the OFDMA physical layer signaling, and receives, on the subchannel corresponding to the terminal, downlink OFDMA data information sent by an access point. The method includes:

S301: An access point sends an NDPA frame to a terminal, where the NDPA frame carries the foregoing OFDMA physical layer signaling.

Specifically, an exclusive NDPA frame is used in this embodiment of the present invention to carry OFDMA physical layer signaling, and is used for reducing overheads brought about when the OFDMA physical layer signaling is transmitted. A format of the NDPA frame in this embodiment of the present invention is shown in Table 6, which is specifically:

TABLE 6

| Frame control | Time length | Terminal address | Access point address | Control information | Information about user (group) 1 | ... | Information about user (group) n | Frame error correction sequence |
|---|---|---|---|---|---|---|---|---|

Figure 3A:
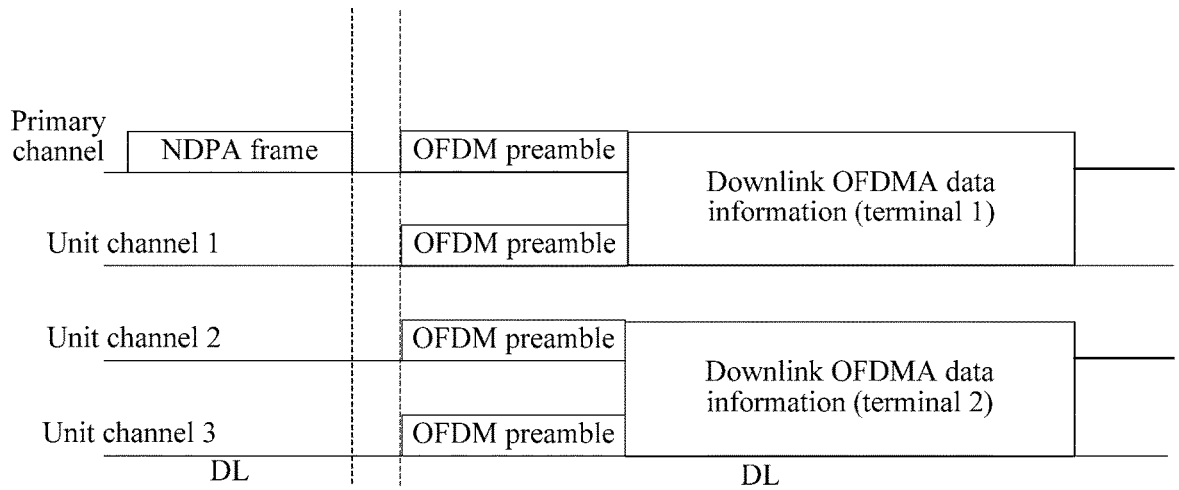
FIG. 3a is a schematic diagram 5 of data transmission according to the present invention.
Figure 3B:
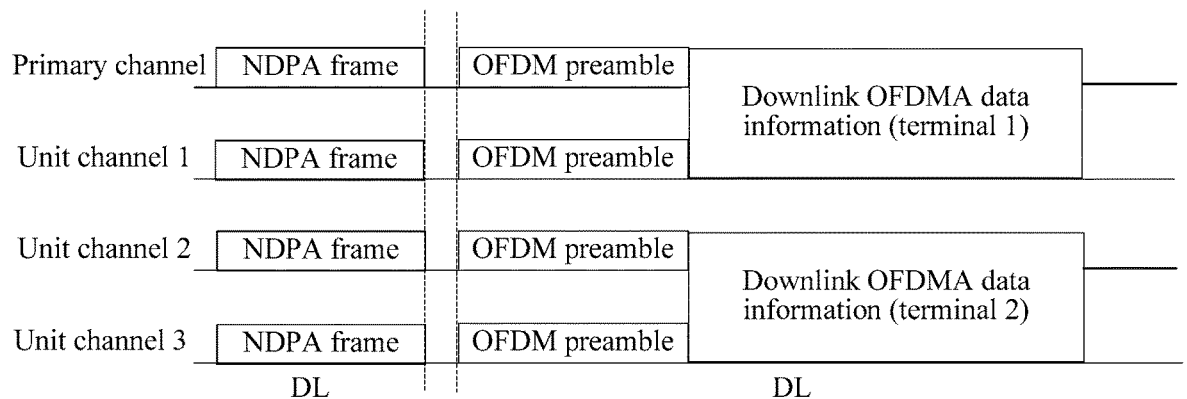
FIG. 3b is a schematic diagram 6 of data transmission according to the present invention.

It should be noted that, the access point may send an NDPA frame to a terminal in a coverage area of the access point in an OFDM mode, and may send the NDPA frame on a subchannel (such as a primary channel) (refer to an example in FIG. 3a), or may send the NDPA frame on multiple subchannels (refer to an example in FIG. 3b), and all other terminals may listen to obtain the NDPA frame. Then, the access point further needs to send an OFDM preamble in the OFDM mode. The foregoing OFDMA physical layer signaling may be carried in the NDPA frame, or may be carried in both the NDPA frame and the OFDM preamble, but is generally only carried in the NDPA frame to reduce signaling overheads. Optionally, when the NDPA frame carries the OFDMA physical layer signaling, the OFDM preamble may further indicate a specific terminal identifier in a terminal group.

It should be noted that, for a manner in which OFDMA physical layer signaling indicates a subchannel in this embodiment of the present invention, reference may be made to the description in Embodiment 1 to Embodiment 3, and details are not described herein again in this embodiment of the present invention.

S302: The access point sends downlink OFDMA data information on the subchannel corresponding to the terminal in an OFDMA mode, where the downlink OFDMA data information includes: an OFDMA preamble and OFDMA data; and the OFDMA preamble includes a switching field and UHT-SIG-B.

Specifically, the access point sends the downlink OFDMA data information in the OFDMA mode, that is, the access point may send the downlink OFDMA data information to multiple terminals on respective subchannels corresponding to terminals at the same time, and therefore corresponding time frequency resources may be fully used.

Correspondingly, the terminal detects and receives the NDPA frame in the OFDM manner in an idle state, and reads the OFDMA physical layer signaling in the OFDM manner; and then the terminal also receives the OFDM preamble in the OFDM manner; and is switched to the OFDMA mode by using the subchannel indicated by the OFDMA physical layer signaling, and receives, on the subchannel, the OFDMA preamble and the OFDMA data that are sent by the access point in the OFDMA mode.

In the data transmission indication method provided in this embodiment of the present invention, an access point sends an NDPA frame carrying OFDMA physical layer signaling to a terminal, so that the terminal may obtain OFDMA physical layer signaling from the NDPA frame, thereby learning, according to the OFDMA physical layer signaling, a subchannel on which the terminal should receive downlink OFDMA data information corresponding to the terminal, so as to receive, on the corresponding subchannel, the downlink OFDMA data information sent by the access point. That is, a manner in which the access point allocates a subchannel for each terminal according to OFDMA physical layer signaling enables the access point to perform an indication for more terminals when receiving data of the access point, that is, a quantity of terminals to which the access point indicates subchannels is not limited. Additionally, the access point may send the downlink OFDMA data information to multiple terminals on respective subchannels corresponding to terminals at the same time, and therefore corresponding time frequency resources may be fully used.

Embodiment 6

Figure 4:
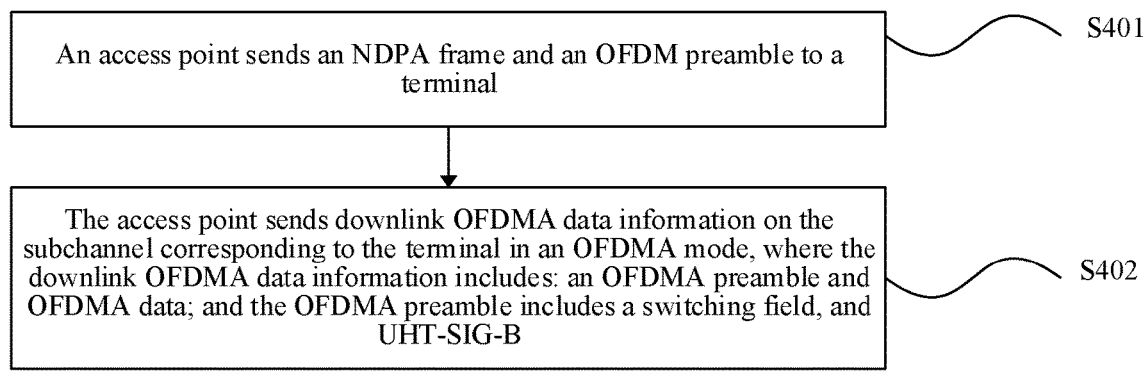
FIG. 4 is a schematic flowchart of Embodiment 6 of a data transmission indication method according to the present invention.

FIG. 4 is a schematic flowchart of Embodiment 6 of a data transmission indication method according to the present invention. The method involved in this embodiment is a process in which an access point sends an NDPA frame and an OFDM preamble separately carrying content included in OFDMA physical layer signaling to a terminal, so that the terminal obtains the OFDMA physical layer signaling from the NDPA frame and the OFDM preamble, and therefore the terminal learns a subchannel corresponding to the terminal according to the OFDMA physical layer signaling, and receives, on the subchannel corresponding to the terminal, downlink OFDMA data information sent by an access point. The method includes:

S401: An access point sends an NDPA frame and an OFDM preamble to a terminal.

Specifically, the NDPA frame and the OFDM preamble may carry the OFDMA physical layer signaling in two cooperative manners, which are separately:

First manner: An access point sends an NDPA frame and an OFDM preamble to a terminal, where the NDPA frame carries an identifier of the terminal in the foregoing OFDMA physical layer signaling, and the OFDM preamble carries subchannel information corresponding to the identifier of the terminal and being in the foregoing OFDMA physical layer signaling. The identifier of the terminal herein may be an identifier of one or more terminal groups in Embodiment 2, and subchannels and terminal groups are in a one-to-one correspondence; and may be further an identifier of a single terminal group in Embodiment 3, and subchannels and terminals in the group are in a one-to-one correspondence.

Second manner: An access point sends an NDPA frame and an OFDM preamble to a terminal, where the NDPA frame carries subchannel information corresponding to an identifier of the terminal and being in the foregoing OFDMA physical layer signaling, and the OFDM preamble carries the identifier of the terminal in the foregoing OFDMA physical layer signaling. The identifier of the terminal herein may be an identifier of one or more terminal groups in Embodiment 2, and subchannels and terminal groups are in a one-to-one correspondence; and may be further an identifier of a single terminal group in Embodiment 3, and subchannels and terminals in the group are in a one-to-one correspondence.

That is, the NDPA frame and the OFDM preamble may cooperate with each other to indicate the OFDMA physical layer signaling. A user group information field in Table 5 may include the identifier of the terminal, and may further include the subchannel information corresponding to the identifier of the terminal. Additionally, a control information field of Table 5 may further indicate an effective time length of subchannel information of a currently indicated terminal or terminal group, so that the terminal can determine according to the time length whether the indication of the subchannel information of the terminal or terminal group is valid or expired, and if not expired, the terminal may continue to use the current subchannel to receive and send data.

If the NDPA frame carries the identifier of the terminal and the subchannel information corresponding to the identifier of the terminal (that is, carries complete OFDMA physical layer signaling), the OFDM preamble may not carry the identifier of the terminal or the subchannel information corresponding to the identifier of the terminal again (the OFDM preamble may also carry the OFDMA physical layer signaling, specific explanation has been described in the foregoing embodiment, and details are not described herein again); or if the NDPA frame only carries the identifier of the terminal, the OFDM preamble further needs to carry the subchannel information corresponding to the identifier of the terminal and being in the NDPA frame; or if the NDPA frame only carries the subchannel information, the OFDM preamble further needs to carry the identifier of the terminal corresponding to the subchannel information and being in the NDPA frame.

It should be noted that, for a manner in which OFDMA physical layer signaling indicates a subchannel in this embodiment of the present invention, reference may be made to the description in Embodiment 1 to Embodiment 3, and details are not described herein again in this embodiment of the present invention.

S402: The access point sends downlink OFDMA data information on the subchannel corresponding to the terminal in an OFDMA mode, where the downlink OFDMA data information includes: an OFDMA preamble and OFDMA data; and the OFDMA preamble includes a switching field (Switching Field) and UHT-SIG-B.

Specifically, the access point sends the downlink OFDMA data information in the OFDMA mode, that is, the access point may send the downlink OFDMA data information to multiple terminals on respective subchannels corresponding to terminals at the same time, and therefore corresponding time frequency resources may be fully used.

Correspondingly, the terminal receives the NDPA frame in the OFDM manner in an idle state, and reads a part of the OFDMA physical layer signaling carried in the NDPA frame in the OFDM manner; then the terminal also receives the OFDM preamble in the OFDM manner, and then reads that part of content that is supplemented for the OFDMA physical layer signaling and in the OFDM preamble; and then is switched, according to a subchannel indicated by the OFDMA physical layer signaling obtained by combining the NDPA frame and the OFDM preamble, to the OFDMA mode to read/demodulate the OFDMA preamble and the OFDMA data of the terminal on the subchannel corresponding to the terminal.

In the data transmission indication method provided in this embodiment of the present invention, an access point sends an NDPA frame and an OFDM preamble that carry OFDMA physical layer signaling to a terminal, so that each terminal may learn, by using the NDPA frame and the OFDM preamble, a subchannel on which the terminal should receive downlink OFDMA data information corresponding to the terminal, so as to receive the downlink OFDMA data information sent by the access point. That is, a manner in which the access point allocates a subchannel for each terminal according to OFDMA physical layer signaling enables the access point to perform an indication for more terminals when receiving data of the access point, that is, a quantity of terminals to which the access point indicates subchannels is not limited. Additionally, the access point may send the downlink OFDMA data information to multiple terminals on respective subchannels corresponding to terminals at the same time, and therefore corresponding time frequency resources may be fully used.

Further, on the basis of the embodiments shown in FIG. 2 to FIG. 4, as a feasible implementation manner of the embodiments of the present invention, the method involved in this embodiment is a process in which after sending downlink OFDMA data information to a terminal, an access point receives an ACK response or a BA response that is sent by the terminal on a corresponding subchannel. Optionally, the foregoing OFDMA physical layer signaling or OFDMA data carries an OFDMA ACK request or an OFDMA BA request, and the OFDMA ACK request or the OFDMA BA request is used for instructing the terminal to send an ACK response or a BA response to the access point in an OFDMA mode; and then the foregoing OFDMA physical layer signaling is further used for indicating the subchannel that corresponds to the terminal, on which the ACK response or the BA response is sent to the access point and that is allocated for the terminal. After S202 or S302 or S402, an operation of S10 may be performed:

S10: The access point receives the ACK response or the BA response that is sent by the terminal on the subchannel corresponding to the terminal in the OFDMA mode.

Figure 4A:
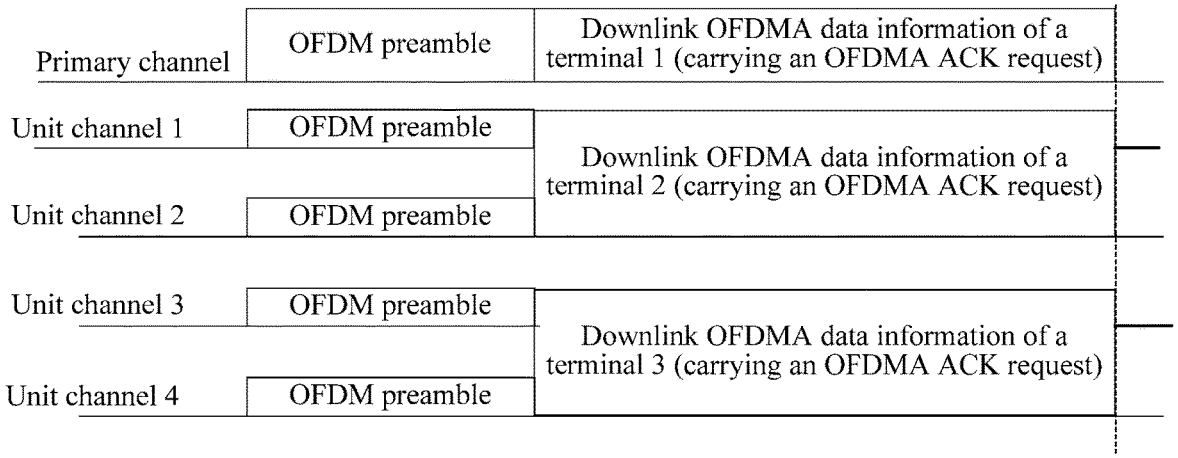
FIG. 4a is a schematic diagram 7 of data transmission according to the present invention.

Specifically, to indicate that the downlink OFDMA data information sent by the access point is correctly received by each terminal, each terminal needs to reply to the access point with an ACK response or a BA response. If the access point adds the OFDMA ACK request or OFDMA BA request to the OFDMA data or OFDMA physical layer signaling (referring to FIG. 4a, an example in which the access point adds the OFDMA ACK request is used), after receiving the downlink OFDMA data information on the subchannel corresponding to the terminal according to the indication of the OFDMA physical layer signaling of the access point, the terminal may directly reply with an ACK or BA response in the OFDMA mode on the subchannel indicated by the OFDMA physical layer signaling. The ACK response corresponds to the OFDMA ACK request, and the BA response corresponds to the OFDMA BA request. Then, the access point receives ACK responses or BA responses that are sent by terminals on respective corresponding subchannels. That is, multiple terminals are enabled to send responses to the access point on subchannels corresponding to the terminals at the same time, and corresponding time frequency resources are fully used.

In the data transmission indication method provided in this embodiment of the present invention, a terminal receives, on a subchannel indicated by OFDMA physical layer signaling, downlink OFDMA data information sent by an access point, and multiple terminals may send ACK responses or BA responses to the access point at the same time on corresponding subchannels, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Further, on the basis of the embodiments shown in FIG. 2 to FIG. 4, as another feasible implementation manner of the embodiments of the present invention, the method involved in this embodiment is a process in which after sending OFDMA physical layer signaling and downlink OFDMA data information to a terminal, an access point sends a single ACK request frame or BA request frame to the terminal, so that the terminal can send an ACK response or a BA response to the access point on a subchannel indicated by the OFDMA physical layer signaling.

The foregoing OFDMA physical layer signaling may be further used for indicating the subchannel that corresponds to the terminal, on which the ACK response or the BA response is sent to the access point and that is allocated for the terminal. After S202 or S302 or S402, the following steps may be performed:

S20: An access point sends an ACK request frame or a BA request frame to a terminal, where the ACK request frame or the BA request frame includes a dedicated information bit, and the dedicated information bit is used for instructing the terminal to send the ACK response or the BA response to the access point in the OFDMA mode.

Figure 4B:
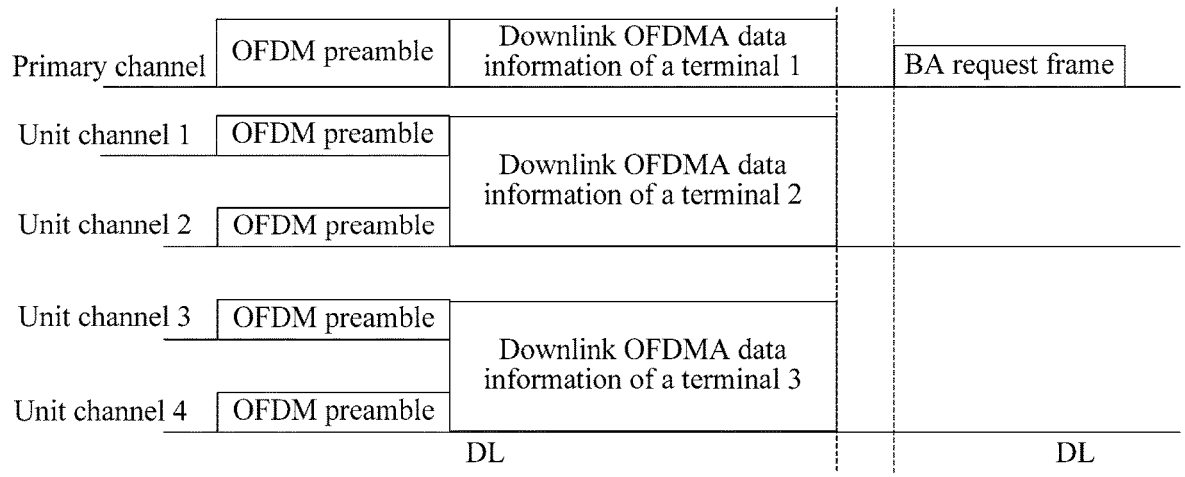
FIG. 4b is a schematic diagram 8 of data transmission according to the present invention.

Specifically, after sending the downlink OFDMA data information to the terminal, the access point may further send a single ACK request frame or BA request frame to the terminal (referring to FIG. 4b, an example in which a BA request frame is individually sent is used), where the ACK request frame or the BA request frame includes a dedicated information bit, and the dedicated information bit is used for instructing the terminal to send the ACK response or the BA response to the access point in the OFDMA mode. Optionally, the ACK request frame or the BA request frame may carry the OFDMA physical layer signaling, or may not carry the OFDMA physical layer signaling. The terminal determines, according to the OFDMA physical layer signaling, a subchannel on which the terminal sends the ACK response or the BA response to the access point. If the ACK request frame or the BA request frame does not carry the OFDMA physical layer signaling, the terminal replies with an ACK response or a BA response on a subchannel corresponding to each terminal when the access point sends downlink OFDMA data, that is, the terminal may use a subchannel on which the terminal receives the downlink OFDMA data information as a subchannel on which the terminal replies with the ACK response or BA response.

Representation of the dedicated information bit may be to identify the ACK request frame or the BA request frame as a frame type used for instructing the terminal to send an ACK response or a BA response to the access point in the OFDMA mode (that is, a new frame type different from a conventional ACK request frame or BA request frame). Representation of another dedicated information bit may also be: in a case in which a frame type of the ACK request frame or BA request frame is not changed, the dedicated information bit is directly used for instructing the terminal to send an ACK response or a BA response to the access point in the OFDMA mode.

Additionally, similar to the OFDM preamble, the ACK request frame or BA request frame may be sent only on the primary channel, or may be sent on all subchannels in a duplicated transmission manner.

S21: The access point receives the ACK response or the BA response that is sent by the terminal on the corresponding subchannel in the OFDMA mode.

Specifically, after learning, according to the OFDMA physical layer signaling, the subchannel on which the terminal sends the ACK response or BA response to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and corresponding time frequency resources are fully used.

Optionally, if the subchannel of the terminal is multiple unit channels (such as, channels whose unit is 20 MHz), the terminal may send an ACK responses or a BA responses on these multiple unit channels in the duplicated transmission manner, or may send an ACK responses or a BA responses in a non-duplicated transmission manner.

In the data transmission indication method provided in this embodiment of the present invention, a subchannel on which an ACK response or a BA response is sent to an access point is indicated to a terminal by using OFDMA physical layer signaling sent by the access point. That is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 7

Figure 5:
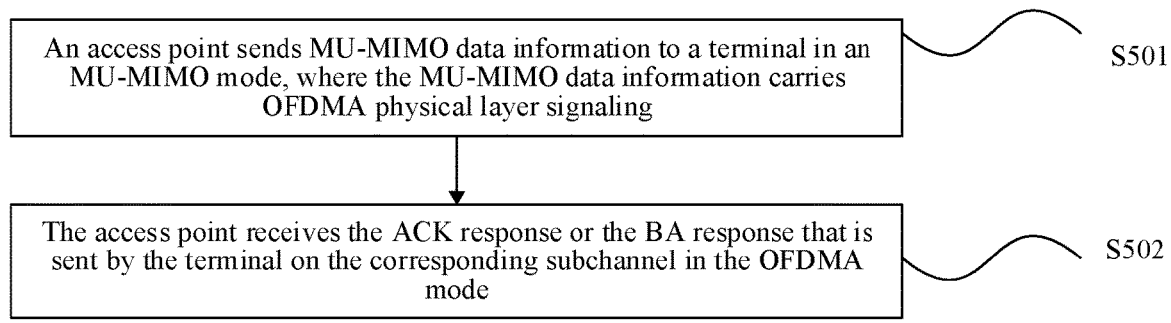
FIG. 5 is a schematic flowchart of Embodiment 7 of a data transmission indication method according to the present invention.

FIG. 5 is a schematic flowchart of Embodiment 7 of a data transmission indication method according to the present invention. The method involved in this embodiment is a process in which an access point sends MU-MIMO data information carrying OFDMA physical layer signaling to a terminal, and an OFDMA ACK request or an OFDMA BA request is carried in the OFDMA physical layer signaling, so that the terminal replies with an ACK response or a BA response on a subchannel corresponding to the terminal in an OFDMA mode. As shown in FIG. 5, the method includes:

S501: An access point sends MU-MIMO data information to a terminal in a MU-MIMO mode, where the MU-MIMO data information carries OFDMA physical layer signaling.

Specifically, the OFDMA physical layer signaling carried in the foregoing MU-MIMO data information includes an OFDMA ACK request or OFDMA BA request, used for instructing the terminal to send an ACK response or a BA response to the access point in the OFDMA mode, that is, the access point requests the terminal to reply with an ACK response or a BA response after the terminal obtains the corresponding MU-MIMO data information. The OFDMA physical layer signaling is used for indicating, to the terminal, the subchannel on which the ACK response or the BA response is sent to the access point and that is allocated for the terminal.

S502: The access point receives the ACK response or the BA response that is sent by the terminal on the corresponding subchannel in an OFDMA mode.

Specifically, after determining, according to the OFDMA physical layer signaling, the subchannel on which the ACK response or BA response is sent to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, an access point adds OFDMA physical layer signaling to MU-MIMO data information sent to a terminal, where the OFDMA physical layer signaling is used for indicating, to the terminal, a subchannel that sends an ACK response or a BA response to the access point and is allocated for the terminal, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 8

Figure 6:
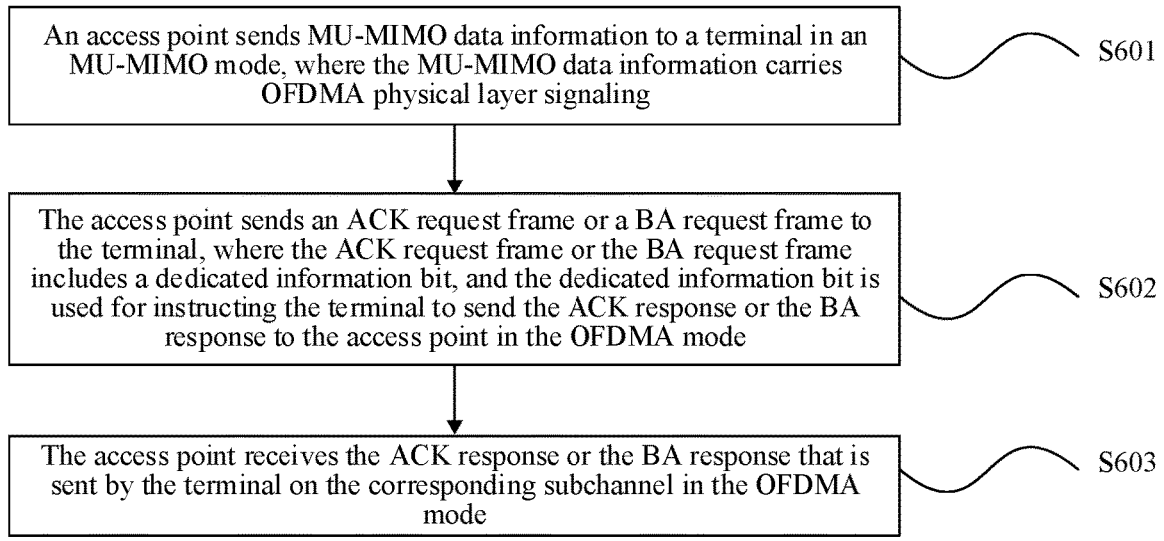
FIG. 6 is a schematic flowchart of Embodiment 8 of a data transmission indication method according to the present invention.

FIG. 6 is a schematic flowchart of Embodiment 8 of a data transmission indication method according to the present invention. The method involved in this embodiment is a process in which an access point sends MU-MIMO data information carrying OFDMA physical layer signaling to a terminal, and sends an ACK request frame or a BA request frame to the terminal, so that the terminal replies with an ACK response or a BA response on a subchannel corresponding to the terminal in an OFDMA mode. As shown in FIG. 6, the method includes:

S601: An access point sends MU-MIMO data information to a terminal in a MU-MIMO mode, where the MU-MIMO data information carries OFDMA physical layer signaling.

Specifically, the OFDMA physical layer signaling is used for indicating, to the terminal, the subchannel on which the ACK response or the BA response is sent to the access point and that is allocated for the terminal.

S602: The access point sends an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode.

Specifically, the ACK request frame or the BA request frame sent by the access point to the terminal has an objective that lies in that the access point requests the terminal to reply to the access point with an ACK response or a BA response to the terminal in the OFDMA mode after the terminal obtains corresponding MU-MIMO data information, so as to learn whether the MU-MIMO data information is transmitted successfully.

S603: The access point receives the ACK response or the BA response that is sent by the terminal on the corresponding subchannel in the OFDMA mode.

Specifically, after determining, according to the OFDMA physical layer signaling, the subchannel on which the ACK response or BA response is sent to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, an access point adds OFDMA physical layer signaling to MU-MIMO data information sent to a terminal, where the OFDMA physical layer signaling is used for indicating, to the terminal, a subchannel that sends an ACK response or a BA response to the access point and is allocated for the terminal, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 9

Figure 7:
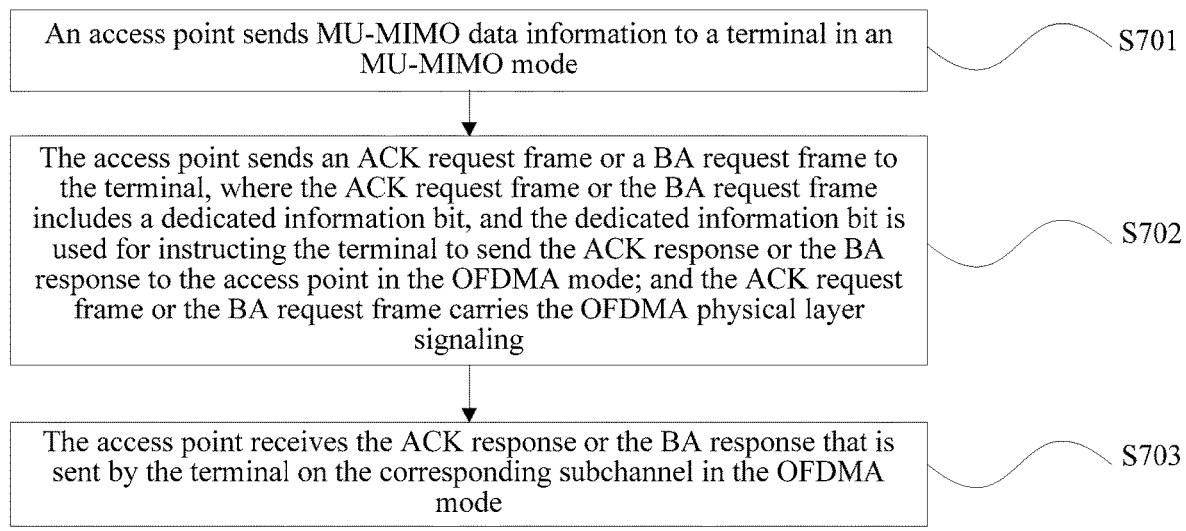
FIG. 7 is a schematic flowchart of Embodiment 9 of a data transmission indication method according to the present invention.

FIG. 7 is a schematic flowchart of Embodiment 9 of a data transmission indication method according to the present invention. The method involved in this embodiment is a process in which an access point sends an ACK request frame or a BA request frame carrying OFDMA physical layer signaling to a terminal, so that the terminal replies with an ACK response or a BA response on a subchannel corresponding to the terminal in an OFDMA mode. As shown in FIG. 7, the method includes:

S701: An access point sends MU-MIMO data information to a terminal in a MU-MIMO mode.

S702: The access point sends an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the ACK request frame or the BA request frame carries the OFDMA physical layer signaling.

Specifically, the ACK request frame or the BA request frame sent by the access point to the terminal has an objective that lies in that the access point requests the terminal to reply to the access point with an ACK response or a BA response to the terminal in the OFDMA mode after the terminal obtains corresponding MU-MIMO data information, so as to learn whether the MU-MIMO data information is transmitted successfully. The OFDMA physical layer signaling carried in the ACK request frame or the BA request frame is used for indicating, to the terminal, the subchannel on which the ACK response or the BA response is sent to the access point and that is allocated for the terminal.

S703: The access point receives the ACK response or the BA response that is sent by the terminal on the corresponding subchannel in the OFDMA mode.

Specifically, after determining, according to the OFDMA physical layer signaling, the subchannel on which the ACK response or BA response is sent to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, an access point adds OFDMA physical layer signaling to an ACK request frame or a BA request frame sent to a terminal, where the OFDMA physical layer signaling is used for indicating, to the terminal, a subchannel that sends an ACK response or a BA response to the access point and is allocated for the terminal, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 10

Figure 8:
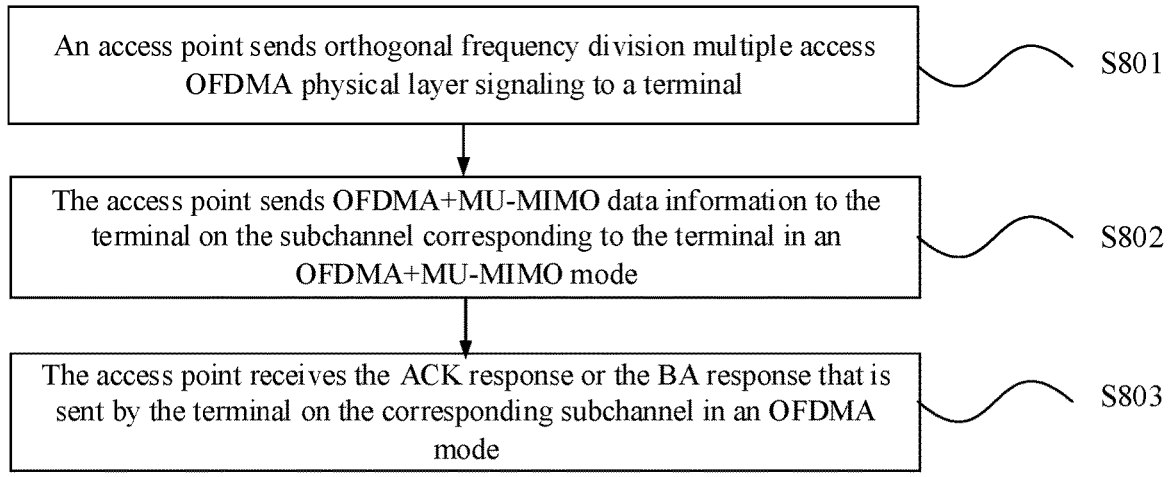
FIG. 8 is a schematic flowchart of Embodiment 10 of a data transmission indication method according to the present invention.

FIG. 8 is a schematic flowchart of Embodiment 10 of a data transmission indication method according to the present invention. The method involved in this embodiment is a process in which an access point sends OFDMA physical layer signaling carrying an OFDMA ACK request or an OFDMA BA request to a terminal, so that the terminal replies with an ACK response or a BA response on a subchannel corresponding to the terminal in an OFDMA mode. As shown in FIG. 8, the method includes:

S801: An access point sends OFDMA physical layer signaling to a terminal.

Specifically, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode, that is, the access point requests the terminal to reply to the access point with an ACK response or a BA response after the terminal obtains corresponding OFDMA+MU-MIMO data information, so as to learn whether the following OFDMA+MU-MIMO data information is transmitted successfully. The OFDMA physical layer signaling is used for indicating, to the terminal, the corresponding subchannel on which the ACK response or the BA response is sent to the access point and that is allocated for the terminal.

S802: The access point sends OFDMA+MU-MIMO data information to the terminal on the subchannel corresponding to the terminal in an OFDMA+MU-MIMO mode.

Optionally, the OFDMA+MU-MIMO data information may carry the OFDMA physical layer signaling, or may not carry the OFDMA physical layer signaling.

S803: The access point receives the ACK response or the BA response that is sent by the terminal on the corresponding subchannel in an OFDMA mode.

Specifically, after determining, according to the OFDMA physical layer signaling, the subchannel on which the ACK response or the BA response is sent to the access point, the terminal sends the ACK response or the BA response to the access point on the corresponding subchannel in the OFDMA or OFDMA+MU-MIMO mode (in this case, the access point not only needs to indicate allocation of the subchannel in the OFDMA physical layer signaling, but also needs to further indicate a MU-MIMO space-time stream allocation situation in each subchannel). That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, an access point sends OFDMA physical layer signaling to a terminal, where the OFDMA physical layer signaling is used for indicating, to the terminal, a subchannel that sends an ACK response or a BA response to the access point and is allocated for the terminal, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 11

Figure 9:
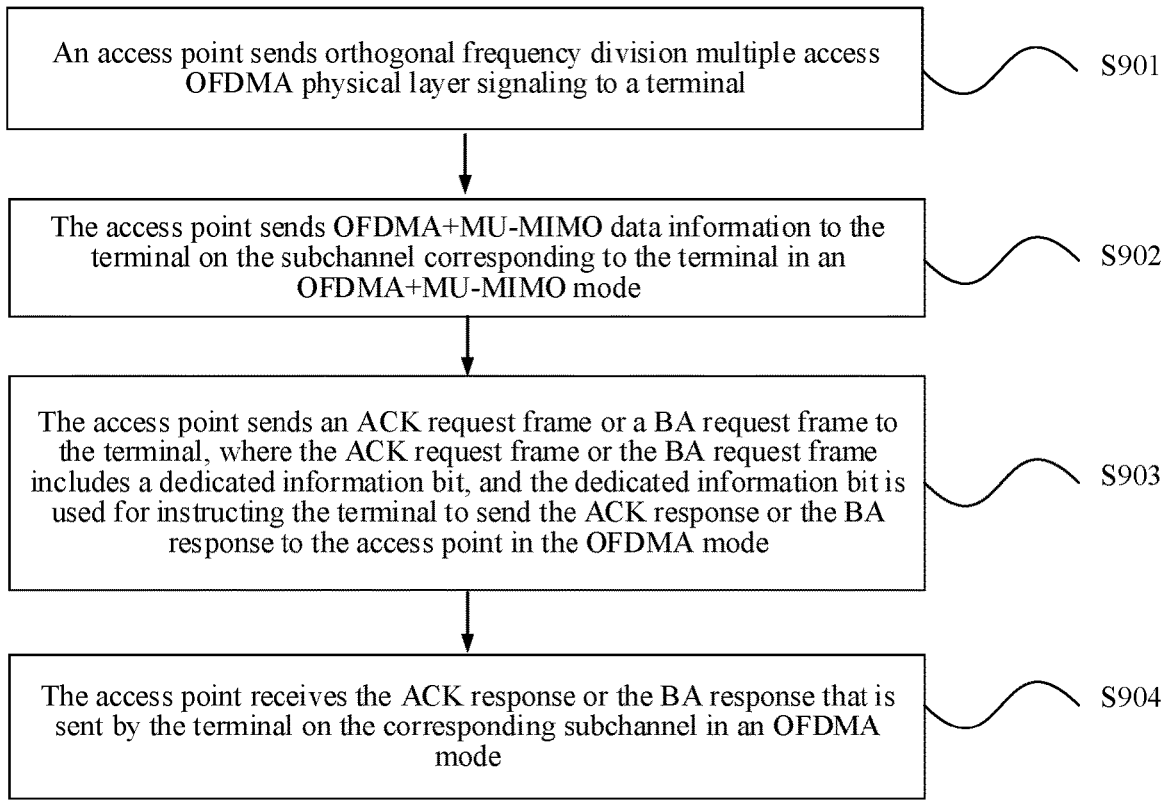
FIG. 9 is a schematic flowchart of Embodiment 11 of a data transmission indication method according to the present invention.

FIG. 9 is a schematic flowchart of Embodiment 11 of a data transmission indication method according to the present invention. The method involved in this embodiment is a process in which an access point sends OFDMA physical layer signaling, and an ACK request frame or a BA request frame to a terminal, so that the terminal replies with an ACK response or a BA response on a subchannel corresponding to the terminal in an OFDMA mode. As shown in FIG. 9, the method includes:

S901: An access point sends OFDMA physical layer signaling to a terminal.

Specifically, the OFDMA physical layer signaling is used for indicating, to the terminal, the corresponding subchannel on which the ACK response or the BA response is sent to the access point and that is allocated for the terminal.

S902: The access point sends OFDMA+MU-MIMO data information to the terminal on the subchannel corresponding to the terminal in an OFDMA+MU-MIMO mode.

Optionally, the OFDMA+MU-MIMO data information may carry the OFDMA physical layer signaling, or may not carry the OFDMA physical layer signaling.

S903: The access point sends an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode.

Optionally, the ACK request frame or the BA request frame may carry the OFDMA physical layer signaling, or may not carry the OFDMA physical layer signaling. Moreover, optionally, when the foregoing OFDMA+MU-MIMO data information carries the OFDMA physical layer signaling, the ACK request frame or the BA request frame may not carry the OFDMA physical layer signaling; or when the foregoing OFDMA+MU-MIMO data information does not carry the OFDMA physical layer signaling, the ACK request frame or the BA request frame may carry the OFDMA physical layer signaling.

S904: The access point receives the ACK response or the BA response that is sent by the terminal on the corresponding subchannel in an OFDMA mode.

Specifically, after determining, according to the OFDMA physical layer signaling, the subchannel on which the ACK response or BA response is sent to the access point, the terminal determines according to the dedicated information bit in the ACK request frame or the BA request frame to send the ACK response or BA response to the access point on the corresponding subchannel in the OFDMA or OFDMA+MU-MIMO mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, an access point sends OFDMA physical layer signaling to a terminal, where the OFDMA physical layer signaling is used for indicating, to the terminal, a subchannel that sends an ACK response or a BA response to the access point and is allocated for the terminal, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 12

Figure 10:
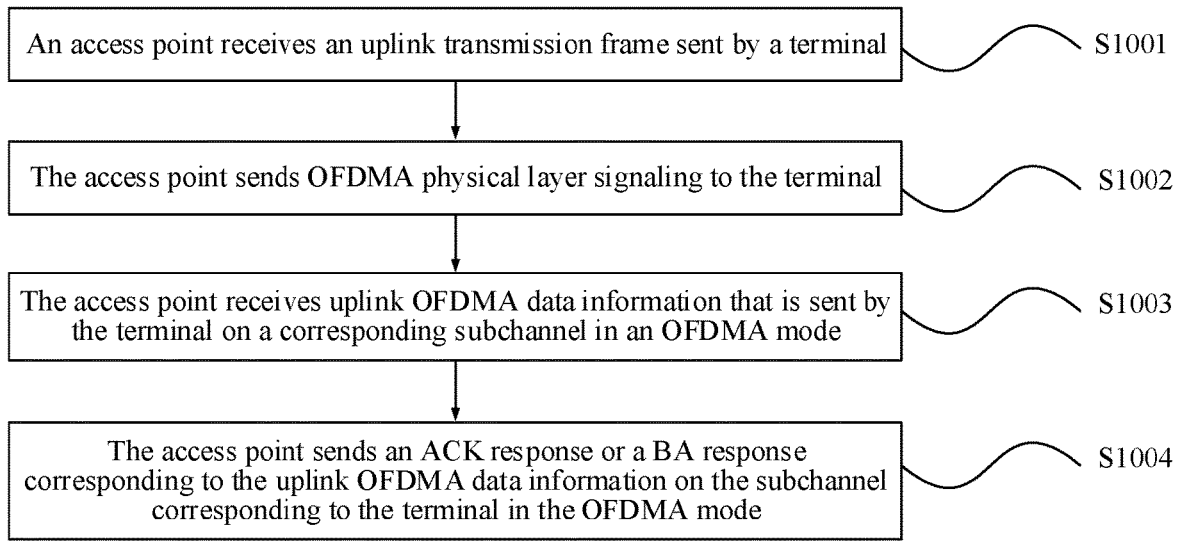
FIG. 10 is a schematic flowchart of Embodiment 12 of a data transmission indication method according to the present invention.

FIG. 10 is a schematic flowchart of Embodiment 12 of a data transmission indication method according to the present invention. The method of this embodiment involves a process of transmission of uplink OFDMA data information initiated by a terminal. The method specifically includes the following steps:

S1001: An access point receives an uplink transmission frame sent by a terminal.

Specifically, the method involved in this embodiment is the foregoing process of transmission of uplink OFDMA data information initiated by a STA, and the uplink transmission frame carries an OFDMA data transmission request.

The terminal may transmit an uplink transmission frame in an OFDM mode, where the uplink transmission frame may be specifically of any type. The terminal may add an OFDMA data transmission request to the uplink transmission frame, where the OFDMA data transmission request is used for requesting the access point to complete subsequent data transmission in an OFDMA mode.

After receiving the uplink transmission frame of the terminal, the access point decides according to the OFDMA data transmission request of the terminal or a current network situation whether to switch the terminal to the OFDMA mode to perform transmission, for example, whether there is a requirement from another terminal at the access point. If the access point determines that the terminal needs to be switched to the OFDMA mode, the access point uses the OFDMA mode in subsequent data transmission; or if a determining result of the access point is that the terminal is not switched to the OFDMA mode, the access point continues to perform data transmission in the OFDM mode.

S1002: The access point sends OFDMA physical layer signaling to the terminal.

Specifically, when the access point determines according to the OFDMA data transmission request or the current network situation that the terminal needs to be switched to the OFDMA mode, and performs data transmission in the OFDMA mode, the access point sends the OFDMA physical layer signaling to the terminal, where the OFDMA physical layer signaling is used for instructing terminals to send the uplink OFDMA data information on respective corresponding subchannels.

Figure 10A:
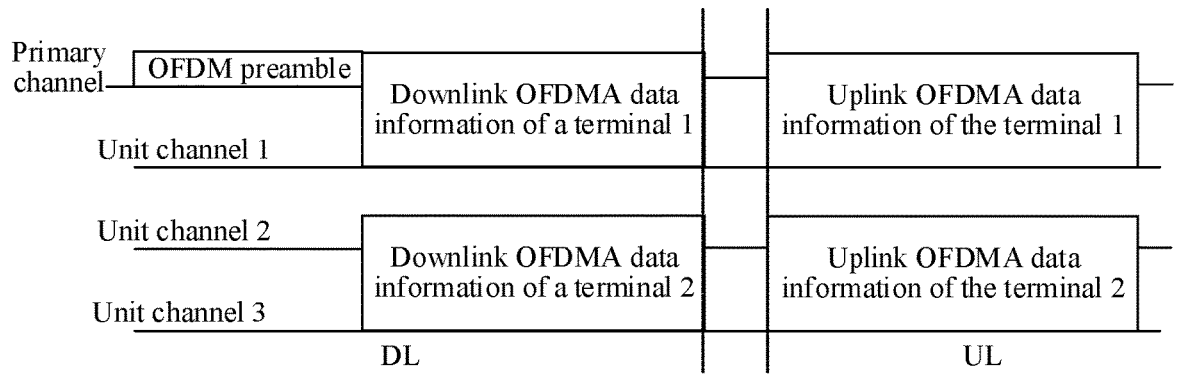
FIG. 10a is a schematic diagram 9 of data transmission according to the present invention.
Figure 10B:
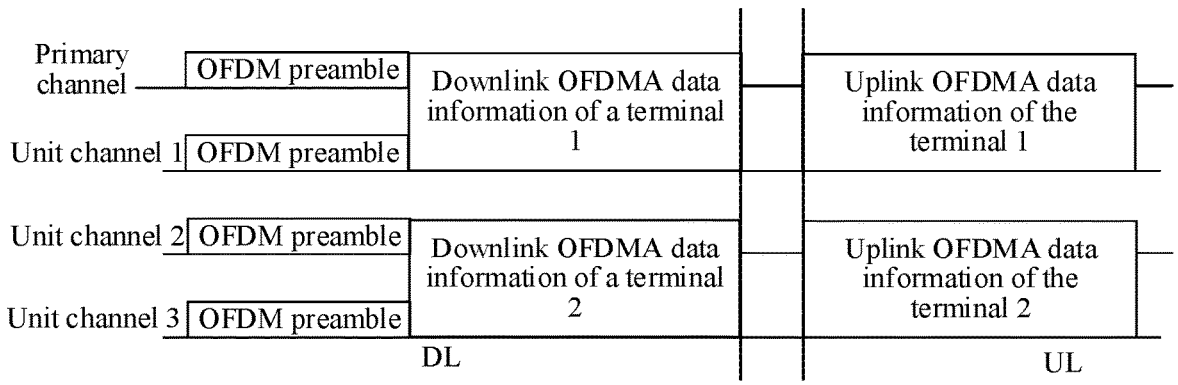
FIG. 10b is a schematic diagram 10 of data transmission according to the present invention.

It should be noted that, the OFDMA physical layer signaling may be carried in the OFDM preamble in the foregoing embodiment, or may be carried in the NDPA frame, or the NDPA frame and the OFDM preamble may cooperate with each other to carry the OFDMA physical layer signaling. For a specific process, reference may be made to the foregoing embodiment, and details are not described herein again. Optionally, an example in which the OFDMA physical layer signaling is carried in the OFDM preamble is used (referring to an example in FIG. 10a), the OFDM preamble part may be transmitted only on the primary channel, or may be transmitted on multiple subchannels (including the primary channel), and reference is made to an example in FIG. 10b.

Optionally, after S1002, the access point may further send downlink OFDMA data information of the terminals on the respective subchannels corresponding to the foregoing terminals. For a downlink OFDMA data transmission process, reference may be made to the foregoing embodiment, and details are not described herein again.

The terminal learns, by using the subchannel indicated by the OFDMA physical layer signaling, the subchannel on which the terminal sends the uplink OFDMA data information to the access point, that is, signaling indication occurring when the access point additionally instructs the terminal to transmit the uplink OFDMA data information is avoided, and system efficiency is improved.

S1003: The access point receives uplink OFDMA data information that is sent by the terminal on a corresponding subchannel in an OFDMA mode.

Specifically, after determining, according to the OFDMA physical layer signaling, a subchannel on which the uplink OFDMA data information is sent to the access point, the terminal sends the uplink OFDMA data information to the access point on the subchannel.

Optionally, if after S1002, the access point further sends downlink OFDMA data information to the terminal, after the terminal receives, on a corresponding subchannel, the downlink OFDMA data information sent by the access point and waits for a fixed time length, the terminal sends the uplink OFDMA data information associated with the terminal on the subchannel.

In the data transmission indication method provided in this embodiment of the present invention, a terminal sends an uplink transmission frame to an access point, so that the access point indicates, for each terminal by using OFDMA physical layer signaling, a subchannel on which uplink OFDMA data information is sent, and therefore each terminal may send data to the access point on the corresponding subchannel. That is, a subchannel is allocated to a terminal in a manner in which the access point sends the OFDMA physical layer signaling, so that the access point may perform an indication for more terminals when the uplink OFDMA data information is sent to the access point, signaling indication occurring when the access point additionally instructs the terminal to transmit the uplink OFDMA data information is avoided, and system efficiency is improved.

Further, the method involved in this embodiment is directed to a process in which in the foregoing scenario shown in FIG. 10 that a terminal sends uplink OFDMA data information to an access point, after receiving the uplink OFDMA data information sent by the terminal, the access point sends an ACK response or a BA response to the terminal on a corresponding subchannel. Further, after S1003, the method further includes:

S1004: The access point sends an ACK response or a BA response corresponding to the uplink OFDMA data information on the subchannel corresponding to the terminal in the OFDMA mode.

Specifically, the terminal sends the uplink OFDMA data information to the access point on the subchannel corresponding to the terminal, where the uplink OFDMA data information carries an OFDMA ACK request or an OFDMA BA request, and the OFDMA ACK request or the OFDMA BA request is used for instructing the access point to send an ACK response or a BA response to the terminal in the OFDMA mode, that is, making the access point feed back a transmission situation of the uplink OFDMA data information to the terminal.

The access point is a subject sending the OFDMA physical layer signaling, and therefore, the access point may directly send the ACK response or the BA response of the uplink OFDMA data information associated with the terminal on the corresponding subchannel to the terminal, so that terminal learns whether the uplink OFDMA data is transmitted successfully.

It should be noted that, the frame format and the indication manner in Embodiment 1 to Embodiment 3 are also applicable to a case in which the access point replies terminals with the ACK or BA response in parallel in the OFDMA mode for uplink multi-user transmission data (the uplink OFDMA data information or uplink MU-MIMO data information).

In the data transmission indication method provided in this embodiment of the present invention, an ACK request or a BA request is carried in uplink OFDMA data information sent by a terminal to an access point, so that the access point can send an ACK response or a BA response corresponding to the uplink OFDMA data information to the terminal on a corresponding subchannel. That is, a manner in which the access point allocates a subchannel for each terminal according to OFDMA physical layer signaling enables the access point to perform an indication for more terminals when sending uplink OFDMA data to the access point, that is, a quantity of terminals to which the access point indicates subchannels is not limited, and therefore the terminal can learn according to the ACK response or the BA response sent by the access point, whether the uplink OFDMA data is transmitted successfully.

Embodiment 13

Figure 11:
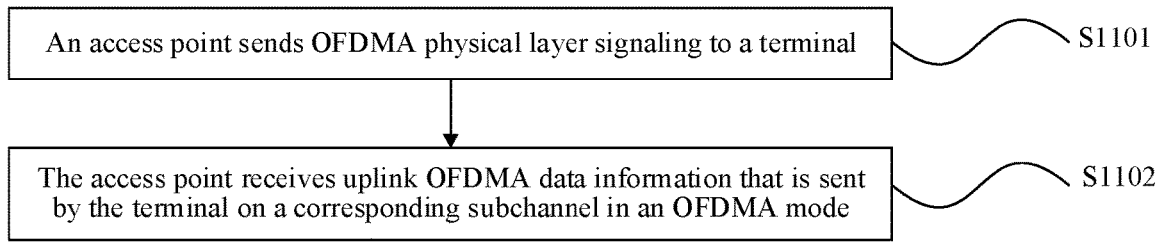
FIG. 11 is a schematic flowchart of Embodiment 13 of a data transmission indication method according to the present invention.
Figure 11A:
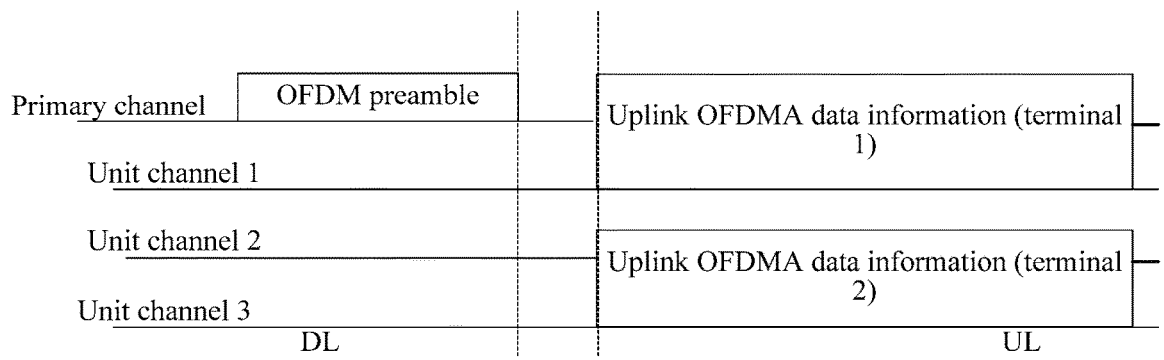
FIG. 11a is a schematic diagram 11 of data transmission according to the present invention.
Figure 11B:
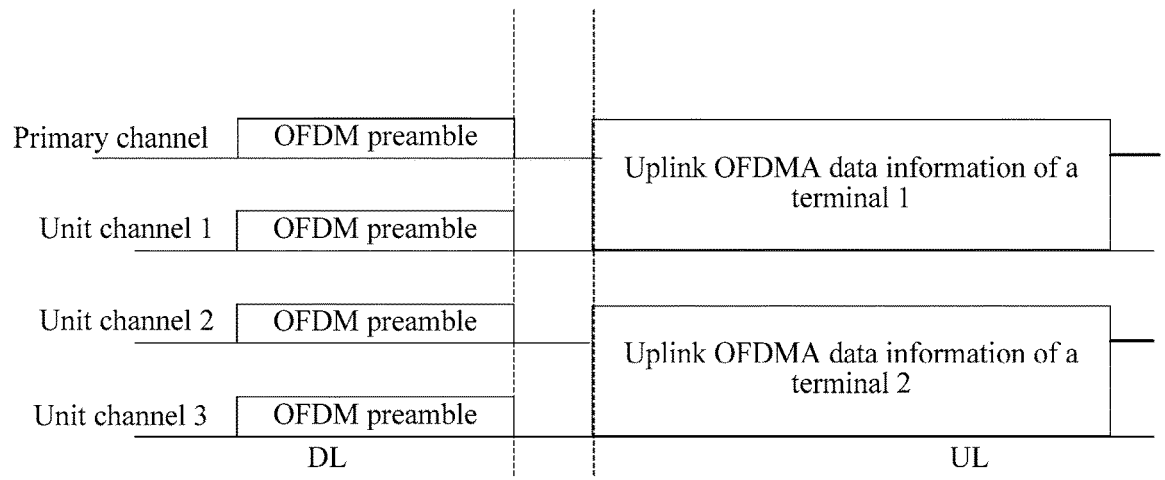
FIG. 11b is a schematic diagram 12 of data transmission according to the present invention.

FIG. 11 is a schematic flowchart of Embodiment 13 of a data transmission indication method according to the present invention. The method of this embodiment involves a process of transmission of uplink OFDMA data information initiated by an access point. The method specifically includes the following steps:

S1101: An access point sends OFDMA physical layer signaling to a terminal.

Specifically, the OFDMA physical layer signaling may be carried in the OFDM preamble in the foregoing embodiment, or may be carried in the NDPA frame, or the NDPA frame and the OFDM preamble may cooperate with each other to carry the OFDMA physical layer signaling. For a specific process, reference may be made to the foregoing embodiment, and details are not described herein again.

The OFDMA physical layer signaling is specifically used for indicating, to the terminal, the subchannel that corresponds to the terminal, on which uplink OFDMA data information is sent to the access point and that is allocated for the terminal. Optionally, in all embodiments of the present invention, the OFDMA physical layer signaling may include an information bit, used for indicating, to the terminal, whether the allocation of the subchannel is used for an uplink, or only used for a downlink, or used for both an uplink and a downlink. In this embodiment, the information bit in the OFDMA physical layer signaling indicates, to the terminal, that the subchannel is a subchannel used for uplink transmission. In a case in which the access point obtains a channel use right, the terminal is instructed by using the delivered OFDMA physical layer signaling to send the uplink OFDMA data information to the access point on the corresponding subchannel. An example in which the OFDMA physical layer signaling is carried in the OFDM preamble is used, the OFDM part may be transmitted on multiple subchannels (refer to 11a), or may be only transmitted on a primary channel (refer to 11b).

S1102: The access point receives uplink OFDMA data information that is sent by the terminal on a corresponding subchannel in an OFDMA mode.

Specifically, after determining, according to the OFDMA physical layer signaling, a subchannel on which the uplink OFDMA data information is sent to the access point, the terminal sends the uplink OFDMA data information to the access point on the subchannel; therefore the access point may receive multiple pieces of uplink OFDMA data information that are sent by terminals on corresponding subchannels, and corresponding time frequency resources are fully used.

In the data transmission indication method provided in this embodiment of the present invention, an access point indicates, for a terminal by using OFDMA physical layer signaling, a subchannel on which uplink OFDMA data information is sent, so that each terminals may send uplink data to the access point on a corresponding subchannels, and corresponding time frequency resources are fully used. Moreover, a subchannel is allocated for each terminal in a manner in which the access point sends the OFDMA physical layer signaling, so that the access point may perform an indication for more terminals when sending uplink OFDMA data to the access point, that is, a quantity of terminals to which the access point indicates subchannels is not limited.

Embodiment 14

FIG. 12 is a schematic flowchart of Embodiment 14 of a data transmission indication method according to the present invention. As shown in FIG. 12, the method includes:

S1201: A terminal receives OFDMA physical layer signaling sent by an access point, where the OFDMA physical layer signaling is used for indicating, to the terminal, a subchannel allocated by the access point for the terminal, where the OFDMA physical layer signaling includes an identifier of the terminal and subchannel information corresponding to the identifier of the terminal.

Specifically, the terminal receives the OFDMA physical layer signaling that is sent by the access point in an OFDM mode, where the OFDM mode herein refers to that the access point may send the OFDMA physical layer signaling to a terminal in a coverage area of the access point, but another terminal in the coverage area of the access point may also listen to obtain and correctly demodulate the OFDMA physical layer signaling. The OFDMA physical layer signaling in this embodiment of the present invention includes an identifier of the terminal and subchannel information corresponding to the identifier of the terminal.

A channel bandwidth of a subchannel is not limited in the present invention, and the access point determines the bandwidth of the subchannel according to a bandwidth requirement of a terminal. Moreover, the indicated subchannel may be presented in multiple forms, which may be a center frequency and a bandwidth of the subchannel, or may be a channel number and a bandwidth of a start frequency band, or may be a channel number range from a start frequency band to an end frequency band, which is not limited in the present invention.

S1202: The terminal determines the subchannel corresponding to the terminal according to the OFDMA physical layer signaling.

Specifically, each terminal may determine a subchannel corresponding to the terminal according to content included in the OFDMA physical layer signaling, and perform a corresponding operation on the corresponding subchannel, for example, may receive, on a subchannel corresponding to the terminal, data that belongs to the terminal and is sent by the access point, or may send corresponding response information or uplink data information to the access point on a subchannel corresponding to the terminal. The identifier of the terminal in the foregoing OFDMA physical layer signaling may be an identifier of a single terminal, or may be identifiers of a terminal group, and the terminal group may include multiple terminals.

A subchannel indicated by the OFDMA physical layer signaling involved in this embodiment for a terminal may correspond to one terminal, or may correspond to multiple terminals. For example, multiple terminals may be grouped into one group, and the OFDMA physical layer signaling allocates a subchannel for this group, and then all the terminals in the group may use the subchannel.

A format of a signaling part in the prior art can only support a bandwidth of 20 MHz, and a user is allocated for each subcarrier for 48 subcarriers; when a bandwidth greater than 20 MHz is used, the prior art has no corresponding expansion solution to support the bandwidth. However, the OFDMA physical layer signaling in this embodiment of the present invention may support a larger bandwidth, and for a quantity of terminals, allocate and indicate an allocated subchannel for multiple terminals, where the subchannel includes one or more subcarriers. Therefore, subjects for this embodiment of the present invention and the prior art are different (in the prior art, the subject is to allocate user for a subcarrier, and in this embodiment of the present invention, the subject is to allocate a subchannel or a subcarrier for a user), the prior art can only perform indication for 48 terminals because of a limitation of subcarriers, and indicating, by OFDMA physical layer signaling, a subchannel for a terminal may be not limited by a bandwidth, subchannels may be allocated for more terminals (users whose quantity exceeds 48) in a larger bandwidth. Certainly, this embodiment of the present invention may still allocate subchannels for terminals whose quantity is less than 48.

In the data transmission indication method provided in this embodiment of the present invention, a terminal receives OFDMA physical layer signaling sent by an access point, and determines a subchannel corresponding to the terminal, thereby performing a corresponding operation on the corresponding subchannel. That is, a manner in which the access point allocates a subchannel for each terminal according to OFDMA physical layer signaling enables the access point to indicate subchannels for more terminals, that is, a quantity of terminals to which the access point indicates subchannels is not limited.

Embodiment 15

FIG. 13 is a schematic flowchart of Embodiment 15 of a data transmission indication method according to the present invention. The method involved in this embodiment is a feasible implementation manner in which a subchannel is indicated to a terminal by using OFDMA physical layer signaling. Further, on the basis of the embodiment shown in FIG. 12, the identifier of the terminal may be an identifier of one or more terminal groups, each terminal group includes at least one terminal, and the subchannel information includes an uplink subchannel or a downlink subchannel or an uplink and downlink bidirectional subchannel. The method includes:

S1301: A terminal receives a mapping relationship between an identifier of a terminal group and an address of the terminal, where the mapping relationship is sent by the access point.

Specifically, the terminal needs to know a terminal group to which the terminal belongs, and then can know a subchannel corresponding to the terminal only when the access point allocates subchannels for the terminal group. Therefore, the access point needs to send a mapping relationship between an identifier of a terminal group and an address of a terminal to each terminal, so that each terminal learns a terminal group in which the terminal is located. For a simple manner in which a terminal is informed of a mapping relationship between an identifier of a terminal group and an address of each terminal in a grouping management frame form, reference may be made to the format and the related description of Table 1, and details are not described herein again in this embodiment of the present invention.

S1302: The terminal receives OFDMA physical layer signaling sent by the access point, where the OFDMA physical layer signaling includes an identifier of the terminal and subchannel information corresponding to the identifier of the terminal, and the OFDMA physical layer signaling is used for indicating to each terminal group that the allocated subchannel is an uplink subchannel or a downlink subchannel or an uplink and downlink bidirectional subchannel.

Optionally, the OFDMA physical layer signaling may indicate by using a dedicated indication bit that the subchannel allocated for the terminal is an uplink subchannel or a downlink subchannel or an uplink and downlink bidirectional subchannel. That is, the foregoing OFDMA physical layer signaling not only may indicate an allocated subchannel for the terminal group, but also may indicate, to the terminal group, that an allocated subchannel is an uplink subchannel or a downlink subchannel or an uplink and downlink bidirectional subchannel.

Specifically, the identifier of the terminal is an identifier of one or more terminal groups, and the OFDMA physical layer signaling is used for indicating, to one or more terminal groups, a subchannel allocated for each terminal group, where terminal groups and subchannels are in a one-to-one correspondence.

For the related field included in the indication of the OFDMA physical layer signaling, reference may be made to the formats and the related description shown in Table 2 and Table 3, and details are not described herein again in this embodiment of the present invention.

S1303: The terminal determines, according to the mapping relationship that the terminal is located in the terminal group, and then the terminal determines that a subchannel corresponding to the terminal group is the subchannel corresponding to the terminal.

In the data transmission indication method provided in this embodiment of the present invention, an access point sends OFDMA physical layer signaling carrying and including an identifier of a terminal and subchannel information corresponding to the identifier of the terminal to the terminal, and the access point further sends a mapping relationship between an identifier of a terminal group and an address of each terminal to each terminal, so that each terminal learns a terminal group in which the terminal is located, and further learns a subchannel corresponding to the terminal, thereby performing a corresponding operation on the subchannel. That is, a manner in which the access point allocates a subchannel for each terminal according to the foregoing OFDMA physical layer signaling enables the access point to indicate subchannels for more terminals, that is, a quantity of terminals to which the access point indicates subchannels is not limited.

Embodiment 16

Embodiment 16 of the present invention provides a data transmission indication method. The method involved in this embodiment is another feasible implementation manner in which an access point indicates a subchannel for a terminal by using OFDMA physical layer signaling. On the basis of the embodiment shown in FIG. 12, the OFDMA physical layer signaling may include an identifier of a terminal and subchannel information corresponding to the identifier of the terminal; and the identifier of the terminal is an identifier of a single terminal group, and the terminal group includes at least two terminals; and the OFDMA physical layer signaling is used for indicating to each terminal in the terminal group that the allocated subchannel is an uplink subchannel or a downlink subchannel or an uplink and downlink bidirectional subchannel.

Optionally, the OFDMA physical layer signaling may indicate by using a dedicated indication bit that the subchannel allocated for the terminal is an uplink subchannel or a downlink subchannel or an uplink and downlink bidirectional subchannel. The terminals in the terminal group and the subchannels are in a one-to-one correspondence. That is, the foregoing OFDMA physical layer signaling not only may indicate an allocated subchannel for each terminal in the terminal group, but also may indicate, to each terminal in the terminal group, that an allocated subchannel is an uplink subchannel or a downlink subchannel or an uplink and downlink bidirectional subchannel.

Specifically, for the related field included in the indication of the OFDMA physical layer signaling, reference may be made to the format and the related description shown in Table 4, and details are not described herein again in this embodiment of the present invention.

Each terminal in the foregoing terminal group in Table 4 corresponds to a different subchannel, and because the OFDMA physical layer signaling may support a larger bandwidth (not limited to a bandwidth of 20 MHz), subchannels may be indicated to more terminals.

In the data transmission indication method provided in this embodiment of the present invention, a terminal receives OFDMA physical layer signaling sent by an access point, and learns a subchannel to which the terminal corresponds according to the OFDMA physical layer signaling, so that the terminal may perform a corresponding operation on the subchannel corresponding to the terminal. That is, a manner in which the access point allocates a subchannel for each terminal according to OFDMA physical layer signaling enables the access point to indicate subchannels for more terminals, that is, a quantity of terminals to which the access point indicates subchannels is not limited.

Embodiment 17

FIG. 14 is a schematic flowchart of Embodiment 17 of a data transmission indication method according to the present invention. The method involved in this embodiment is a process in which a terminal receives OFDMA physical layer signaling carried in an OFDM preamble, learns a subchannel corresponding to the terminal according to the OFDMA physical layer signaling, and receives, on the subchannel corresponding to the terminal, downlink OFDMA data information sent by an access point. The method includes:

S1401: A terminal receives an OFDM preamble sent by an access point, where the OFDM preamble carries OFDMA physical layer signaling.

S1402: The terminal determines a subchannel corresponding to the terminal according to the OFDMA physical layer signaling.

Specifically, the terminal receives the OFDM preamble that is sent by the access point in an OFDM mode, where the OFDM mode herein refers to that the access point sends an OFDM preamble to any terminal in a coverage area of the access point. The OFDM preamble includes an STF, an LTF, L-SIG, and UHT-SIG-A, where the UHT-SIG-A carries OFDMA physical layer signaling. It should be noted that, that the access point sends the OFDM preamble in the OFDM mode refers to that the access point sends an OFDM preamble to a terminal, but in this case, the access point does not know the specific terminal to which the OFDM preamble is sent; therefore the access point sends the OFDM preamble to any terminal, and all active terminals listen to and receive the OFDM preamble, and then obtain OFDMA physical layer signaling, thereby learning channels corresponding to the terminals.

It should be noted that, for content included in the OFDMA physical layer signaling in this embodiment of the present invention, reference may be made to the description in Embodiment 14 to Embodiment 16, and details are not described herein again in this embodiment of the present invention.

S1403: The terminal receives, on the corresponding subchannel, downlink OFDMA data information sent by the access point, where the downlink OFDMA data information includes an OFDMA preamble and OFDMA data, and the OFDMA preamble includes a switching field and UHT-SIG-B.

Specifically, the access point sends the downlink OFDMA data information on the subchannel corresponding to the terminal in the OFDMA mode, that is, the access point may send the downlink OFDMA data information to multiple terminals on respective subchannels corresponding to the terminals at the same time, and therefore signaling overheads can be reduced and a multi-user diversity gain can be brought about. Additionally, the subchannel corresponding to the terminal may further include a primary channel of a BSS, where the primary channel is used by the access point and the terminal to exchange control signaling and management signaling; that is, after sending the OFDMA physical layer signaling on the primary channel completely, the access point may release the primary channel; or may send the downlink OFDMA data information to the terminal by using the primary channel together with another subchannel.

For a data transmission frame format of the OFDM preamble and the downlink OFDMA data information, reference may be made to the format and the related description shown in Table 5, and details are not described herein again in this embodiment of the present invention.

Additionally, the access point needs to allocate a subchannel for a terminal group, and actually also allocates a subchannel for each terminal, but data sent by the access point each time is sent for a specific terminal in the terminal group, and therefore, the terminal needs to learn an actual terminal address of the terminal in the terminal group. Therefore, the access point further needs to add a specific destination terminal address to UHT-SIG-B or a media access control (MAC) layer header transmitted on each subchannel, where the destination terminal address is an address of an element in a terminal group indicated by a group number in Table 1 to Table 4, and the terminal reads the destination terminal address in the UHT-SIG-B or the MAC layer header.

Correspondingly, after determining the received OFDM preamble in the OFDM manner, the terminal reads the OFDMA physical layer signaling of the UHT-SIG-A, and determines according to an address of the terminal whether the terminal is in the terminal group indicated by the OFDMA physical layer signaling. If the terminal is in the terminal group, the terminal is switched to the OFDMA mode, further switched to the indicated subchannel according to subchannel information corresponding to the terminal group, further receives an OFDMA preamble, and determines according to the destination terminal address carried in the received UHT-SIG-B or MAC layer header whether the terminal is a destination terminal: if yes, the terminal reads subsequent OFDMA data; or if not, the terminal stops reading. If it is determined that the terminal is not in the terminal group, the terminal may choose to be not switched to the OFDMA mode, and continue to obtain the OFDMA preamble and the OFDMA data in the OFDM manner.

In the foregoing steps, no matter whether the terminal is a destination terminal, the terminal may read a time length in the data frame format (that is, includes the OFDM preamble, the OFDMA preamble and the OFDMA data) to determine a time needed for the transmission. A non-destination terminal sets a network allocation vector (NAV) of the terminal according to the time length. In a time length of the NAV, the non-destination terminal may choose not to listen to any subchannel again to reduce power loss of the terminal. Additionally, the non-destination terminal may also set an NAV according to a length of L-SIG, and the length herein may indicate a total length of multiple data frames, and is used by the terminal to calculate a time occupied by the total length.

In the data transmission indication method provided in this embodiment of the present invention, a terminal receives an OFDM preamble carrying OFDMA physical layer signaling, and obtains OFDMA physical layer signaling from the OFDM preamble, thereby learning, according to the OFDMA physical layer signaling, a subchannel on which the terminal should receive downlink OFDMA data information corresponding to the terminal. That is, a manner in which the access point allocates a subchannel for each terminal according to OFDMA physical layer signaling enables the access point to perform an indication for more terminals when receiving data of the access point, that is, a quantity of terminals to which the access point indicates subchannels is not limited.

Embodiment 18

Figure 15:
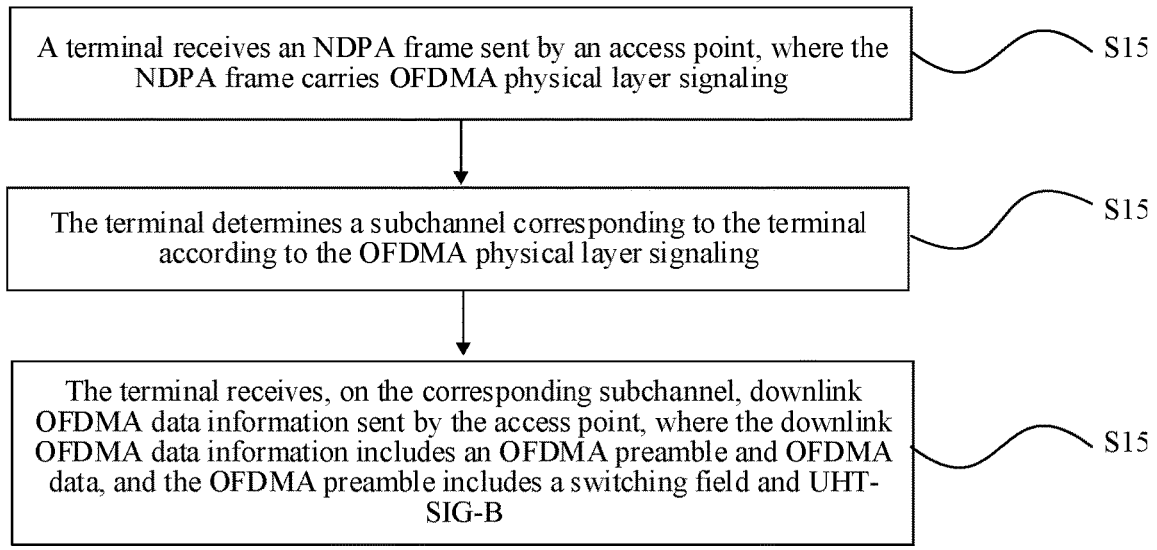
FIG. 15 is a schematic flowchart of Embodiment 18 of a data transmission indication method according to the present invention.

FIG. 15 is a schematic flowchart of Embodiment 18 of a data transmission indication method according to the present invention. The method involved in this embodiment is a process in which a terminal obtains OFDMA physical layer signaling carried in an NDPA frame, learns a subchannel corresponding to the terminal according to the OFDMA physical layer signaling, and receives, on the subchannel corresponding to the terminal, downlink OFDMA data information sent by an access point. The method includes:

S1501: A terminal receives an NDPA frame sent by an access point, where the NDPA frame carries OFDMA physical layer signaling.

Specifically, an exclusive NDPA frame is used in this embodiment of the present invention to carry OFDMA physical layer signaling, and is used for reducing overheads brought about when the OFDMA physical layer signaling is transmitted. For a format of the NDPA frame in this embodiment of the present invention, reference may be made to Table 6, and details are not described herein again in this embodiment of the present invention.

It should be noted that, the access point may send an NDPA frame to a terminal in a coverage area of the access point in an OFDM mode, and may send the NDPA frame on a primary channel, or may send the NDPA frame on multiple subchannels, and all other terminals may listen to obtain the NDPA frame. Then, the access point further needs to send an OFDM preamble in the OFDM mode. The foregoing OFDMA physical layer signaling may be carried in the NDPA frame, or may be carried in both the NDPA frame and the OFDM preamble, but is generally only carried in the NDPA frame to reduce signaling overheads. Optionally, when the NDPA frame carries the OFDMA physical layer signaling, the OFDM preamble may further indicate a specific terminal identifier in a terminal group.

S1502: The terminal determines a subchannel corresponding to the terminal according to the OFDMA physical layer signaling.

It should be noted that, for content included in the OFDMA physical layer signaling in this embodiment of the present invention, reference may be made to the description in Embodiment 14 to Embodiment 16, and details are not described herein again in this embodiment of the present invention.

S1503: The terminal receives, on the corresponding subchannel, downlink OFDMA data information sent by the access point, where the downlink OFDMA data information includes an OFDMA preamble and OFDMA data, and the OFDMA preamble includes a switching field and UHT-SIG-B.

Specifically, the access point sends the downlink OFDMA data information in the OFDMA mode, that is, the access point may send the downlink OFDMA data information to multiple terminals on respective subchannels corresponding to terminals at the same time, and therefore corresponding time frequency resources may be fully used. Additionally, the subchannel corresponding to the terminal may further include a primary channel of a BSS, where the primary channel is used by the access point and the terminal to exchange control signaling and management signaling; that is, after sending the OFDMA physical layer signaling on the primary channel completely, the access point may release the primary channel, or may send the downlink OFDMA data information to the terminal by using the primary channel together with another subchannel.

The terminal detects and receives the NDPA frame in the OFDM manner in an idle state, and reads the OFDMA physical layer signaling in the OFDM manner; and then the terminal also receives the OFDM preamble in the OFDM manner. For a data transmission frame format of the OFDM preamble and the downlink OFDMA data information, reference may be made to the format and the related description shown in Table 5, and details are not described herein again in this embodiment of the present invention.

Additionally, the access point needs to allocate a subchannel for a terminal group, and actually also allocates a subchannel for each terminal, but data sent by the access point each time is sent for a specific terminal in the terminal group, and therefore, the terminal needs to learn an actual terminal address of the terminal in the terminal group. Therefore, the access point further needs to add a specific destination terminal address to UHT-SIG-B or a MAC layer header transmitted on each subchannel, where the destination terminal address is an address of an element in a terminal group indicated by a group number in Table 1 to Table 4, and the terminal reads the destination terminal address in the UHT-SIG-B or the MAC layer header.

Correspondingly, after determining the received OFDM preamble in the OFDM manner, the terminal determines according to an address of the terminal whether the terminal is in the terminal group indicated by the OFDMA physical layer signaling. If the terminal is in the terminal group, the terminal is switched to the OFDMA mode, further switched to the indicated subchannel according to subchannel information corresponding to the terminal group, further receives an OFDMA preamble, and determines according to the destination terminal address carried in the received UHT-SIG-B or MAC layer header whether the terminal is a destination terminal: if yes, the terminal reads subsequent OFDMA data; or if not, the terminal stops reading. If it is determined that the terminal is not in the terminal group, the terminal may choose to be not switched to the OFDMA mode, and continue to obtain the OFDMA preamble and the OFDMA data in the OFDM manner.

In the foregoing steps, no matter whether the terminal is a destination terminal, the terminal may read a time length in the data frame format (that is, includes the OFDM preamble, the OFDMA preamble and the OFDMA data) to determine a time needed for the transmission. A non-destination terminal sets an NAV of the terminal according to the time length. In a time length of the NAV, the non-destination terminal may choose not to listen to any subchannel again to reduce power loss of the terminal. Additionally, the non-destination terminal may also set an NAV according to a length of L-SIG, and the length herein may indicate a total length of multiple data frames, and is used by the terminal to calculate a time occupied by the total length.

In the data transmission indication method provided in this embodiment of the present invention, a terminal receives an NDPA frame carrying OFDMA physical layer signaling and sent by an access point, so that the terminal may obtain OFDMA physical layer signaling from the NDPA frame, thereby learning, according to the OFDMA physical layer signaling, a subchannel on which the terminal should receive downlink OFDMA data information corresponding to the terminal, so as to receive, on the corresponding subchannel, the downlink OFDMA data information sent by the access point. That is, a manner in which the access point allocates a subchannel for each terminal according to OFDMA physical layer signaling enables the access point to perform an indication for more terminals when receiving data of the access point, that is, a quantity of terminals to which the access point indicates subchannels is not limited.

Embodiment 19

Figure 16:
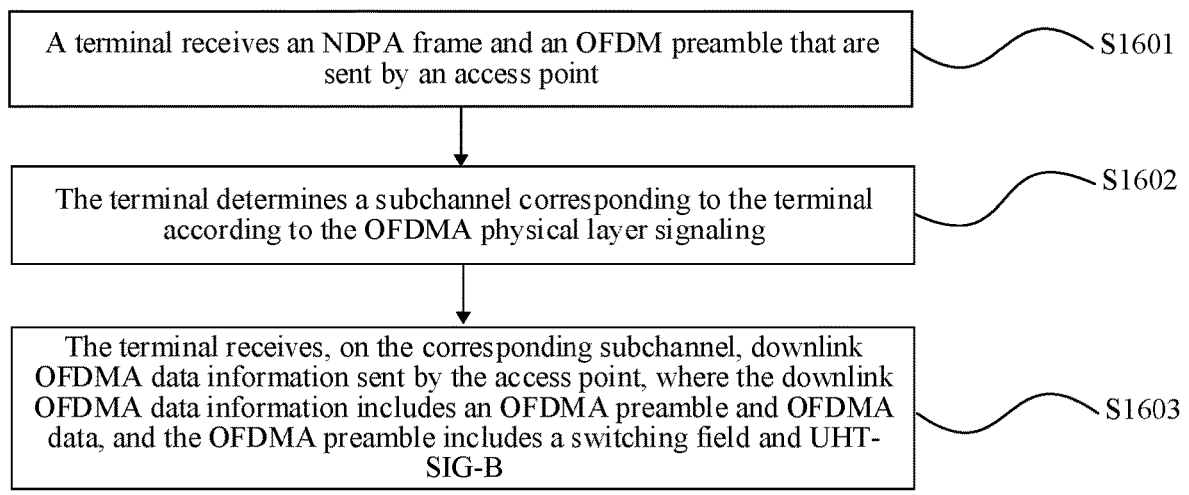
FIG. 16 is a schematic flowchart of Embodiment 19 of a data transmission indication method according to the present invention.

FIG. 16 is a schematic flowchart of Embodiment 19 of a data transmission indication method according to the present invention. The method involved in this embodiment is a process in which an access point sends an NDPA frame and an OFDM preamble separately carrying content included in OFDMA physical layer signaling to a terminal, so that the terminal obtains the OFDMA physical layer signaling from the NDPA frame and the OFDM preamble, and therefore the terminal learns a subchannel corresponding to the terminal according to the OFDMA physical layer signaling, and receives, on the subchannel corresponding to the terminal, downlink OFDMA data information sent by an access point. The method includes:

S1601: A terminal receives an NDPA frame and an OFDM preamble that are sent by an access point.

Specifically, the NDPA frame and the OFDM preamble may carry the OFDMA physical layer signaling in two cooperative manners, which are separately:

First manner: A terminal receives an NDPA frame and an OFDM preamble that are sent by an access point, where the NDPA frame carries an identifier of the terminal in the foregoing OFDMA physical layer signaling, and the OFDM preamble carries subchannel information corresponding to the identifier of the terminal and being in the foregoing OFDMA physical layer signaling. The identifier of the terminal herein may be an identifier of one or more terminal groups in Embodiment 2, and subchannels and terminal groups are in a one-to-one correspondence; and may be further an identifier of a single terminal group in Embodiment 3, and subchannels and terminals in the group are in a one-to-one correspondence.

Second manner: A terminal receives an NDPA frame and an OFDM preamble that are sent by an access point, where the NDPA frame carries subchannel information corresponding to an identifier of the terminal and being in the foregoing OFDMA physical layer signaling, and the OFDM preamble carries the identifier of the terminal in the foregoing OFDMA physical layer signaling. The identifier of the terminal herein may be an identifier of one or more terminal groups in Embodiment 2, and subchannels and terminal groups are in a one-to-one correspondence; and may be further an identifier of a single terminal group in Embodiment 3, and subchannels and terminals in the group are in a one-to-one correspondence.

That is, the NDPA frame and the OFDM preamble may cooperate with each other to indicate the OFDMA physical layer signaling. A user group information field in Table 5 may include the identifier of the terminal, and may further include the subchannel information corresponding to the identifier of the terminal. Additionally, a control information field of Table 5 may further indicate an effective time length of subchannel information of a currently indicated terminal or terminal group, so that the terminal can determine according to the time length whether the indication of the subchannel information of the terminal or terminal group is valid or expired, and if not expired, the terminal may continue to use the current subchannel to receive and send data.

If the NDPA frame only carries the identifier of the terminal, the OFDM preamble further needs to carry the subchannel information corresponding to the identifier of the terminal and being in the NDPA frame; or if the NDPA frame only carries the subchannel information, the OFDM preamble further needs to carry the identifier of the terminal corresponding to the subchannel information and being in the NDPA frame.

S1602: The terminal determines a subchannel corresponding to the terminal according to the OFDMA physical layer signaling.

It should be noted that, for content included in the OFDMA physical layer signaling in this embodiment of the present invention, reference may be made to the description in Embodiment 14 to Embodiment 16, and details are not described herein again in this embodiment of the present invention.

S1603: The terminal receives, on the corresponding subchannel, downlink OFDMA data information sent by the access point, where the downlink OFDMA data information includes an OFDMA preamble and OFDMA data, and the OFDMA preamble includes a switching field and UHT-SIG-B.

Specifically, the access point sends the downlink OFDMA data information in the OFDMA mode, that is, the access point may send the downlink OFDMA data information to multiple terminals on respective subchannels corresponding to terminals at the same time, and therefore corresponding time frequency resources may be fully used. Additionally, the subchannel corresponding to the terminal may further include a primary channel of a BSS, where the primary channel is used by the access point and the terminal to exchange control signaling and management signaling; that is, after sending the OFDMA physical layer signaling on the primary channel completely, the access point may release the primary channel, or may send the downlink OFDMA data information to the terminal by using the primary channel together with another subchannel.

The terminal detects and receives the NDPA frame in the OFDM manner in an idle state, and reads a part of the OFDMA physical layer signaling carried in the NDPA frame; and then the terminal also receives the OFDM preamble in the OFDM mode, and then reads that part of content that is supplemented for the OFDMA physical layer signaling and in the OFDM preamble.

For a data transmission frame format of the OFDM preamble and the downlink OFDMA data information, reference may be made to the format and the related description shown in Table 5, and details are not described herein again in this embodiment of the present invention.

Additionally, the access point needs to allocate a subchannel for a terminal group, and actually also allocates a subchannel for each terminal, but data sent by the access point each time is sent for a specific terminal in the terminal group, and therefore, the terminal needs to learn an actual terminal address of the terminal in the terminal group. Therefore, the access point further needs to add a specific destination terminal address to UHT-SIG-B or a MAC layer header transmitted on each subchannel, where the destination terminal address is an address of an element in a terminal group indicated by a group number in Table 1 to Table 4, and the terminal reads the destination terminal address in the UHT-SIG-B or the MAC layer header.

Correspondingly, after determining the received OFDM preamble in the OFDM mode, the terminal determines according to an address of the terminal whether the terminal is in the terminal group indicated by the OFDMA physical layer signaling. If the terminal is in the terminal group, the terminal is switched to the OFDMA mode, further switched to the indicated subchannel according to subchannel information corresponding to the terminal group, further receives an OFDMA preamble, and determines according to the destination terminal address carried in the received UHT-SIG-B or MAC layer header whether the terminal is a destination terminal: if yes, the terminal reads subsequent OFDMA data; or if not, the terminal stops reading. If it is determined that the terminal is not in the terminal group, the terminal may choose to be not switched to the OFDMA mode, and continue to obtain the OFDMA preamble and the OFDMA data in the OFDM mode.

In the foregoing steps, no matter whether the terminal is a destination terminal, the terminal may read a time length in the data frame format (that is, includes the OFDM preamble, the OFDMA preamble and the OFDMA data) to determine a time needed for the transmission. A non-destination terminal sets an NAV of the terminal according to the time length. In a time length of the NAV, the non-destination terminal may choose not to listen to any subchannel again to reduce power loss of the terminal. Additionally, the non-destination terminal may also set an NAV according to a length of L-SIG, and the length herein may indicate a total length of multiple data frames, and is used by the terminal to calculate a time occupied by the total length.

In the data transmission indication method provided in this embodiment of the present invention, a terminal receives an NDPA frame and an OFDM preamble that carry OFDMA physical layer signaling and are sent by an access point, and learns, by using the OFDMA physical layer signaling in the NDPA frame and the OFDM preamble, a subchannel on which the terminal should receive downlink OFDMA data information corresponding to the terminal, so as to receive the downlink OFDMA data information sent by the access point. That is, a manner in which the access point allocates a subchannel for each terminal according to OFDMA physical layer signaling enables the access point to perform an indication for more terminals when receiving data of the access point, that is, a quantity of terminals to which the access point indicates subchannels is not limited.

Further, on the basis of the embodiments shown in FIG. 14 to FIG. 16, as a feasible implementation manner of the embodiments of the present invention, the method involved in this implementation is a process in which after receiving downlink OFDMA data information sent by an access point, a terminal sends an ACK response or a BA response to the access point on a corresponding subchannel. Optionally, the foregoing OFDMA physical layer signaling or OFDMA data carries an OFDMA ACK request or an OFDMA BA request, and the OFDMA ACK request or the OFDMA BA request is used for instructing the terminal to send an ACK response or a BA response to the access point in an OFDMA mode; and then the foregoing OFDMA physical layer signaling is further used for indicating the subchannel that corresponds to the terminal, on which the ACK response or the BA response is sent to the access point and that is allocated for the terminal. That is, after S1403 or S1503 or S1603, an operation of S20 may be performed:

S30: The terminal sends the ACK response or the BA response to the access point on the subchannel corresponding to the terminal in the OFDMA mode.

Specifically, to indicate that the downlink OFDMA data information sent by the access point is correctly received by each terminal, each terminal needs to reply to the access point with an ACK response or a BA response. If the access point adds the OFDMA ACK request or OFDMA BA request to the downlink OFDMA data information or OFDMA physical layer signaling, after receiving the downlink OFDMA data information on the subchannel corresponding to the terminal according to the indication of the OFDMA physical layer signaling of the access point, the terminal may directly reply with an ACK or BA response in the OFDMA mode on the subchannel indicated by the OFDMA physical layer signaling. The ACK response corresponds to the OFDMA ACK request, and the BA response corresponds to the OFDMA BA request. Then, the access point receives ACK responses or BA responses that are sent by terminals on respective corresponding subchannels. That is, multiple terminals are enabled to send responses to the access point on subchannels corresponding to the terminals at the same time, and corresponding time frequency resources are fully used.

In the data transmission indication method provided in this embodiment of the present invention, a terminal receives, on a subchannel indicated by OFDMA physical layer signaling, downlink OFDMA data information sent by an access point, and multiple terminals may send ACK responses or BA responses to the access point at the same time on corresponding subchannels, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Further, on the basis of the embodiments shown in FIG. 14 to FIG. 16, as another feasible implementation manner of the embodiments of the present invention, the method involved in this embodiment is a process in which after receiving OFDMA physical layer signaling and downlink OFDMA data information that are sent by an access point, a terminal receives a single ACK request frame or BA request frame sent by the access point, so that the terminal can send an ACK response or a BA response to the access point on a subchannel indicated by the OFDMA physical layer signaling. The foregoing OFDMA physical layer signaling may be further used for indicating the subchannel that corresponds to the terminal, on which the ACK response or the BA response is sent to the access point and that is allocated for the terminal. After S202 or S302 or S402, the following steps may be performed:

S40: The terminal receives an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode.

Specifically, after sending the downlink OFDMA data information to the terminal, the access point may further send a single ACK request frame or BA request frame to the terminal (referring to FIG. 4b, an example in which a BA request frame is individually sent is used), where the ACK request frame or the BA request frame includes a dedicated information bit, and the dedicated information bit is used for instructing the terminal to send the ACK response or the BA response to the access point in the OFDMA mode. Optionally, the ACK request frame or the BA request frame may carry the OFDMA physical layer signaling, or may not carry the OFDMA physical layer signaling. The terminal determines, according to the OFDMA physical layer signaling, a subchannel on which the terminal sends the ACK response or the BA response to the access point.

Representation of the dedicated information bit may be to identify the ACK request frame or the BA request frame as a frame type used for instructing the terminal to send an ACK response or a BA response to the access point in the OFDMA mode (that is, a new frame type different from a conventional ACK request frame or BA request frame). Representation of another dedicated information bit may also be: in a case in which a frame type of the ACK request frame or BA request frame is not changed, the dedicated information bit is directly used for instructing the terminal to send an ACK response or a BA response to the access point in the OFDMA mode.

Additionally, similar to the OFDM preamble, the ACK request frame or BA request frame may be sent only on the primary channel, or may be sent on all subchannels in a duplicated transmission manner.

S21: The terminal sends the ACK response or the BA response to the access point on the corresponding subchannel in the OFDMA mode.

Specifically, after learning, according to the OFDMA physical layer signaling, the subchannel on which the terminal sends the ACK response or BA response to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and corresponding time frequency resources are fully used.

Optionally, if the subchannel of the terminal is multiple unit channels (such as, channels whose unit is 20 MHz), the terminal may send an ACK responses or a BA responses on these multiple unit channels in the duplicated transmission manner, or may send an ACK responses or a BA responses in a non-duplicated transmission manner.

In the data transmission indication method provided in this embodiment of the present invention, a terminal receives OFDMA physical layer signaling sent by an access point, and determines, according to the OFDM physical layer signaling, a subchannel on which an ACK response or a BA response is sent to the access point. That is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 20

Figure 17:
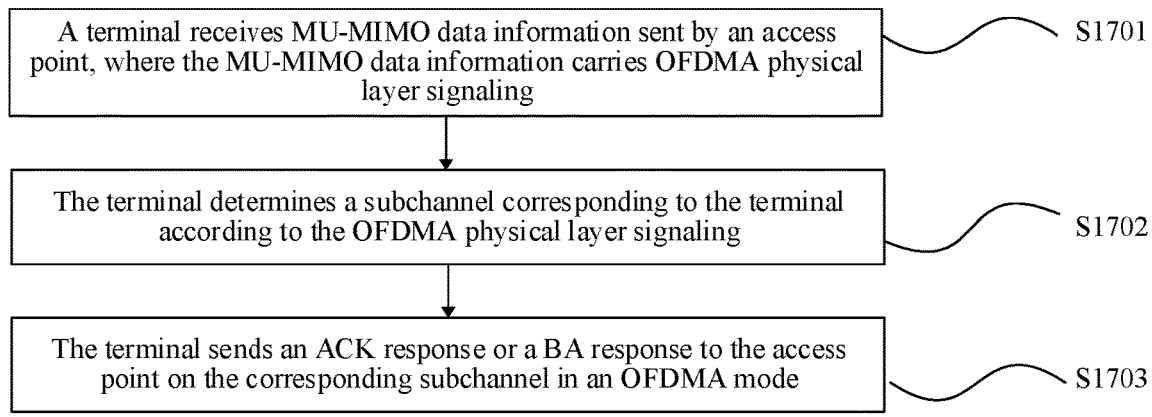
FIG. 17 is a schematic flowchart of Embodiment 20 of a data transmission indication method according to the present invention.

FIG. 17 is a schematic flowchart of Embodiment 20 of a data transmission indication method according to the present invention. The method involved in this embodiment is a process in which an access point sends MU-MIMO data information carrying OFDMA physical layer signaling to a terminal, and adds an OFDMA ACK request or an OFDMA BA request to the OFDMA physical layer signaling, so that the terminal replies with an ACK response or a BA response on a subchannel corresponding to the terminal in an OFDMA mode. As shown in FIG. 17, the method includes:

S1701: A terminal receives MU-MIMO data information sent by an access point, where the MU-MIMO data information carries OFDMA physical layer signaling.

Specifically, the OFDMA physical layer signaling carried in the foregoing MU-MIMO data information further includes an OFDMA ACK request or OFDMA BA request, used for instructing the terminal to send an ACK response or a BA response to the access point in the OFDMA mode, that is, the access point requests the terminal to reply with an ACK response or a BA response after the terminal obtains the corresponding MU-MIMO data information. The OFDMA physical layer signaling is used for indicating, to the terminal, the subchannel on which the ACK response or the BA response is sent to the access point and that is allocated for the terminal.

S1702: The terminal determines a subchannel corresponding to the terminal according to the OFDMA physical layer signaling.

It should be noted that, for content included in the OFDMA physical layer signaling in this embodiment of the present invention, reference may be made to the description in Embodiment 14 to Embodiment 16, and details are not described herein again in this embodiment of the present invention.

S1703: The terminal sends an ACK response or a BA response to the access point on the corresponding subchannel in an OFDMA mode.

Specifically, after determining, according to the OFDMA physical layer signaling, the subchannel on which the ACK response or BA response is sent to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, a terminal receives MU-MIMO data information carrying OFDMA physical layer signaling and sent by an access point, and determines, according to the OFDMA physical layer signaling, a subchannel on which the terminal sends an ACK response or a BA response to the access point, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 21

Figure 18:
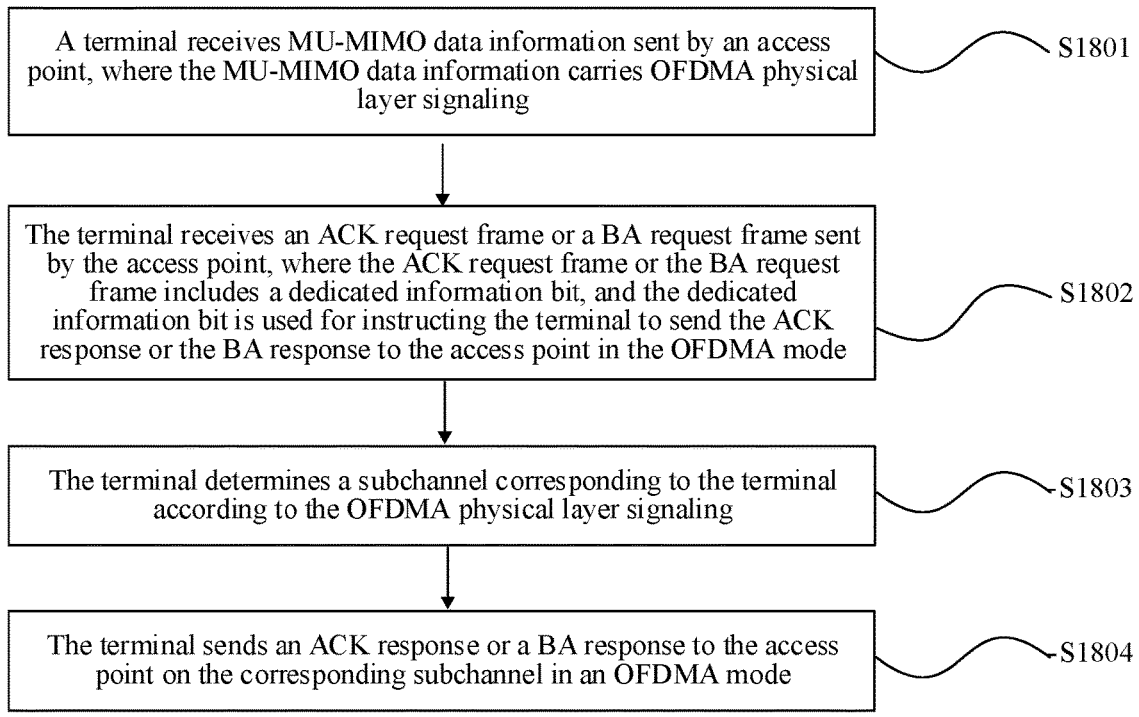
FIG. 18 is a schematic flowchart of Embodiment 21 of a data transmission indication method according to the present invention.

FIG. 18 is a schematic flowchart of Embodiment 21 of a data transmission indication method according to the present invention. The method involved in this embodiment is a process in which an access point sends MU-MIMO data information carrying OFDMA physical layer signaling, and an ACK request frame or a BA request frame to a terminal, so that the terminal replies with an ACK response or a BA response on a subchannel corresponding to the terminal in an OFDMA mode. As shown in FIG. 18, the method includes:

S1801: A terminal receives MU-MIMO data information sent by an access point, where the MU-MIMO data information carries OFDMA physical layer signaling.

Specifically, the OFDMA physical layer signaling is used for indicating, to the terminal, the subchannel on which the ACK response or the BA response is sent to the access point and that is allocated for the terminal.

S1802: The terminal receives an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode.

Specifically, the terminal receives the ACK request frame or the BA request frame sent by the access point, that is, the access point requests the terminal to reply to the access point with an ACK response or a BA response to the terminal in the OFDMA mode after the terminal obtains corresponding MU-MIMO data information, so as to learn whether the MU-MIMO data information is transmitted successfully.

S1803: The terminal determines a subchannel corresponding to the terminal according to the OFDMA physical layer signaling.

It should be noted that, for content included in the OFDMA physical layer signaling in this embodiment of the present invention, reference may be made to the description in Embodiment 14 to Embodiment 16, and details are not described herein again in this embodiment of the present invention.

S1804: The terminal sends an ACK response or a BA response to the access point on the corresponding subchannel in an OFDMA mode.

Specifically, after determining, according to the OFDMA physical layer signaling, the subchannel on which the ACK response or BA response is sent to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, a terminal receives MU-MIMO data information carrying OFDMA physical layer signaling and sent by an access point, and determines, according to the OFDMA physical layer signaling, a subchannel on which an ACK response or a BA response is sent to the access point, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 22

Figure 19:
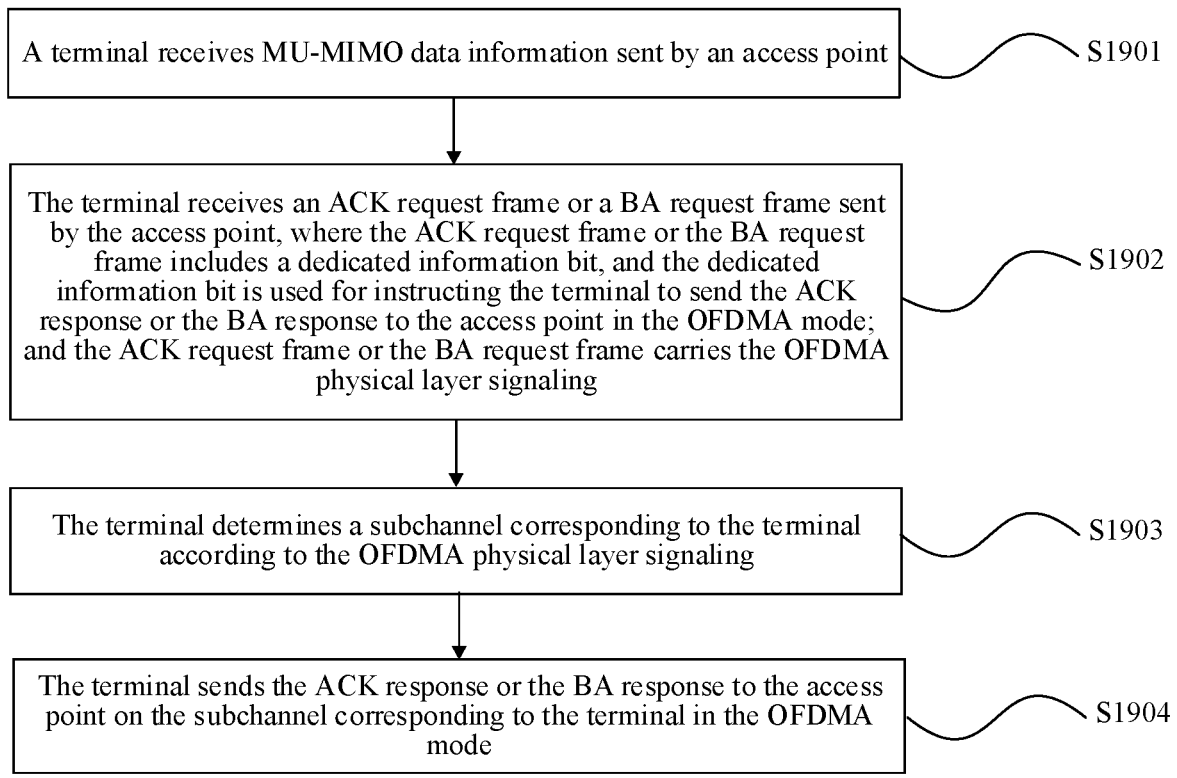
FIG. 19 is a schematic flowchart of Embodiment 22 of a data transmission indication method according to the present invention.

FIG. 19 is a schematic flowchart of Embodiment 22 of a data transmission indication method according to the present invention. The method involved in this embodiment is a process in which an access point sends an ACK request frame or a BA request frame carrying OFDMA physical layer signaling to a terminal, so that the terminal replies with an ACK response or a BA response on a subchannel corresponding to the terminal in an OFDMA mode. As shown in FIG. 19, the method includes:

S1901: A terminal receives MU-MIMO data information sent by an access point.

S1902: The terminal receives an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the ACK request frame or the BA request frame carries the OFDMA physical layer signaling.

Specifically, the ACK request frame or the BA request frame sent by the access point to the terminal has an objective that lies in that the access point requests the terminal to reply to the access point with an ACK response or a BA response after the terminal obtains corresponding MU-MIMO data information, so as to learn whether the MU-MIMO data information is transmitted successfully. The OFDMA physical layer signaling carried in the ACK request frame or the BA request frame is used for indicating, to the terminal, the subchannel on which the ACK response or the BA response is sent to the access point and that is allocated for the terminal.

S1903: The terminal determines a subchannel corresponding to the terminal according to the OFDMA physical layer signaling.

It should be noted that, for content included in the OFDMA physical layer signaling in this embodiment of the present invention, reference may be made to the description in Embodiment 14 to Embodiment 16, and details are not described herein again in this embodiment of the present invention.

S1904: The terminal sends the ACK response or the BA response to the access point on the subchannel corresponding to the terminal in the OFDMA mode.

Specifically, after determining, according to the OFDMA physical layer signaling, the subchannel on which the ACK response or BA response is sent to the access point, the terminal sends the ACK response or BA response to the access point on the corresponding subchannel in the OFDMA mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, a terminal receives an ACK request frame or a BA request frame carrying OFDMA physical layer signaling and sent by an access point, and determines, according to the OFDMA physical layer signaling, a subchannel on which an ACK response or a BA response is sent to the access point, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 23

Figure 20:
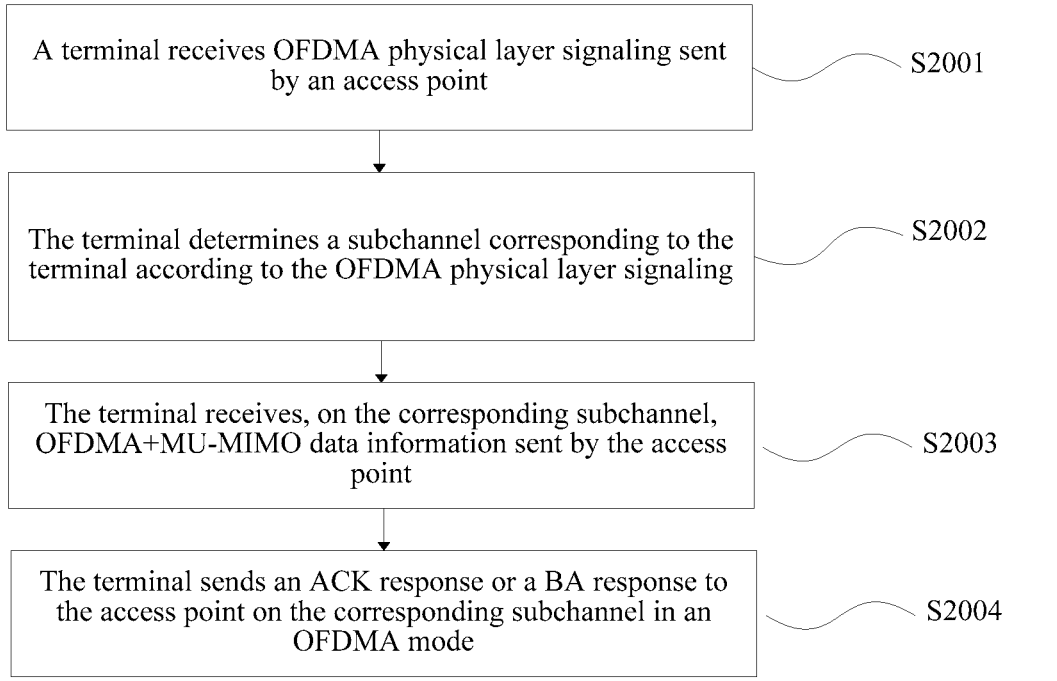
FIG. 20 is a schematic flowchart of Embodiment 23 of a data transmission indication method according to the present invention.

FIG. 20 is a schematic flowchart of Embodiment 23 of a data transmission indication method according to the present invention. The method involved in this embodiment is a process in which an access point sends OFDMA physical layer signaling carrying an OFDMA ACK request or an OFDMA BA request to a terminal, so that the terminal replies with an ACK response or a BA response on a subchannel corresponding to the terminal in an OFDMA mode. As shown in FIG. 20, the method includes:

S2001: A terminal receives OFDMA physical layer signaling sent by an access point.

Specifically, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode, that is, the access point requests the terminal to reply to the access point with an ACK response or a BA response after the terminal obtains corresponding OFDMA+MU-MIMO data information, so as to learn whether the following OFDMA+MU-MIMO data information is transmitted successfully. The OFDMA physical layer signaling is used for indicating, to the terminal, the corresponding subchannel on which the ACK response or the BA response is sent to the access point and that is allocated for the terminal.

S2002: The terminal determines a subchannel corresponding to the terminal according to the OFDMA physical layer signaling.

It should be noted that, for the OFDMA physical layer signaling in this embodiment of the present invention, reference may be made to the description in Embodiment 14 to Embodiment 16, and details are not described herein again in this embodiment of the present invention.

S2003: The terminal receives, on the corresponding subchannel, OFDMA+MU-MIMO data information sent by the access point.

Optionally, the OFDMA+MU-MIMO data information may carry the OFDMA physical layer signaling, or may not carry the OFDMA physical layer signaling.

S2004: The terminal sends an ACK response or a BA response to the access point on the corresponding subchannel in an OFDMA mode.

Specifically, after determining, according to the OFDMA physical layer signaling, the subchannel on which the ACK response or BA response is sent to the access point, the terminal sends the ACK response or BA response to the access point on the corresponding subchannel in an OFDMA+MU-MIMO mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, a terminal receives OFDMA physical layer signaling sent by an access point, and determines, according to the OFDMA physical layer signaling, a subchannel on which an ACK response or a BA response is sent to the access point, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 24

Figure 21:
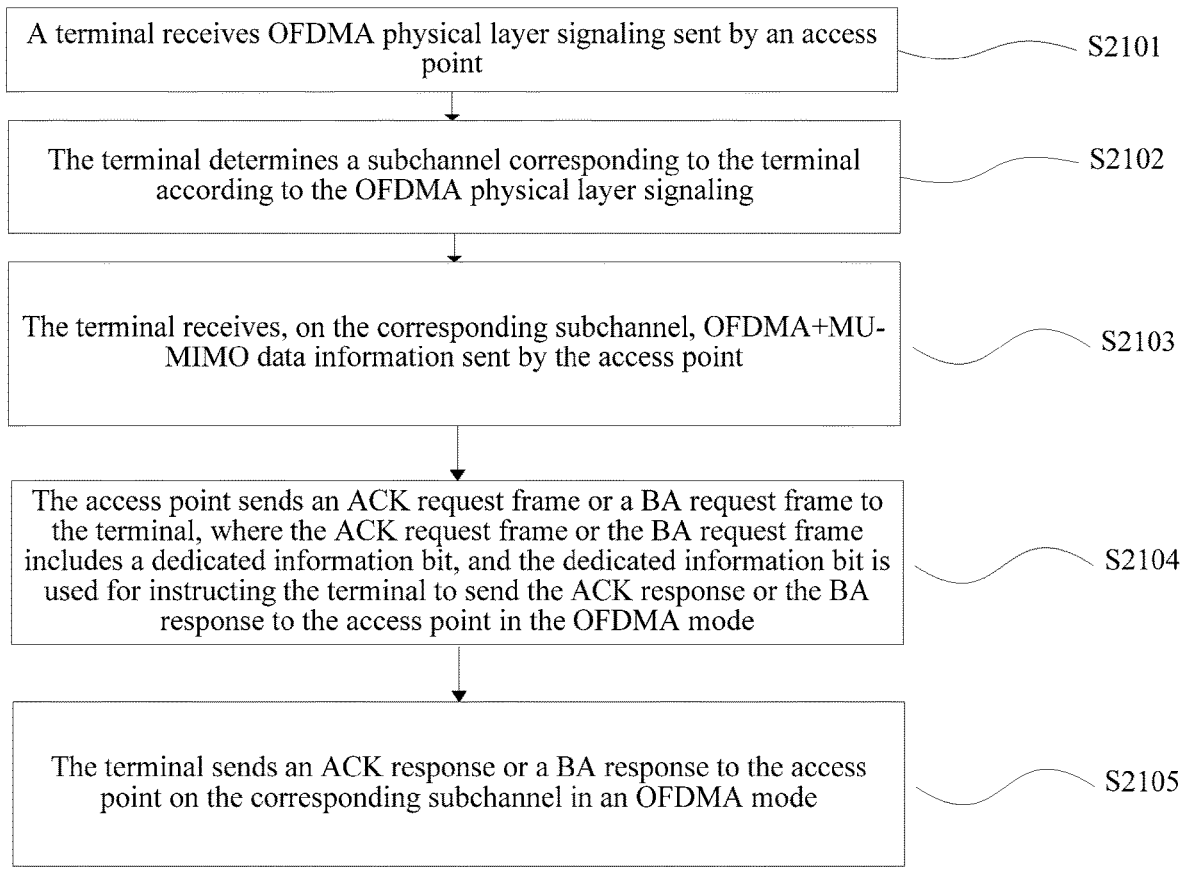
FIG. 21 is a schematic flowchart of Embodiment 24 of a data transmission indication method according to the present invention.

FIG. 21 is a schematic flowchart of Embodiment 24 of a data transmission indication method according to the present invention. The method involved in this embodiment is a process in which an access point sends OFDMA physical layer signaling, and an ACK request frame or a BA request frame to a terminal, so that the terminal replies with an ACK response or a BA response on a subchannel corresponding to the terminal in an OFDMA mode. As shown in FIG. 21, the method includes:

S2101: A terminal receives OFDMA physical layer signaling sent by an access point.

Specifically, the OFDMA physical layer signaling is used for indicating, to the terminal, the corresponding subchannel on which the ACK response or the BA response is sent to the access point and that is allocated for the terminal.

S2102: The terminal determines a subchannel corresponding to the terminal according to the OFDMA physical layer signaling.

It should be noted that, for the OFDMA physical layer signaling in this embodiment of the present invention, reference may be made to the description in Embodiment 14 to Embodiment 16, and details are not described herein again in this embodiment of the present invention.

S2103: The terminal receives, on the corresponding subchannel, OFDMA+MU-MIMO data information sent by the access point.

Optionally, the OFDMA+MU-MIMO data information may carry the OFDMA physical layer signaling, or may not carry the OFDMA physical layer signaling.

S2104: The access point sends an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode.

Specifically, that is, the access point requests, by using an ACK request frame or a BA request frame, the terminal to reply to the access point with an ACK response or a BA response after the terminal obtains corresponding MU-MIMO data information, so as to learn whether the following OFDMA+MU-MIMO data information is transmitted successfully.

Optionally, the ACK request frame or the BA request frame may carry the OFDMA physical layer signaling, or may not carry the OFDMA physical layer signaling. Moreover, optionally, when the foregoing OFDMA+MU-MIMO data information carries the OFDMA physical layer signaling, the ACK request frame or the BA request frame may not carry the OFDMA physical layer signaling; or when the foregoing OFDMA+MU-MIMO data information does not carry the OFDMA physical layer signaling, the ACK request frame or the BA request frame may carry the OFDMA physical layer signaling.

S2105: The terminal sends an ACK response or a BA response to the access point on the corresponding subchannel in an OFDMA mode.

Specifically, after determining, according to the OFDMA physical layer signaling, the subchannel on which the ACK response or BA response is sent to the access point, the terminal determines according to the dedicated information bit in the ACK request frame or the BA request frame to send the ACK response or BA response to the access point on the corresponding subchannel in the OFDMA+MU-MIMO mode. That is, all terminals may send ACK responses or BA responses to the access point on respective corresponding subchannels at the same time, that is, ACK responses or BA responses of multiple terminals may be transmitted in parallel, and then corresponding time frequency resources can be fully used.

In the data transmission indication method provided in this embodiment of the present invention, a terminal receives OFDMA physical layer signaling sent by an access point, and determines, according to the OFDMA physical layer signaling, a subchannel on which an ACK response or a BA response is sent to the access point, so that terminals may send ACK responses or BA responses to the access point on corresponding subchannels at the same time, that is, a manner in which the access point allocates a subchannel for each terminal according to OFDMA physical layer signaling enables the access point to perform an indication for more terminals when sending ACK responses or BA responses to the access point, that is, a quantity of terminals to which the access point indicates subchannels is not limited, and therefore ACK responses or BA responses of multiple terminals are transmitted to the access point in parallel, and corresponding time frequency resources are fully used.

Embodiment 25

Figure 22:
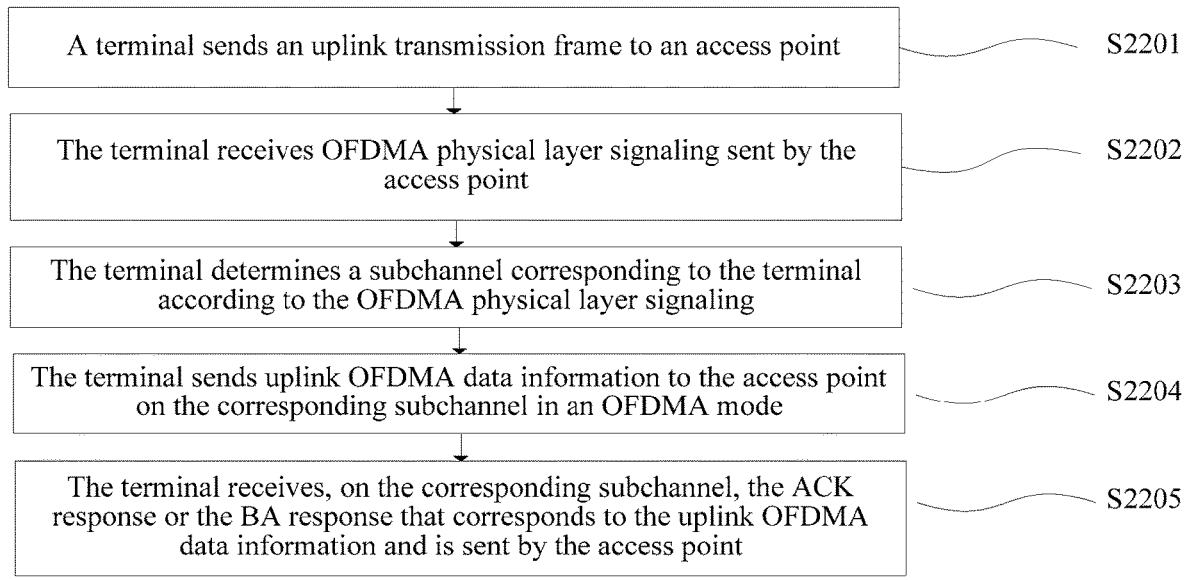
FIG. 22 is a schematic flowchart of Embodiment 25 of a data transmission indication method according to the present invention.

FIG. 22 is a schematic flowchart of Embodiment 25 of a data transmission indication method according to the present invention. The method of this embodiment involves a process of transmission of uplink OFDMA data information initiated by a terminal. The method specifically includes the following steps:

S2201: A terminal sends an uplink transmission frame to an access point.

Specifically, the method involved in this embodiment is the foregoing process of transmission of uplink OFDMA data information initiated by a STA, and the uplink transmission frame carries an OFDMA data transmission request.

The terminal may transmit an uplink transmission frame in an OFDM mode, where the uplink transmission frame may be specifically of any type. The terminal may add an OFDMA data transmission request to the uplink transmission frame, where the OFDMA data transmission request is used for requesting the access point to complete subsequent data transmission in an OFDMA mode.

After receiving the uplink transmission frame of the terminal, the access point decides according to the OFDMA data transmission request of the terminal or a current network situation whether to switch the terminal to the OFDMA mode to perform transmission, for example, whether there is a requirement from another terminal at the access point. If the access point determines that the terminal needs to be switched to the OFDMA mode, the access point uses the OFDMA mode in subsequent data transmission; or if a determining result of the access point is that the terminal is not switched to the OFDMA mode, the access point continues to perform data transmission in the OFDM mode.

S2202: The terminal receives OFDMA physical layer signaling sent by the access point.

Specifically, when the access point determines according to the OFDMA data transmission request or the current network situation that the terminal needs to be switched to the OFDMA mode, and performs data transmission in the OFDMA mode, the access point sends the OFDMA physical layer signaling to the terminal, where the OFDMA physical layer signaling is used for instructing terminals to send the uplink OFDMA data information on respective corresponding subchannels.

It should be noted that, the OFDMA physical layer signaling may be carried in the OFDM preamble in the foregoing embodiment, or may be carried in the NDPA frame, or the NDPA frame and the OFDM preamble may cooperate with each other to carry the OFDMA physical layer signaling. For a specific process, reference may be made to the foregoing embodiment, and details are not described herein again.

Optionally, after S2202, the access point may further send downlink OFDMA data information of the terminals on the respective subchannels corresponding to the foregoing terminals. For a downlink OFDMA data transmission process, reference may be made to the foregoing embodiment, and details are not described herein again.

S2203: The terminal determines a subchannel corresponding to the terminal according to the OFDMA physical layer signaling.

Specifically, the terminal learns, by using the subchannel indicated by the OFDMA physical layer signaling, the subchannel on which the terminal sends the uplink OFDMA data information to the access point, that is, signaling indication occurring when the access point additionally instructs the terminal to transmit the uplink OFDMA data information is avoided, and system efficiency is improved.

S2204: The terminal sends uplink OFDMA data information to the access point on the corresponding subchannel in an OFDMA mode.

After determining, according to the OFDMA physical layer signaling, a subchannel on which the uplink OFDMA data information is sent to the access point, the terminal sends the uplink OFDMA data information to the access point on the subchannel.

Optionally, if after S2202, the access point further sends downlink OFDMA data information to the terminal, after the terminal receives, on a corresponding subchannel, the downlink OFDMA data information sent by the access point and waits for a fixed time length, the terminal sends the uplink OFDMA data information associated with the terminal on the subchannel.

In the data transmission indication method provided in this embodiment of the present invention, a terminal sends an uplink transmission frame to an access point, so that the access point indicates, for each terminal by using OFDMA physical layer signaling, a subchannel on which uplink OFDMA data information is sent, and therefore each terminal may send data to the access point on the corresponding subchannel. That is, a subchannel is allocated for a terminal in a manner in which the access point sends the OFDMA physical layer signaling, so that the access point may perform an indication for more terminals when the uplink OFDMA data information is sent to the access point, signaling indication occurring when the access point additionally instructs the terminal to transmit the uplink OFDMA data information is avoided, and system efficiency is improved.

Further, the method involved in this embodiment is directed to a process in which in the foregoing scenario shown in FIG. 22 that a terminal sends uplink OFDMA data information to an access point, after sending the uplink OFDMA data information to the access point, the terminal receives an ACK response or a BA response that is sent by the access point on a corresponding subchannel. Further, after S2204, the method further includes:

S2205: The terminal receives, on the corresponding subchannel, the ACK response or the BA response corresponding to the uplink OFDMA data information and sent by the access point.

Specifically, the terminal sends the uplink OFDMA data information to the access point on the subchannel corresponding to the terminal, where the uplink OFDMA data information carries an OFDMA ACK request or an OFDMA BA request, and the OFDMA ACK request or the OFDMA BA request is used for instructing the access point to send an ACK response or a BA response to the terminal in the OFDMA mode, that is, making the access point feed back a transmission situation of the uplink OFDMA data information to the terminal.

The access point is a subject sending the OFDMA physical layer signaling, and therefore, the access point may directly send the ACK response or the BA response of the uplink OFDMA data information associated with the terminal on the corresponding subchannel to the terminal, so that terminal learns whether the uplink OFDMA data is transmitted successfully.

In the data transmission indication method provided in this embodiment of the present invention, an ACK request or a BA request is carried in uplink OFDMA data information sent by a terminal to an access point, so that the access point can send an ACK response or a BA response corresponding to the uplink OFDMA data information to the terminal on a corresponding subchannel. That is, a manner in which the access point allocates a subchannel for each terminal according to OFDMA physical layer signaling enables the access point to perform an indication for more terminals when sending uplink OFDMA data to the access point, that is, a quantity of terminals to which the access point indicates subchannels is not limited, and therefore the terminal can learn according to the ACK response or the BA response sent by the access point, whether the uplink OFDMA data is transmitted successfully.

Embodiment 26

Figure 23:
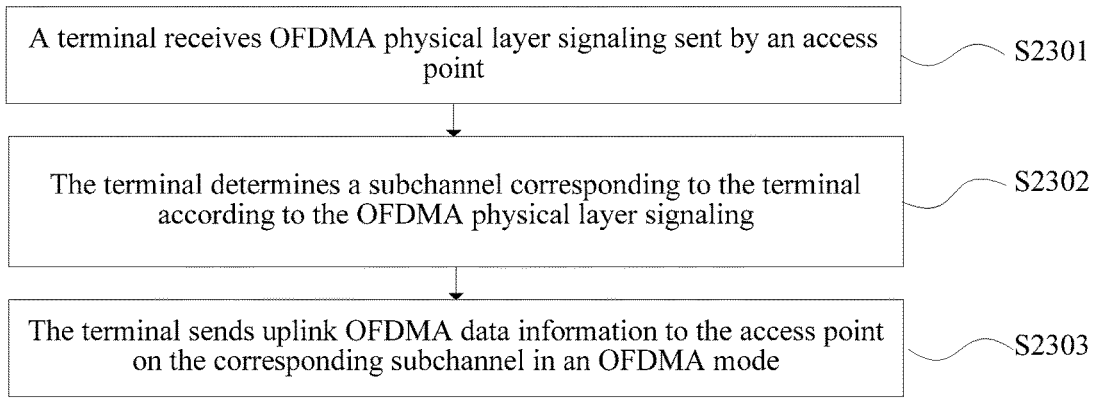
FIG. 23 is a schematic flowchart of Embodiment 26 of a data transmission indication method according to the present invention.

FIG. 23 is a schematic flowchart of Embodiment 26 of a data transmission indication method according to the present invention. The method of this embodiment involves a process of transmission of uplink OFDMA data information initiated by an access point. The method specifically includes the following steps:

S2301: A terminal receives OFDMA physical layer signaling sent by an access point.

Specifically, the OFDMA physical layer signaling may be carried in the OFDM preamble in the foregoing embodiment, or may be carried in the NDPA frame, or the NDPA frame and the OFDM preamble may cooperate with each other to carry the OFDMA physical layer signaling. For a specific process, reference may be made to the foregoing embodiment, and details are not described herein again.

The OFDMA physical layer signaling is specifically used for indicating, to the terminal, the subchannel that corresponds to the terminal, on which uplink OFDMA data information is sent to the access point and that is allocated for the terminal. Optionally, in all embodiments of the present invention, the OFDMA physical layer signaling may include an information bit, used for indicating, to the terminal, whether the allocation of the subchannel is used for an uplink, or only used for a downlink, or used for both an uplink and a downlink. In this embodiment, the information bit in the OFDMA physical layer signaling indicates, to the terminal, that the subchannel is a subchannel used for uplink transmission. In a case in which the access point obtains a channel use right, the terminal is instructed by using the delivered OFDMA physical layer signaling to send the uplink OFDMA data information to the access point on the corresponding subchannel.

S2302: The terminal determines a subchannel corresponding to the terminal according to the OFDMA physical layer signaling.

Specifically, the terminal learns, by using the subchannel indicated by the OFDMA physical layer signaling, the subchannel on which the terminal sends the uplink OFDMA data information to the access point, that is, signaling indication occurring when the access point additionally instructs the terminal to transmit the uplink OFDMA data information is avoided, and system efficiency is improved.

S2303: The terminal sends uplink OFDMA data information to the access point on the corresponding subchannel in an OFDMA mode.

Specifically, after determining, according to the OFDMA physical layer signaling, a subchannel on which the uplink OFDMA data information is sent to the access point, the terminal sends the uplink OFDMA data information to the access point on the subchannel.

In the data transmission indication method provided in this embodiment of the present invention, an access point indicates, for a terminal by using OFDMA physical layer signaling, a subchannel on which uplink OFDMA data is sent, so that each terminals may send data to the access point on a corresponding subchannels. That is, a subchannel is allocated for each terminal in a manner in which the access point sends the OFDMA physical layer signaling, so that the access point may perform an indication for more terminals when sending uplink OFDMA data to the access point, that is, a quantity of terminals to which the access point indicates subchannels is not limited.

Persons of ordinary skill in the art should understand that, all or part of the steps of the foregoing method embodiments may be implemented by a program instructing relevant hardware. The foregoing program may be stored in a computer readable storage medium. When the program is run, the foregoing steps included in the method embodiments are performed. The foregoing storage medium may be any medium capable of storing program code, such as a read-only memory (ROM), a random access memory (RAM), a magnetic disk, or an optical disc.

An access point embodiment 1 of the present invention provides an access point, where the access point includes: a sending module 10, configured to send OFDMA physical layer signaling to a terminal, where the OFDMA physical layer signaling is used for indicating, to the terminal, a subchannel allocated for the terminal, so that the terminal determines the subchannel corresponding to the terminal according to the OFDMA physical layer signaling, where the OFDMA physical layer signaling includes an identifier of the terminal and subchannel information corresponding to the identifier of the terminal.

The access point provided in this embodiment of the present invention may perform the technical solutions of the embodiments of the foregoing data transmission indication methods, whose implementation principles and technical effects are similar, and details are not described herein again.

Optionally, the identifier of the terminal is an identifier of one or more terminal groups, and each terminal group includes at least one terminal; and the subchannel information includes an uplink subchannel or a downlink subchannel or an uplink and downlink bidirectional subchannel, and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where terminal groups and subchannels are in a one-to-one correspondence; and then the sending module 10 is further configured to: before the OFDMA physical layer signaling is sent to the terminal, send a mapping relationship between an identifier of the terminal group and an address of the terminal to the terminal, so that the terminal learns a terminal group in which the terminal is located.

Optionally, the identifier of the terminal is an identifier of one terminal group, and the terminal group includes at least two terminals; and then the OFDMA physical layer signaling is used for indicating to each terminal in the terminal group that the allocated subchannel is an uplink subchannel or a downlink subchannel or an uplink and downlink bidirectional subchannel, where each terminal in the terminal group and the subchannel are in a one-to-one correspondence.

The access point provided in this embodiment of the present invention may perform the technical solutions of the embodiments of the foregoing data transmission indication methods, whose implementation principles and technical effects are similar, and details are not described herein again.

Optionally, the sending module 10 is specifically configured to send an OFDM preamble to the terminal, where the OFDM preamble carries the OFDMA physical layer signaling.

Optionally, the sending module 10 is further configured to send a NDPA frame to the terminal, where the NDPA frame carries the foregoing OFDMA physical layer signaling.

Optionally, the sending module 10 is further configured to send an NDPA frame and an OFDM preamble to the terminal, where the NDPA frame carries an identifier of the terminal in the foregoing OFDMA physical layer signaling, and the OFDM preamble carries subchannel information corresponding to the identifier of the terminal and being in the foregoing OFDMA physical layer signaling.

Optionally, the sending module 10 is further configured to send an NDPA frame and an OFDM preamble to the terminal, where the NDPA frame carries subchannel information corresponding to an identifier of the terminal and being in the foregoing OFDMA physical layer signaling, and the OFDM preamble carries the identifier of the terminal in the foregoing OFDMA physical layer signaling.

The access point provided in this embodiment of the present invention may perform the technical solutions of the embodiments of the foregoing data transmission indication methods, whose implementation principles and technical effects are similar, and details are not described herein again.

Figure 24:
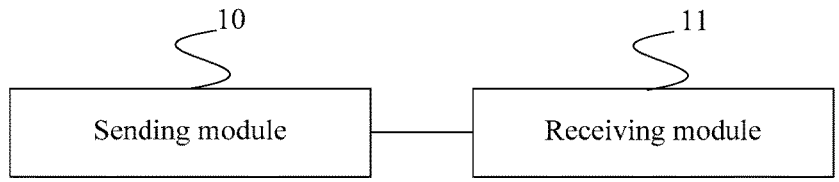
FIG. 24 is a schematic structural diagram of Embodiment 2 of an access point according to the present invention.

FIG. 24 is a schematic structural diagram of Embodiment 2 of an access point according to the present invention. Further, on the basis of the foregoing apparatus embodiment 1, the OFDMA physical layer signaling is specifically used for indicating, to the terminal, a subchannel that is allocated to the terminal for receiving downlink OFDMA data information, and then the sending module 10 is further configured to: after the OFDMA physical layer signaling is sent to the terminal, send downlink OFDMA data information on the subchannel corresponding to the terminal in an OFDMA mode, where the downlink OFDMA data information includes an OFDMA preamble and OFDMA data, and the OFDMA preamble includes a switching field and UHT-SIG-B.

Further, the OFDMA physical layer signaling or the downlink OFDMA data information carries an OFDMA ACK request or an OFDMA BA request, and the OFDMA ACK request or the OFDMA BA request is used for instructing the terminal to send an ACK response or a BA response to the access point in the OFDMA mode; and then the OFDMA physical layer signaling is further used for indicating the subchannel that corresponds to the terminal, on which the ACK response or the BA response is sent to the access point and that is allocated for the terminal.

Then, on the basis of the foregoing apparatus embodiment 1, referring to FIG. 24, the access point further includes a receiving module 11, configured to: after the sending module 10 sends the downlink OFDMA data information on the subchannel corresponding to the terminal in the OFDMA mode, receive the ACK response or the BA response that is sent by the terminal on the subchannel corresponding to the terminal in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling is used for indicating the subchannel that corresponds to the terminal, on which the ACK response or the BA response is sent to the access point and that is allocated for the terminal; and then the sending module 10 is further configured to: after the downlink OFDMA data information is sent on the subchannel corresponding to the terminal, send an ACK request frame or a BA request frame to the terminal; and the receiving module 11 is further configured to receive the ACK response or the BA response that is sent by the terminal on the corresponding subchannel in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the sending module 10 is specifically configured to send MU-MIMO data information to the terminal in a MU-MIMO mode, where the MU-MIMO data information carries the OFDMA physical layer signaling; and the receiving module 11 is further configured to: after the sending module 10 sends the OFDMA physical layer signaling to the terminal, receive the ACK response or the BA response that is sent by the terminal on the corresponding subchannel in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling is specifically used for indicating, to the terminal, the subchannel that corresponds to the terminal, on which the ACK response or the BA response is sent to the access point and that is allocated for the terminal; and then the sending module 10 is specifically configured to send MU-MIMO data information to the terminal in a MU-MIMO mode, where the MU-MIMO data information carries OFDMA physical layer signaling; and send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the receiving module 11 is further configured to: after the sending module 10 sends the OFDMA physical layer signaling to the terminal, receive the ACK response or the BA response that is sent by the terminal on the subchannel corresponding to the terminal in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling is specifically used for indicating, to the terminal, the subchannel that corresponds to the terminal, on which the ACK response or the BA response is sent to the access point and that is allocated for the terminal; and then the sending module 10 is specifically configured to send MU-MIMO data information to the terminal in a MU-MIMO mode; and send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the ACK request frame or the BA request frame carries the OFDMA physical layer signaling; and the receiving module 11 is further configured to: after the sending module 10 sends the OFDMA physical layer signaling to the terminal, receive the ACK response or the BA response that is sent by the terminal on the corresponding subchannel in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the sending module 10 is further configured to: after the OFDMA physical layer signaling is sent to the terminal, send OFDMA+MU-MIMO data information to the terminal on the subchannel corresponding to the terminal in an OFDMA+MU-MIMO mode; and the receiving module 11 is further configured to receive the ACK response or the BA response that is sent by the terminal on the corresponding subchannel in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling is specifically used for indicating, to the terminal, the subchannel that corresponds to the terminal, on which the ACK response or the BA response is sent to the access point and that is allocated for the terminal; and then the sending module 10 is further configured to: after the OFDMA physical layer signaling is sent to the terminal, send OFDMA+MU-MIMO data information to the terminal on the subchannel corresponding to the terminal in an OFDMA+MU-MIMO mode; and send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the receiving module 11 is further configured to receive the ACK response or the BA response that is sent by the terminal on the corresponding subchannel in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling is specifically used for indicating, to the terminal, the subchannel that corresponds to the terminal, on which uplink OFDMA data information is sent to the access point and that is allocated for the terminal; and then the receiving module 11 is further configured to: before the sending module 10 sends the OFDMA physical layer signaling to the terminal, receive an uplink transmission frame sent by the terminal; and after the sending module 10 sends the OFDMA physical layer signaling to the terminal, receive the uplink OFDMA data information that is sent by the terminal on the corresponding subchannel in an OFDMA mode.

Further, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then the sending module 10 is further configured to: after the receiving module 11 receives the uplink OFDMA data information that is sent by the terminal on the corresponding subchannel, send the ACK response or the BA response corresponding to the uplink OFDMA data information on the subchannel corresponding to the terminal in the OFDMA mode.

The access point provided in this embodiment of the present invention may perform the technical solutions of the embodiments of the foregoing data transmission indication methods, whose implementation principles and technical effects are similar, and details are not described herein again.

Referring to FIG. 24 continuously, on the basis of the embodiment shown in FIG. 24, the OFDMA physical layer signaling is specifically used for indicating, to the terminal, the subchannel that corresponds to the terminal, on which uplink OFDMA data information is sent to the access point and that is allocated for the terminal; and then the receiving module 11 is further configured to: after the sending module 10 sends the OFDMA physical layer signaling to the terminal, receive the uplink OFDMA data information that is sent by the terminal on the corresponding subchannel in an OFDMA mode.

The access point provided in this embodiment of the present invention may perform the technical solutions of the embodiments of the foregoing data transmission indication methods, whose implementation principles and technical effects are similar, and details are not described herein again.

Figure 25:
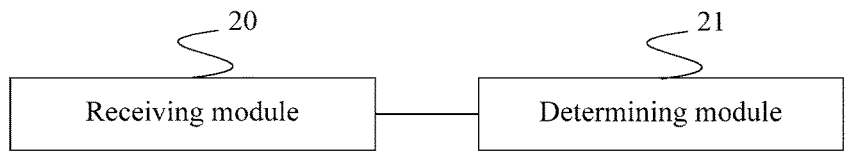
FIG. 25 is a schematic structural diagram of Embodiment 1 of a terminal according to the present invention.

FIG. 25 is a schematic structural diagram of Embodiment 1 of a terminal according to the present invention. As shown in FIG. 25, the terminal includes a receiving module 20 and a determining module 21.

The receiving module 20 is configured to receive OFDMA physical layer signaling sent by an access point, where the OFDMA physical layer signaling is used for indicating, to the terminal, a subchannel allocated by the access point for the terminal, where the OFDMA physical layer signaling includes an identifier of the terminal and subchannel information corresponding to the identifier of the terminal.

The determining module 21 is configured to determine the subchannel corresponding to the terminal according to the OFDMA physical layer signaling.

The terminal provided in this embodiment of the present invention may perform the technical solutions of the embodiments of the foregoing data transmission indication methods, whose implementation principles and technical effects are similar, and details are not described herein again.

Optionally, the identifier of the terminal is an identifier of one or more terminal groups, and each terminal group includes at least one terminal; and the subchannel information includes an uplink subchannel or a downlink subchannel or an uplink and downlink bidirectional subchannel, and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where terminal groups and subchannels are in a one-to-one correspondence; and then the receiving module 20 is further configured to: before the OFDMA physical layer signaling sent by the access point is received, receive a mapping relationship between an identifier of the terminal group and an address of the terminal, where the mapping relationship is sent by the access point; and then the determining module 21 is specifically configured to determine according to the mapping relationship that the terminal is located in the terminal group, and then determine that a subchannel corresponding to the terminal group is the subchannel corresponding to the terminal.

Optionally, the identifier of the terminal is an identifier of one terminal group, and the terminal group includes at least two terminals; and then the OFDMA physical layer signaling being used for indicating, to the terminal, a subchannel allocated for the terminal includes: the OFDMA physical layer signaling being used for indicating to each terminal in the terminal group that the allocated subchannel is an uplink subchannel or a downlink subchannel or an uplink and downlink bidirectional subchannel, where terminals in the terminal group and subchannels are in a one-to-one correspondence.

The terminal provided in this embodiment of the present invention may perform the technical solutions of the embodiments of the foregoing data transmission indication methods, whose implementation principles and technical effects are similar, and details are not described herein again.

On the basis of the embodiment shown in FIG. 25, further, the receiving module 20 is specifically configured to receive an OFDM preamble sent by the access point, where the OFDM preamble carries OFDMA physical layer signaling.

Optionally, the receiving module 20 is further configured to receive a NDPA frame sent by the access point, where the NDPA frame carries OFDMA physical layer signaling.

Optionally, the receiving module 20 is further configured to receive an NDPA frame and an OFDM preamble that are sent by the access point, where the NDPA frame carries the identifier of the terminal in the OFDMA physical layer signaling, and the OFDM preamble carries the subchannel information corresponding to the identifier of the terminal and being in the OFDMA physical layer signaling.

Optionally, the receiving module 20 is further configured to receive an NDPA frame and an OFDM preamble that are sent by the access point, where the NDPA frame carries subchannel information corresponding to an identifier of the terminal and being in the foregoing OFDMA physical layer signaling, and the OFDM preamble carries the identifier of the terminal in the foregoing OFDMA physical layer signaling.

The terminal provided in this embodiment of the present invention may perform the technical solutions of the embodiments of the foregoing data transmission indication methods, whose implementation principles and technical effects are similar, and details are not described herein again.

Figure 26:
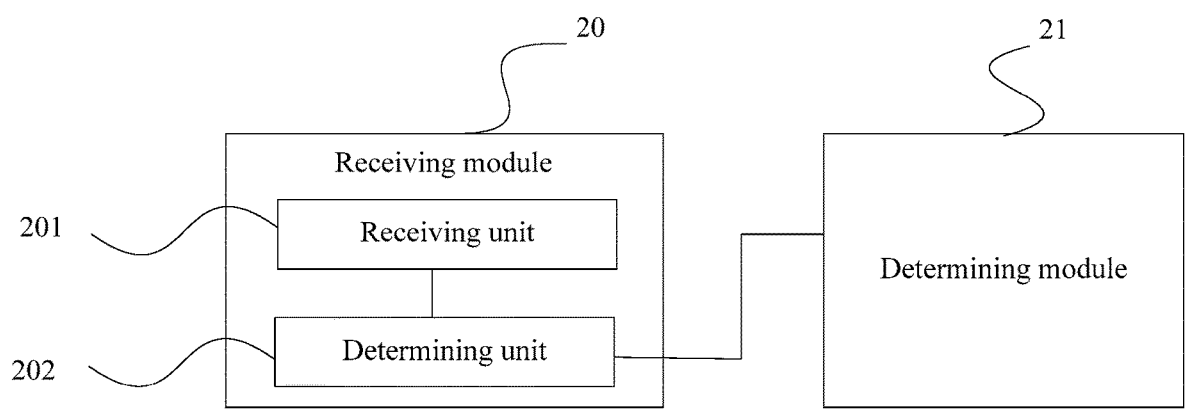
FIG. 26 is a schematic structural diagram of Embodiment 2 of a terminal according to the present invention.

FIG. 26 is a schematic structural diagram of Embodiment 2 of a terminal according to the present invention. On the basis of the embodiment shown in FIG. 25, further, the OFDMA physical layer signaling is specifically used for indicating, to the terminal, a subchannel that is allocated by the access point to the terminal for receiving downlink OFDMA data, and then the receiving module 20 is further configured to: after the determining module 21 determines the subchannel corresponding to the terminal according to the OFDMA physical layer signaling, receive, on the subchannel corresponding to the terminal, downlink OFDMA data information sent by the access point, where the downlink OFDMA data information includes an OFDMA preamble and OFDMA data, and the OFDMA preamble includes a switching field and UHT-SIG-B.

Then, on the basis of the embodiment shown in FIG. 25, further, the receiving module 20 includes: a receiving unit 201, configured to receive a destination terminal address corresponding to the OFDMA data and sent by the access point; and a determining unit 202, configured to determine whether the terminal matches the destination terminal address; and if yes, instruct the receiving unit 201 to receive, on the subchannel corresponding to the terminal, the downlink OFDMA data information sent by the access point.

The terminal provided in this embodiment of the present invention may perform the technical solutions of the embodiments of the foregoing data transmission indication methods, whose implementation principles and technical effects are similar, and details are not described herein again.

Figure 27:
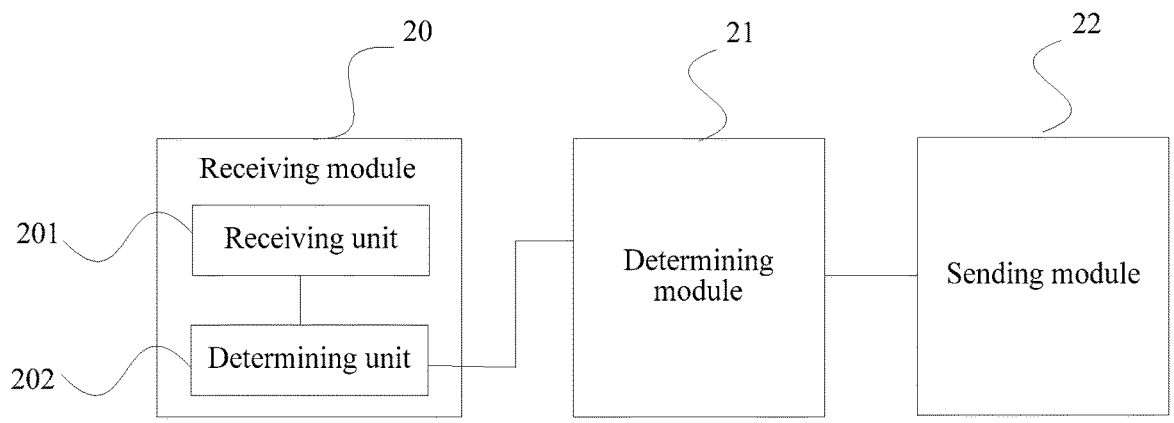
FIG. 27 is a schematic structural diagram of Embodiment 3 of a terminal according to the present invention.

FIG. 27 is a schematic structural diagram of Embodiment 3 of a terminal according to the present invention. The foregoing OFDMA physical layer signaling or the foregoing downlink OFDMA data information carries an OFDMA ACK request or an OFDMA BA request, and the OFDMA ACK request or the OFDMA BA request is used for instructing the terminal to send an ACK response or a BA response to the access point in an OFDMA mode; and then the foregoing OFDMA physical layer signaling is further used for indicating the subchannel that corresponds to the terminal, on which the ACK response or the BA response is sent to the access point and that is allocated for the terminal. Then, on the basis of the embodiment shown in FIG. 26, further, the foregoing terminal further includes: a sending module 22, configured to: after the receiving module 20 receives, on the subchannel corresponding to the terminal, the downlink OFDMA data information sent by the access point, send the ACK response or the BA response to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the foregoing OFDMA physical layer signaling is further used for indicating the subchannel that corresponds to the terminal, on which the ACK response or the BA response is sent to the access point and that is allocated for the terminal; and then the receiving module 20 is further configured to: after the downlink OFDMA data information sent by the access point is received on the subchannel corresponding to the terminal, receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the sending module 22 is further configured to send the ACK response or the BA response to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the receiving module 20 is specifically configured to receive MU-MIMO data information sent by the access point; and the sending module 22 is further configured to: after the determining module 21 determines the subchannel corresponding to the terminal according to the OFDMA physical layer signaling, send the ACK response or the BA response to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the OFDMA physical layer signaling is specifically used for indicating, to the terminal, the subchannel that corresponds to the terminal, on which the ACK response or the BA response is sent to the access point and that is allocated for the terminal; and then the receiving module 20 is specifically configured to receive MU-MIMO data information sent by the access point, where the MU-MIMO data information carries the foregoing OFDMA physical layer signaling; and receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the sending module 22 is further configured to: after the determining module 21 determines the subchannel corresponding to the terminal according to the OFDMA physical layer signaling, send the ACK response or the BA response to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the OFDMA physical layer signaling is specifically used for indicating, to the terminal, the subchannel that corresponds to the terminal, on which the ACK response or the BA response is sent to the access point and that is allocated for the terminal; and then the receiving module 20 is specifically configured to receive MU-MIMO data information sent by the access point, and receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the ACK request frame or the BA request frame carries the OFDMA physical layer signaling; and the sending module 22 is further configured to: after the determining module 21 determines the subchannel corresponding to the terminal according to the OFDMA physical layer signaling, send the ACK response or the BA response to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the receiving module 20 is further configured to: after the determining module 21 determines the subchannel corresponding to the terminal according to the OFDMA physical layer signaling, receive, on the subchannel corresponding to the terminal, OFDMA+MU-MIMO data information sent by the access point; and the sending module 22 is further configured to send the ACK response or the BA response to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the OFDMA physical layer signaling is specifically used for indicating, to the terminal, the subchannel that corresponds to the terminal, on which the ACK response or the BA response is sent to the access point and that is allocated for the terminal; and then the receiving module 20 is further configured to: after the determining module 21 determines the subchannel corresponding to the terminal according to the OFDMA physical layer signaling, receive, on the subchannel corresponding to the terminal, OFDMA+MU-MIMO data information sent by the access point; and receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the sending module 22 is further configured to send the ACK response or the BA response to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the OFDMA physical layer signaling is specifically used for indicating, to the terminal, a subchannel on which uplink OFDMA data information is sent to the access point and that is allocated for the terminal; and then the sending module 22 is further configured to: before the receiving module 20 receives the OFDMA physical layer signaling sent by the access point, send an uplink transmission frame to the access point; and further configured to: after the determining module 21 determines the subchannel corresponding to the terminal according to the OFDMA physical layer signaling, send the uplink OFDMA data information to the access point on the subchannel corresponding to the terminal in the OFDMA mode.

Further, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then the receiving module 20 is further configured to: after the sending module 22 sends the uplink OFDMA data information to the access point, receive, on the subchannel corresponding to the terminal, the ACK response or the BA response corresponding to the uplink OFDMA data information and sent by the access point.

The terminal provided in this embodiment of the present invention may perform the technical solutions of the embodiments of the foregoing data transmission indication methods, whose implementation principles and technical effects are similar, and details are not described herein again.

Referring to FIG. 27 continuously, the OFDMA physical layer signaling is specifically used for indicating, to the terminal, a subchannel corresponding to the terminal on which uplink OFDMA data information is sent to the access point and that is allocated for the terminal; and then the sending module 22 is further configured to: after the determining module 21 determines the subchannel corresponding to the terminal according to the OFDMA physical layer signaling, send the uplink OFDMA data information to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

An access point embodiment 3 of the present invention provides an access point, where the access point includes: a transmitter 30, configured to send OFDMA physical layer signaling to a terminal, where the OFDMA physical layer signaling is used for indicating, to the terminal, a subchannel allocated for the terminal, so that the terminal determines the subchannel corresponding to the terminal according to the OFDMA physical layer signaling, where the OFDMA physical layer signaling includes an identifier of the terminal and subchannel information corresponding to the identifier of the terminal.

The access point provided in this embodiment of the present invention may perform the technical solutions of the embodiments of the foregoing data transmission indication methods, whose implementation principles and technical effects are similar, and details are not described herein again.

Optionally, the identifier of the terminal is an identifier of one or more terminal groups, and each terminal group includes at least one terminal; and the subchannel information includes an uplink subchannel or a downlink subchannel or an uplink and downlink bidirectional subchannel, and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where terminal groups and subchannels are in a one-to-one correspondence.

The transmitter 30 may be further configured to: before the OFDMA physical layer signaling is sent to the terminal, send a mapping relationship between an identifier of the terminal group and an address of the terminal to the terminal, so that the terminal learns a terminal group in which the terminal is located.

Optionally, the identifier of the terminal is an identifier of one terminal group, and the terminal group includes at least two terminals; and then the OFDMA physical layer signaling being used for indicating, to the terminal, a subchannel allocated for the terminal includes: the OFDMA physical layer signaling being used for indicating to each terminal in the terminal group that the allocated subchannel is an uplink subchannel or a downlink subchannel or an uplink and downlink bidirectional subchannel, where terminals in the terminal group and subchannels are in a one-to-one correspondence.

The access point provided in this embodiment of the present invention may perform the technical solutions of the embodiments of the foregoing data transmission indication methods, whose implementation principles and technical effects are similar, and details are not described herein again.

Further, the transmitter 30 is specifically configured to send an OFDM preamble to the terminal, where the OFDM preamble carries the OFDMA physical layer signaling.

Optionally, the transmitter 30 may be further configured to send a NDPA frame to the terminal, where the NDPA frame carries the OFDMA physical layer signaling.

Optionally, the transmitter 30 may be further configured to send an NDPA frame and an OFDM preamble to the terminal, where the NDPA frame carries the identifier of the terminal in the OFDMA physical layer signaling, and the OFDM preamble carries the subchannel information corresponding to the identifier of the terminal and being in the OFDMA physical layer signaling.

Optionally, the transmitter 30 may be further configured to send an NDPA frame and an OFDM preamble to the terminal, where the NDPA frame carries the subchannel information corresponding to the identifier of the terminal and being in the OFDMA physical layer signaling, and the OFDM preamble carries the identifier of the terminal in the OFDMA physical layer signaling.

The access point provided in this embodiment of the present invention may perform the technical solutions of the embodiments of the foregoing data transmission indication methods, whose implementation principles and technical effects are similar, and details are not described herein again.

Further, the OFDMA physical layer signaling is specifically used for indicating, to the terminal, a subchannel that is allocated to the terminal for receiving downlink OFDMA data information, and then the transmitter 30 may be further configured to: after the OFDMA physical layer signaling is sent to the terminal, send downlink OFDMA data information on the subchannel corresponding to the terminal in an OFDMA mode, where the downlink OFDMA data information includes an OFDMA preamble and OFDMA data, and the OFDMA preamble includes a switching field and UHT-SIG-B.

Figure 28:
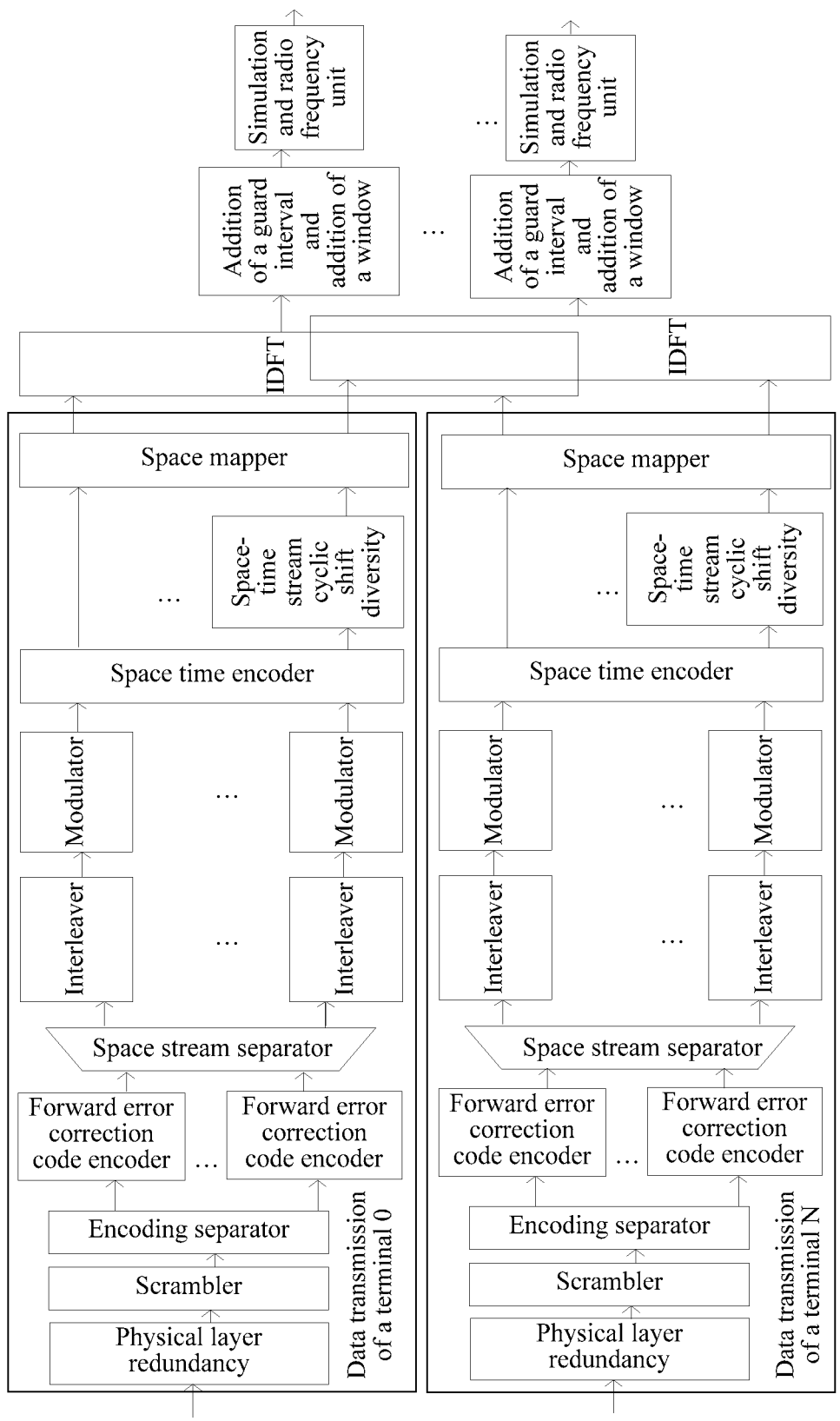
FIG. 28 is a block diagram of IDFT implementation in which an access point sends downlink data information to a terminal in an OFDMA mode.

Optionally, the manner in which the transmitter 30 sends downlink OFDMA data information to each terminal on a subchannel corresponding to the terminal may be implemented by building an inverse discrete Fourier transform (IDFT) module corresponding to an antenna of the access point in the transmitter 30, that is, the access point may first perform encoding, space stream separation and space-time encoding on downlink data of multiple terminals into multiple space-time streams, and reference may be made to FIG. 28. The space-time streams correspond to the antenna of the access point. Space-time streams of different terminals on a same antenna are mapped, by using an IDFT module corresponding to the antenna, to subchannels or subcarriers corresponding to the terminals and sent, thereby sending respective corresponding downlink OFDMA data information to the terminals by using different subchannels. If the access point is provided with multiple antennas, there are a corresponding quantity of IDFT modules (if a quantity of antennas is M, a quantity of IDFT modules is also M). These IDFT modules all work on a same frequency band. Therefore, for OFDMA in which the access point is provided with multiple antennas, different users work on different subchannels; and on a same subchannel, space-time streams of the access point may be distinguished by means of space mapping. The space-time streams may further support MU-MIMO implementation on the subchannel.

Correspondingly, a terminal performs demodulation by using a discrete Fourier transform (DFT) module to obtain data of a receiving end, and obtains, according to an indication of OFDMA physical layer signaling, data on a subchannel on which the terminal is located. If the data is multi-antenna space mapping signals, the signals are separated by using multiple antennas; or if the data is single-antenna signals, the signals do not need to be separated.

The access point provided in this embodiment of the present invention may perform the technical solutions of the embodiments of the foregoing data transmission indication methods, whose implementation principles and technical effects are similar, and details are not described herein again.

Figure 29:
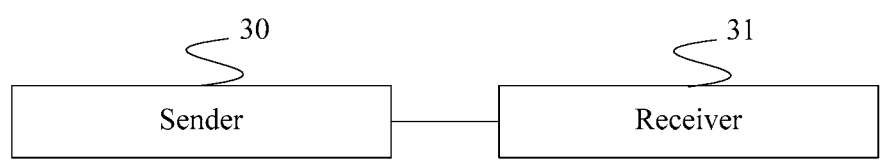
FIG. 29 is a schematic structural diagram of Embodiment 4 of an access point according to the present invention.

FIG. 29 is a schematic structural diagram of Embodiment 4 of an access point according to the present invention. The access point includes the foregoing transmitter 30, and further includes a receiver 31.

The foregoing OFDMA physical layer signaling or the foregoing downlink OFDMA data information carries an OFDMA ACK request or an OFDMA BA request, and the OFDMA ACK request or the OFDMA BA request is used for instructing the terminal to send an ACK response or a BA response to the access point in the OFDMA mode; then the foregoing OFDMA physical layer signaling is further used for indicating the subchannel that corresponds to the terminal, on which the ACK response or the BA response is sent to the access point and that is allocated for the terminal; and then the receiver 31 is configured to: after the transmitter 30 sends the downlink OFDMA data information on the subchannel corresponding to the terminal in the OFDMA mode, receive the ACK response or the BA response that is sent by the terminal on the subchannel corresponding to the terminal in the OFDMA mode.

The access point provided in this embodiment of the present invention may perform the technical solutions of the embodiments of the foregoing data transmission indication methods, whose implementation principles and technical effects are similar, and details are not described herein again.

Optionally, the OFDMA physical layer signaling is used for indicating the subchannel that corresponds to the terminal, on which the ACK response or the BA response is sent to the access point and that is allocated for the terminal; and then the transmitter 30 may be further configured to: after the downlink OFDMA data information is sent on the subchannel corresponding to the terminal, send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the receiver 31 may be further configured to receive the ACK response or the BA response that is sent by the terminal on the corresponding subchannel in the OFDMA mode.

Optionally, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the transmitter 30 is specifically configured to send MU-MIMO data information to the terminal in a MU-MIMO mode, where the MU-MIMO data information carries OFDMA physical layer signaling; the receiver 31 may be further configured to: after the transmitter 30 sends the OFDMA physical layer signaling to the terminal, receive the ACK response or the BA response that is sent by the terminal on the corresponding subchannel in the OFDMA mode.

Optionally, the OFDMA physical layer signaling is specifically used for indicating, to the terminal, the subchannel that corresponds to the terminal, on which the ACK response or the BA response is sent to the access point and that is allocated for the terminal; and then the transmitter 30 is specifically configured to send MU-MIMO data information to the terminal in a MU-MIMO mode, where the MU-MIMO data information carries OFDMA physical layer signaling; and send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the receiver 31 may be further configured to: after the transmitter sends the OFDMA physical layer signaling to the terminal, receive the ACK response or the BA response that is sent by the terminal on the corresponding subchannel in the OFDMA mode.

Optionally, the OFDMA physical layer signaling is specifically used for indicating, to the terminal, the subchannel that corresponds to the terminal, on which the ACK response or the BA response is sent to the access point and that is allocated for the terminal; and then the transmitter 30 is specifically configured to send MU-MIMO data information to the terminal in a MU-MIMO mode; and send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the ACK request frame or the BA request frame carries the OFDMA physical layer signaling; and the receiver 31 may be further configured to: after the transmitter 30 sends the OFDMA physical layer signaling to the terminal, receive the ACK response or the BA response that is sent by the terminal on the corresponding subchannel in the OFDMA mode.

Optionally, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and the transmitter 30 may be further configured to: after the OFDMA physical layer signaling is sent to the terminal, send OFDMA+MU-MIMO data information to the terminal on the subchannel corresponding to the terminal in an OFDMA+MU-MIMO mode; and the receiver 31 may be further configured to receive the ACK response or the BA response that is sent by the terminal on the corresponding subchannel in the OFDMA mode.

Optionally, the OFDMA physical layer signaling is specifically used for indicating, to the terminal, the subchannel that corresponds to the terminal, on which the ACK response or the BA response is sent to the access point and that is allocated for the terminal; and then the transmitter 30 is further configured to: after the OFDMA physical layer signaling is sent to the terminal, send OFDMA+MU-MIMO data information to the terminal on the subchannel corresponding to the terminal in an OFDMA+MU-MIMO mode; and send an ACK request frame or a BA request frame to the terminal, where the ACK request frame or the BA request frame includes a dedicated information bit, and the dedicated information bit is used for instructing the terminal to send the ACK response or the BA response to the access point in the OFDMA mode; and the receiver 31 may be further configured to receive the ACK response or the BA response that is sent by the terminal on the corresponding subchannel in the OFDMA mode.

Figure 30:
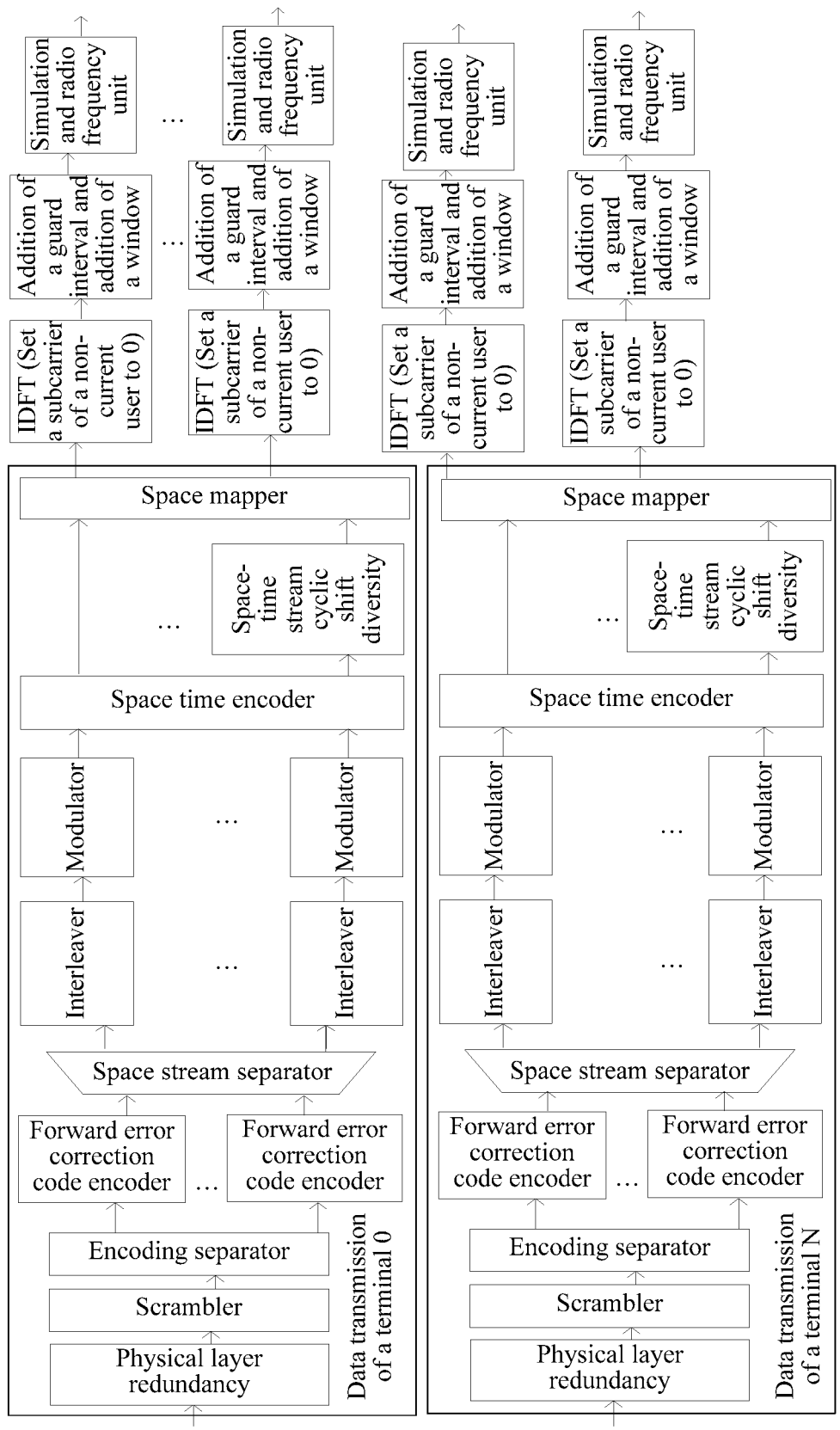
FIG. 30 is a block diagram in which an access point implements transmission of uplink OFDMA data information by using OFDMA physical layer signaling.

Optionally, the OFDMA physical layer signaling is specifically used for indicating, to the terminal, the subchannel that corresponds to the terminal, on which uplink OFDMA data information is sent to the access point and that is allocated for the terminal; and then the receiver 31 may be further configured to: before the transmitter 30 sends the OFDMA physical layer signaling to the terminal, receive an uplink transmission frame sent by the terminal; and after the transmitter 30 sends the OFDMA physical layer signaling to the terminal, receive the uplink OFDMA data information that is sent by the terminal on the corresponding subchannel in an OFDMA mode. Optionally, the transmitter 30 may further transmit uplink OFDMA data information by using an IDFT module, so that each terminal may learns, according to the OFDMA physical layer signaling, a part corresponding to the terminal in a subchannel or subcarrier mapped only by using the IDFT module, and set other parts to 0, and reference may be made to FIG. 30.

Optionally, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then the transmitter 30 is further configured to: after the receiver 31 receives the uplink OFDMA data information that is sent by the terminal on the corresponding subchannel, send the ACK response or the BA response corresponding to the uplink OFDMA data information on the subchannel corresponding to the terminal in the OFDMA mode.

Optionally, the OFDMA physical layer signaling is specifically used for indicating, to the terminal, the subchannel that corresponds to the terminal, on which uplink OFDMA data information is sent to the access point and that is allocated for the terminal; and then the receiver 31 is further configured to: after the transmitter 30 sends the OFDMA physical layer signaling to the terminal, receive the uplink OFDMA data information that is sent by the terminal on the corresponding subchannel in an OFDMA mode.

The access point provided in this embodiment of the present invention may perform the technical solutions of the embodiments of the foregoing data transmission indication methods, whose implementation principles and technical effects are similar, and details are not described herein again.

Figure 31:
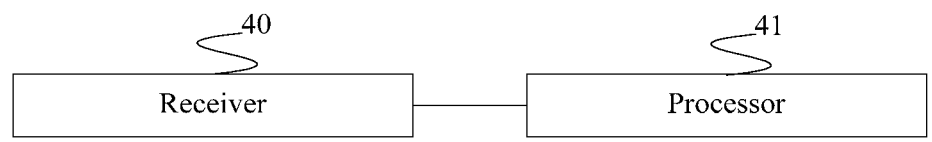
FIG. 31 is a schematic structural diagram of Embodiment 4 of a terminal according to the present invention.

FIG. 31 is a schematic structural diagram of Embodiment 4 of a terminal according to the present invention. As shown in FIG. 31, the terminal includes: a receiver 40 and a processor 41.

The receiver 40 is configured to receive OFDMA physical layer signaling sent by an access point, where the OFDMA physical layer signaling is used for indicating, to the terminal, a subchannel allocated by the access point for the terminal, where the OFDMA physical layer signaling includes an identifier of the terminal and subchannel information corresponding to the identifier of the terminal.

The processor 41 is configured to determine a subchannel corresponding to the terminal according to the OFDMA physical layer signaling.

The terminal provided in this embodiment of the present invention may perform the technical solutions of the embodiments of the foregoing data transmission indication methods, whose implementation principles and technical effects are similar, and details are not described herein again.

Optionally, the identifier of the terminal is an identifier of one or more terminal groups, and each terminal group includes at least one terminal; and then the OFDMA physical layer signaling being used for indicating, to the terminal, a subchannel allocated for the terminal includes: the OFDMA physical layer signaling being used for indicating to each terminal group that the allocated subchannel is an uplink subchannel or a downlink subchannel or an uplink and downlink bidirectional subchannel, where terminal groups and subchannels are in a one-to-one correspondence.

The receiver 40 may be further configured to: before the OFDMA physical layer signaling sent by the access point is received, receive a mapping relationship between an identifier of the terminal group and an address of the terminal, where the mapping relationship is sent by the access point; and then the processor 41 is specifically configured to determine according to the mapping relationship that the terminal is located in the terminal group, and then determine that a subchannel corresponding to the terminal group is the subchannel corresponding to the terminal.

Optionally, the identifier of the terminal is an identifier of one terminal group, and the terminal group includes at least two terminals; and then the OFDMA physical layer signaling being used for indicating, to the terminal, a subchannel allocated for the terminal includes: the OFDMA physical layer signaling being used for indicating to each terminal in the terminal group that the allocated subchannel is an uplink subchannel or a downlink subchannel or an uplink and downlink bidirectional subchannel, where terminals in the terminal group and subchannels are in a one-to-one correspondence.

The terminal provided in this embodiment of the present invention may perform the technical solutions of the embodiments of the foregoing data transmission indication methods, whose implementation principles and technical effects are similar, and details are not described herein again.

Further, the receiver 40 is specifically configured to receive an OFDM preamble sent by the access point, where the OFDM preamble carries the OFDMA physical layer signaling.

Optionally, the receiver 40 may be further configured to receive a NDPA frame sent by the access point, where the NDPA frame carries the foregoing OFDMA physical layer signaling.

Optionally, the receiver 40 may be further configured to receive an NDPA frame and an OFDM preamble that are sent by the access point, where the NDPA frame carries the identifier of the terminal in the OFDMA physical layer signaling, and the OFDM preamble carries the subchannel information corresponding to the identifier of the terminal and being in the OFDMA physical layer signaling.

Optionally, the receiver 40 may be further configured to receive an NDPA frame and an OFDM preamble that are sent by the access point, where the NDPA frame carries subchannel information corresponding to an identifier of the terminal and being in the foregoing OFDMA physical layer signaling, and the OFDM preamble carries the identifier of the terminal in the foregoing OFDMA physical layer signaling.

The terminal provided in this embodiment of the present invention may perform the technical solutions of the embodiments of the foregoing data transmission indication methods, whose implementation principles and technical effects are similar, and details are not described herein again.

Further, the OFDMA physical layer signaling is specifically used for indicating, to the terminal, a subchannel that is allocated by the access point to the terminal for receiving downlink OFDMA data, and then the receiver 40 is further configured to: after the processor 41 determines the subchannel corresponding to the terminal according to the OFDMA physical layer signaling, receive, on the subchannel corresponding to the terminal, downlink OFDMA data information sent by the access point, where the downlink OFDMA data information includes an OFDMA preamble and OFDMA data, and the OFDMA preamble includes a switching field and UHT-SIG-B.

Further, the receiver 40 is specifically configured to receive a destination terminal address corresponding to the OFDMA data and sent by the access point; determine whether the terminal matches the destination terminal address; and if yes, receive, on the subchannel corresponding to the terminal, downlink OFDMA data information sent by the access point.

The terminal provided in this embodiment of the present invention may perform the technical solutions of the embodiments of the foregoing data transmission indication methods, whose implementation principles and technical effects are similar, and details are not described herein again.

Figure 32:
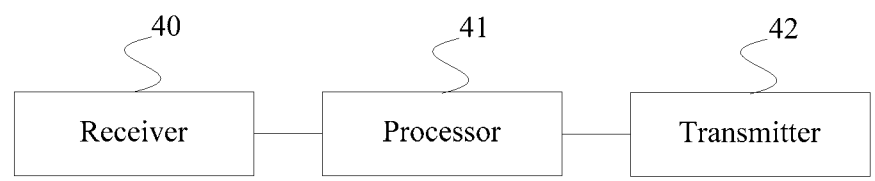
FIG. 32 is a schematic structural diagram of Embodiment 5 of a terminal according to the present invention.

FIG. 32 is a schematic structural diagram of Embodiment 5 of a terminal according to the present invention. On the basis of the embodiment shown in FIG. 31, further, the terminal further includes a transmitter 42.

Optionally, the foregoing OFDMA physical layer signaling or the foregoing downlink OFDMA data information carries an OFDMA ACK request or an OFDMA BA request, and the OFDMA ACK request or the OFDMA BA request is used for instructing the terminal to send an ACK response or a BA response to the access point in the OFDMA mode; then the foregoing OFDMA physical layer signaling is further used for indicating the subchannel that corresponds to the terminal, on which the ACK response or the BA response is sent to the access point and that is allocated for the terminal; and then the transmitter 42 is configured to: after the receiver 40 receives, on the subchannel corresponding to the terminal, the downlink OFDMA data information sent by the access point, send the ACK response or the BA response to the access point on the subchannel corresponding to the terminal in the OFDMA mode.

Optionally, the OFDMA physical layer signaling is further used for indicating the subchannel that corresponds to the terminal, on which the ACK response or the BA response is sent to the access point and that is allocated for the terminal; and the receiver 40 may be further configured to: after the downlink OFDMA data information sent by the access point is received on the subchannel corresponding to the terminal, receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the transmitter 42 is configured to send the ACK response or the BA response to the access point on the subchannel corresponding to the terminal in the OFDMA mode.

Optionally, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the receiver 40 may be further configured to receive MU-MIMO data information sent by the access point, where the MU-MIMO data information carries the OFDMA physical layer signaling; and the transmitter 42 is configured to: after the processor 41 determines the subchannel corresponding to the terminal according to the OFDMA physical layer signaling, send the ACK response or the BA response to the access point on the subchannel corresponding to the terminal in the OFDMA mode.

Optionally, the OFDMA physical layer signaling is specifically used for indicating, to the terminal, the subchannel that corresponds to the terminal, on which the ACK response or the BA response is sent to the access point and that is allocated for the terminal; and then the receiver 40 may be further configured to receive MU-MIMO data information sent by the access point, where the MU-MIMO data information carries the OFDMA physical layer signaling; and receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the transmitter 42 is configured to: after the processor 41 determines the subchannel corresponding to the terminal according to the OFDMA physical layer signaling, send the ACK response or the BA response to the access point on the subchannel corresponding to the terminal in the OFDMA mode.

Optionally, the OFDMA physical layer signaling is specifically used for indicating, to the terminal, the subchannel that corresponds to the terminal, on which the ACK response or the BA response is sent to the access point and that is allocated for the terminal; and then the receiver 40 may be further configured to receive MU-MIMO data information sent by the access point, and receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the ACK request frame or the BA request frame carries the OFDMA physical layer signaling; and then the transmitter 42 is configured to: after the processor 41 determines the subchannel corresponding to the terminal according to the OFDMA physical layer signaling, send the ACK response or the BA response to the access point on the subchannel corresponding to the terminal in the OFDMA mode.

Optionally, the OFDMA physical layer signaling carries an OFDMA ACK request or an OFDMA BA request, and the OFDMA ACK request or the OFDMA BA request is used for instructing the terminal to send an ACK response or a BA response to the access point in an OFDMA mode; then the OFDMA physical layer signaling is specifically used for indicating, to the terminal, the subchannel that corresponds to the terminal, on which the ACK response or the BA response is sent to the access point and that is allocated for the terminal; and then the receiver 40 may be further configured to: after the processor 41 determines the subchannel corresponding to the terminal according to the OFDMA physical layer signaling, receive, on the subchannel corresponding to the terminal, OFDMA+MU-MIMO data information sent by the access point; and the transmitter 42 is configured to send the ACK response or the BA response to the access point on the subchannel corresponding to the terminal in the OFDMA mode.

Optionally, the OFDMA physical layer signaling is specifically used for indicating, to the terminal, the subchannel that corresponds to the terminal, on which the ACK response or the BA response is sent to the access point and that is allocated for the terminal; and then the receiver 40 may be further configured to: after the processor 41 determines the subchannel corresponding to the terminal according to the OFDMA physical layer signaling, receive, on the subchannel corresponding to the terminal, OFDMA+MU-MIMO data information sent by the access point; and receive an ACK request frame or a BA request frame sent by the access point, where the ACK request frame or the BA request frame includes a dedicated information bit, and the dedicated information bit is used for instructing the terminal to send the ACK response or the BA response to the access point in the OFDMA mode; and the transmitter 42 is configured to send the ACK response or the BA response to the access point on the subchannel corresponding to the terminal in the OFDMA mode.

Optionally, the OFDMA physical layer signaling is specifically used for indicating, to the terminal, the subchannel on which uplink OFDMA data information is sent to the access point and that is allocated for the terminal; and then the transmitter 42 may be further configured to: before the receiver 40 receives the OFDMA physical layer signaling sent by the access point, send an uplink transmission frame to the access point; and may be further configured to: after the processor 41 determines the subchannel corresponding to the terminal according to the OFDMA physical layer signaling, send the uplink OFDMA data information to the access point on the subchannel corresponding to the terminal in the OFDMA mode.

Optionally, the uplink OFDMA data information carries an OFDMA ACK request or an OFDMA BA request, and the OFDMA ACK request or the OFDMA BA request is further used for instructing the access point to send an ACK response or a BA response to the terminal in the OFDMA mode; and then the receiver 40 may be further configured to: after the transmitter 42 sends the uplink OFDMA data information to the access point, receive, on the subchannel corresponding to the terminal, the ACK response or the BA response corresponding to the uplink OFDMA data information and sent by the access point.

Optionally, the OFDMA physical layer signaling is specifically used for indicating, to the terminal, the subchannel that corresponds to the terminal, on which uplink OFDMA data information is sent to the access point and that is allocated for the terminal; and then the transmitter 42 may be further configured to: after the processor 41 determines the subchannel corresponding to the terminal according to the OFDMA physical layer signaling, send the uplink OFDMA data information to the access point on the subchannel corresponding to the terminal in the OFDMA mode.

The terminal provided in this embodiment of the present invention may perform the technical solutions of the embodiments of the foregoing data transmission indication methods, whose implementation principles and technical effects are similar, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A data transmission indication method, by a terminal, comprising:
   receiving, from an access point, a physical layer signaling that indicates, to the terminal, a subchannel allocated to the terminal for receiving downlink orthogonal frequency division multiple access (OFDMA) data information;
   receiving the downlink OFDMA data information on the subchannel allocated to the terminal, wherein the downlink OFDMA data information comprises OFDMA data and a request that is used to instruct the terminal to send a response to the access point in an OFDMA mode; and
   sending, to the access point, in the OFDMA mode, the response, wherein the response is either an acknowledge (ACK) response or a block acknowledge (BA) response.

2. The method according to claim 1, further comprising: sending uplink OFDMA data information to the access point.

3. The method according to claim 1, wherein an interval between subcarriers in an orthogonal frequency division multiplexing (OFDM) mode is K multiples of an interval between subcarriers in the OFDMA mode, and wherein K is an integer.

4. The method according to claim 1, wherein the quantity of subcarriers in the OFDMA mode is 64*K per 20 MHz.

5. The method according to claim 1, wherein the subchannel includes one or more subcarriers.

6. The method according to claim 1, wherein the physical layer signaling comprises an identifier of the terminal and information of the subchannel.

7. The method according to claim 1, wherein the physical layer signaling is received by using OFDM.

8. A terminal network apparatus comprising:
   a processor; and
   a non-transitory computer readable medium comprising computer-executable instructions that, when executed by the processor, cause the terminal network apparatus to carry out a data transmission indication method comprising:
   receiving a physical layer signaling from an access point, wherein the physical layer signaling indicates a subchannel allocated to the apparatus for receiving downlink orthogonal frequency division multiple access (OFDMA) data information;
   receiving the downlink OFDMA data information on the subchannel allocated to the terminal network apparatus, wherein the downlink OFDMA data information comprises OFDMA data and a request that is used to instruct the terminal network apparatus to send a response to the access point in an OFDMA mode; and
   sending the response to the access point in the OFDMA mode, wherein the response is either an acknowledge (ACK) response or a block acknowledge (BA) response.

9. The apparatus according to claim 8, wherein when the computer-executable instructions executed by the processor, cause the apparatus further to perform:
   sending uplink OFDMA data information to the access point.

10. The apparatus according to claim 8, wherein an interval between subcarriers in an orthogonal frequency division multiplexing (OFDM) mode is K multiples of an interval between subcarriers in the OFDMA mode, and wherein K is an integer.

11. The apparatus according to claim 8, wherein the quantity of subcarriers in the OFDMA mode is 64*K per 20 MHz.

12. The apparatus according to claim 8, wherein the subchannel includes one or more subcarriers.

13. The apparatus according to claim 8, wherein the physical layer signaling comprises an identifier of the terminal and information of the subchannel.

14. The apparatus according to claim 8, wherein the physical layer signaling is received by using OFDM.

15. A non-transitory computer-readable storage medium comprising instructions that, when executed by a computer, cause the computer to carry out a data transmission indication method comprising:
   receiving a physical layer signaling from an access point, wherein the physical layer signaling indicates a subchannel allocated to a terminal for receiving downlink orthogonal frequency division multiple access (OFDMA) data information;
   receiving the downlink OFDMA data information on the subchannel allocated to the terminal, wherein the downlink OFDMA data information comprises OFDMA data and a request, and the request is used to instruct the terminal to send a response to the access point in an OFDMA mode; and
   sending the response to the access point in the OFDMA mode, wherein the response is either an acknowledge (ACK) response or a block acknowledge (BA) response.

16. The non-transitory computer-readable storage medium according to claim 15, wherein when the non-transitory computer-readable storage medium executed by the computer, cause the computer to further perform:
   sending uplink OFDMA data information to the access point.

17. The non-transitory computer-readable storage medium according to claim 15, wherein an interval between subcarriers in an orthogonal frequency division multiplexing (OFDM) mode is K multiples of an interval between subcarriers in the OFDMA mode, and wherein K is an integer.

18. The non-transitory computer-readable storage medium according to claim 15, wherein the quantity of subcarriers in the OFDMA mode is 64*K per 20 MHz.

19. The non-transitory computer-readable storage medium according to claim 15, wherein the subchannel includes one or more subcarriers.

20. The non-transitory computer-readable storage medium according to claim 15, wherein the physical layer signaling comprises an identifier of the terminal and information of the subchannel.

* * * * *